United States Patent
Seed et al.

(10) Patent No.: US 9,654,900 B2
(45) Date of Patent: May 16, 2017

(54) SERVICE-BASED DISCOVERY IN NETWORKS

(71) Applicant: InterDigital Patent Holdings, Inc., Wilmington, DE (US)

(72) Inventors: Dale N. Seed, Allentown, PA (US); Michael F. Starsinic, Newtown, PA (US); Guang Lu, Thornhill (CA); Kamel M. Shaheen, King of Prussia, PA (US); Dorothy Gellert, Mountain View, CA (US); Zongrui Ding, Portland, OR (US); Lijun Dong, San Diego, CA (US); Chonggang Wang, Princeton, NJ (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 14/410,666

(22) PCT Filed: Jun. 28, 2013

(86) PCT No.: PCT/US2013/048459
§ 371 (c)(1),
(2) Date: Dec. 23, 2014

(87) PCT Pub. No.: WO2014/004965
PCT Pub. Date: Jan. 3, 2014

(65) Prior Publication Data
US 2015/0195671 A1  Jul. 9, 2015

Related U.S. Application Data

(60) Provisional application No. 61/666,256, filed on Jun. 29, 2012.

(51) Int. Cl.
*H04W 24/00* (2009.01)
*H04W 4/00* (2009.01)
(Continued)

(52) U.S. Cl.
CPC ............ *H04W 4/005* (2013.01); *H04L 67/16* (2013.01); *H04W 4/006* (2013.01); *H04W 72/048* (2013.01)

(58) Field of Classification Search
CPC ............ H04W 4/005; H04W 28/0215; H04W 28/0247; H04W 28/0289; H04W 48/06;
(Continued)

(56) References Cited

U.S. PATENT DOCUMENTS

| 8,650,619 B2 | 2/2014 | Sundaram et al. |
| 2012/0220326 A1* | 8/2012 | Li .......................... H04W 4/005 455/509 |

(Continued)

FOREIGN PATENT DOCUMENTS

WO  WO 2011/112683 A1  9/2011

OTHER PUBLICATIONS

Russell, Paul, Jr., "M2M SCL Discovery Procedures", InterDigital Communications, European Telecommunications Standards Institute, M2M#14bis Meeting, Mar. 28-Apr. 1, 2011, 8 pages.

(Continued)

*Primary Examiner* — Charles Appiah
*Assistant Examiner* — Edward Zhang
(74) *Attorney, Agent, or Firm* — Condo Roccia Koptiw LLP

(57) ABSTRACT

Systems, methods, and instrumentalities may implement service-based discovery in a network, such as a 3GPP or 3GPP2 network. A Discovery Server may be used to query and find services offered by the network or by entities that interface with the network. Situational context information or policy information, or both, may be communicated to the discovery server so that the Discovery Server can provide context-aware and policy-based discovery services. The Discovery Server may be used to control which of the
(Continued)

entities that interface with the network can discover one another. The Discovery Server may support queries based on, for example, the type of MTC entity, the type of services hosted on the entity, the availability times of the entity, types of protocols supported, levels of Quality of Service (QoS) supported, and MTC-IWF services.

21 Claims, 38 Drawing Sheets

(51) Int. Cl.
*H04L 29/08* (2006.01)
*H04W 72/04* (2009.01)
(58) Field of Classification Search
CPC ....... H04W 8/22; H04W 48/08; H04W 4/001; H04W 4/12
USPC ...................................... 455/432, 434, 432.3
See application file for complete search history.

(56) References Cited

U.S. PATENT DOCUMENTS

| | | | |
|---|---|---|---|
| 2013/0003576 A1* | 1/2013 | Segura | H04W 4/005 370/252 |
| 2013/0188515 A1 | 7/2013 | Pinheiro et al. | |
| 2014/0089478 A1 | 3/2014 | Seed et al. | |

OTHER PUBLICATIONS

Draft European Telecommunications Standards Institute, TS 102 690 V<0.9.7>, "Machine-to-Machine Communications (M2M), Functional Architecture", Dec. 2010, pp. 1-191.
3rd Generation Partnership Project (3GPP), TS 23.682, V11.1.0, "3rd Generation Partnership Project; Technical Specification Group Services and System Aspects; Architecture enhancements to facilitate communications with packet data networks and applications (Release 11)", Jun. 2012, 27 pages.
3rd Generation Partnership Project (3GPP), TS 22.368, V11.5.0, "3rd Generation Partnership Project; Technical Specification Group Services and System Aspects; Service requirements for Machine-Type Communications (MTC); Stage 1 (Release 11)", Jun. 2012, 25 pages.
European Telecommunications Standards Institute (ETSI), TS 102 690, V1.1.1, "Machine-to-Machine communications (M2M); Functional architecture", Oct. 2011, 280 pages.
3rd Generation Partnership Project (3GPP), TS 23.008, V11.4.0, "3rd Generation Partnership Project; Technical Specification Group Core Network and Terminals; Organization of subscriber data (Release 11)", Jun. 2012, 109 pages.
3rd Generation Partnership Project (3GPP), TS 23.141, V10.0.0, "3rd Generation Partnership Project; Technical Specification Group Services and System Aspects; Presence Service; Architecture and functional description (Release 10)", Mar. 2011, 36 pages.
Location Interoperability Forum, "Mobile Location Protocol Specification", LIF TS 101 v2.0.0, Nov. 20, 2001, 70 pages.
3rd Generation Partnership Project (3GPP), TS 23.402, V11.3.0, "3rd Generation Partnership Project; Technical Specification Group Services and System Aspects; Architecture enhancements for non-3GPP accesses (Release 11)", Jun. 2012, 252 pages.
3rd Generation Partnership Project 2 (3GPP2), "Network Reference Model for CDMA2000 Spread Spectrum Systems", Revision B. Version 2.0, S.R0005-b, May 2007, 26 pages.

* cited by examiner

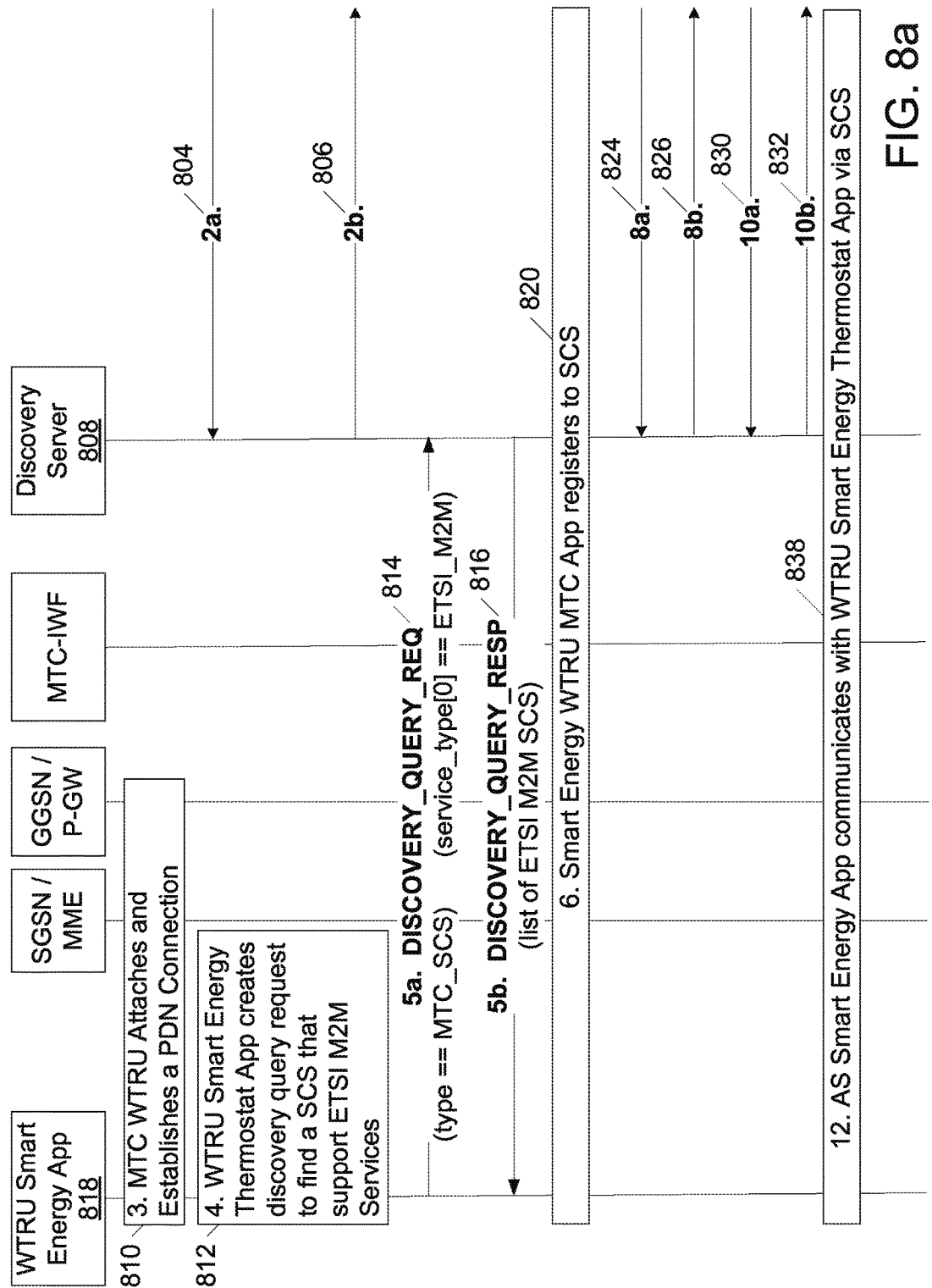

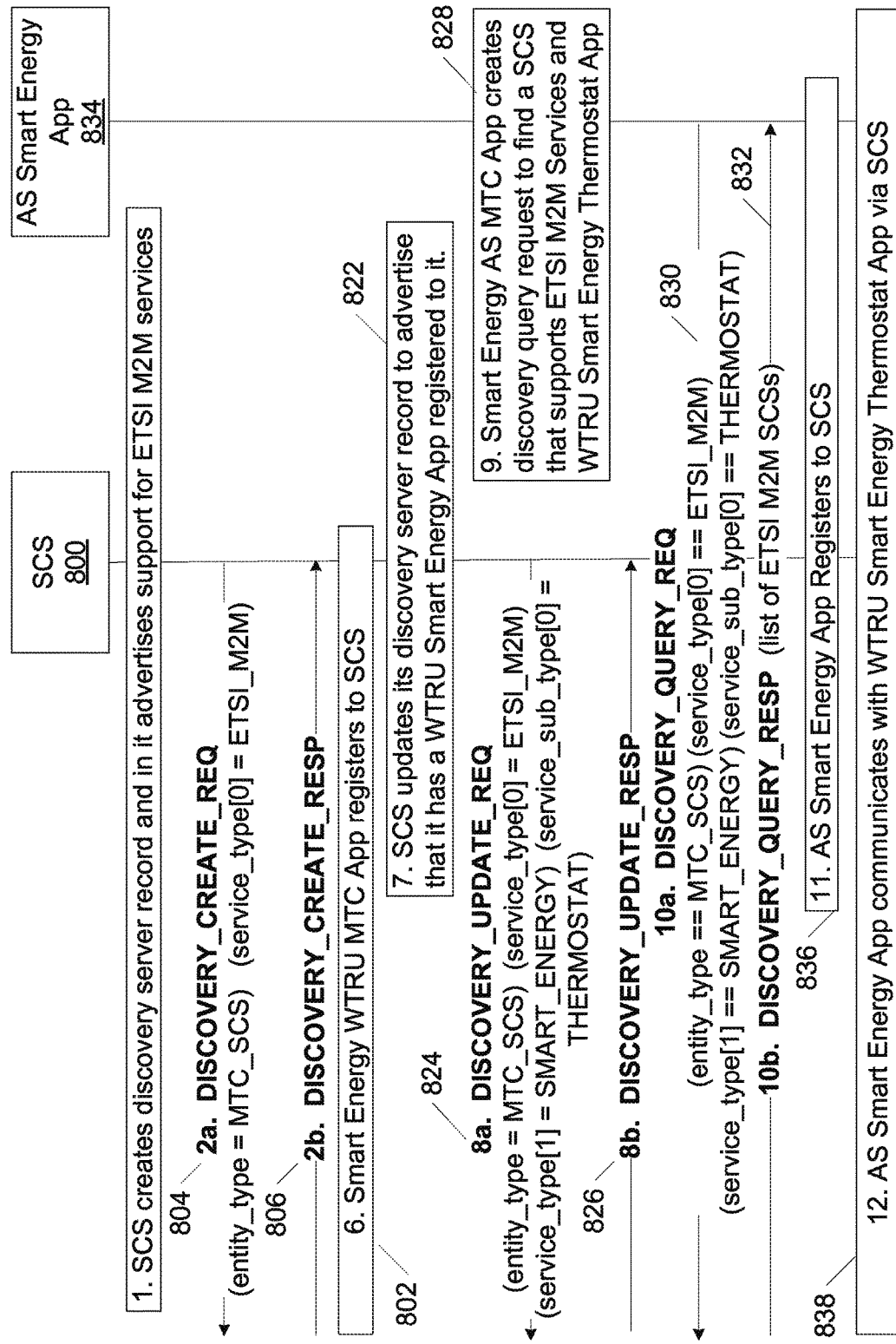

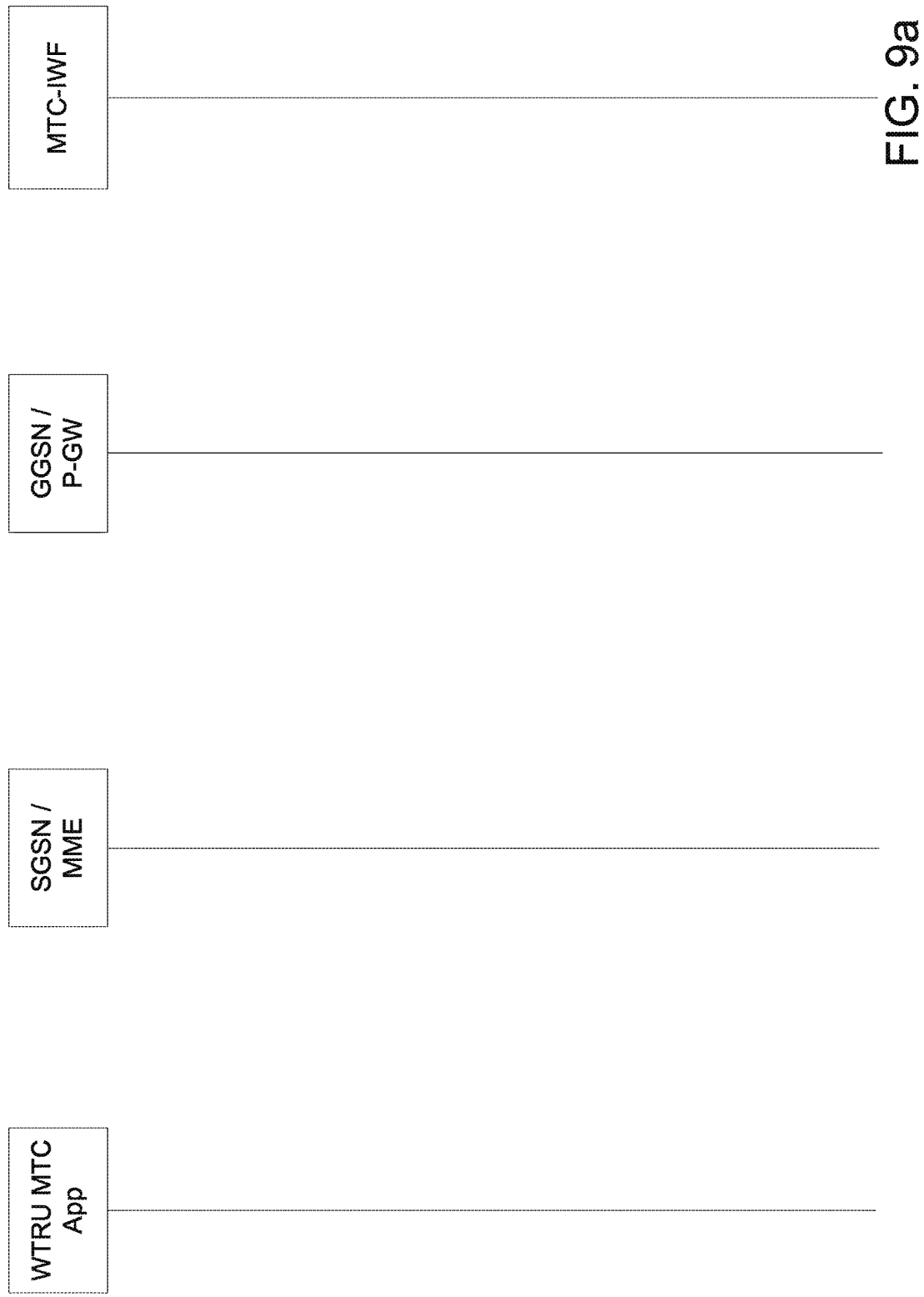

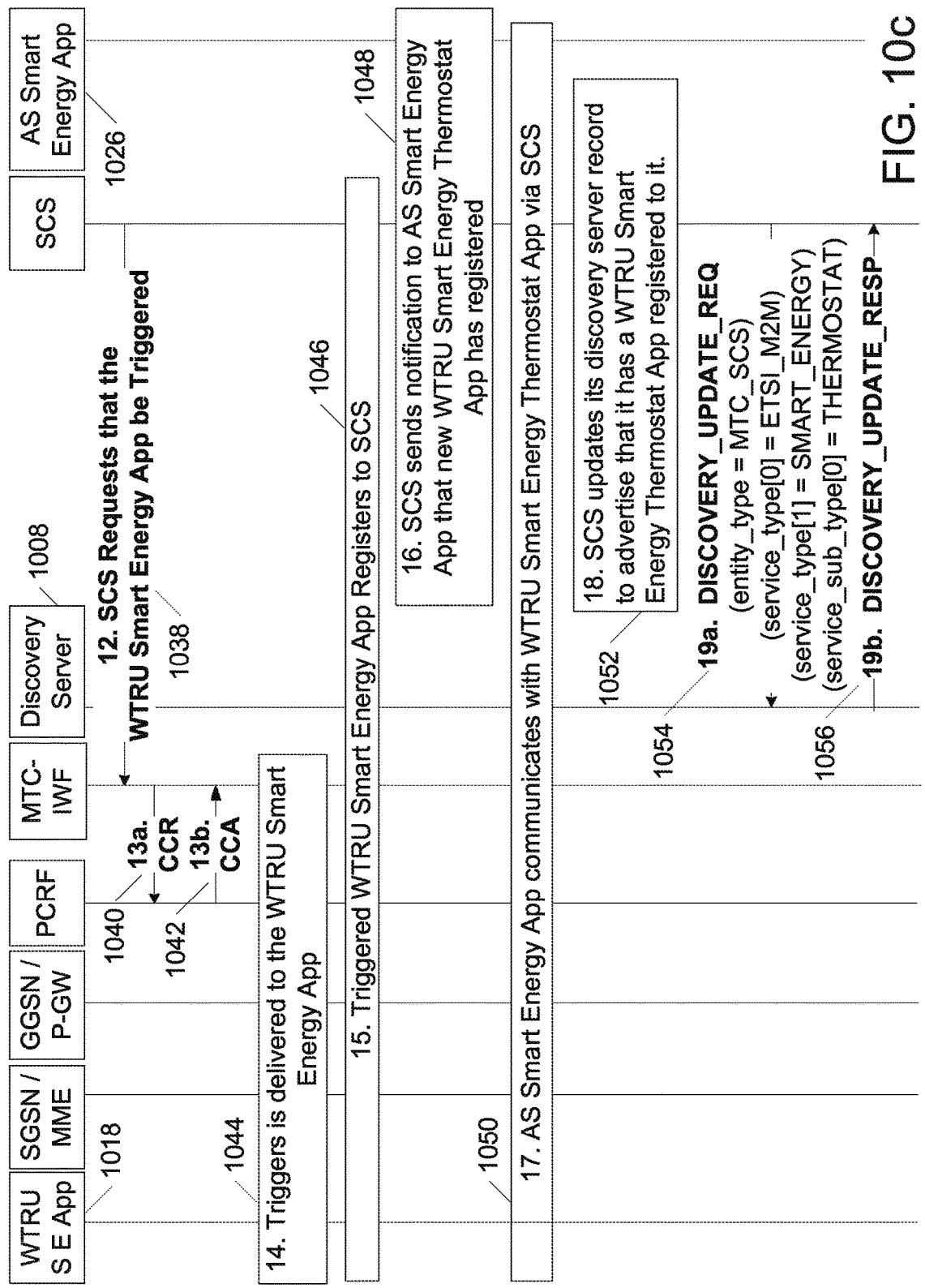

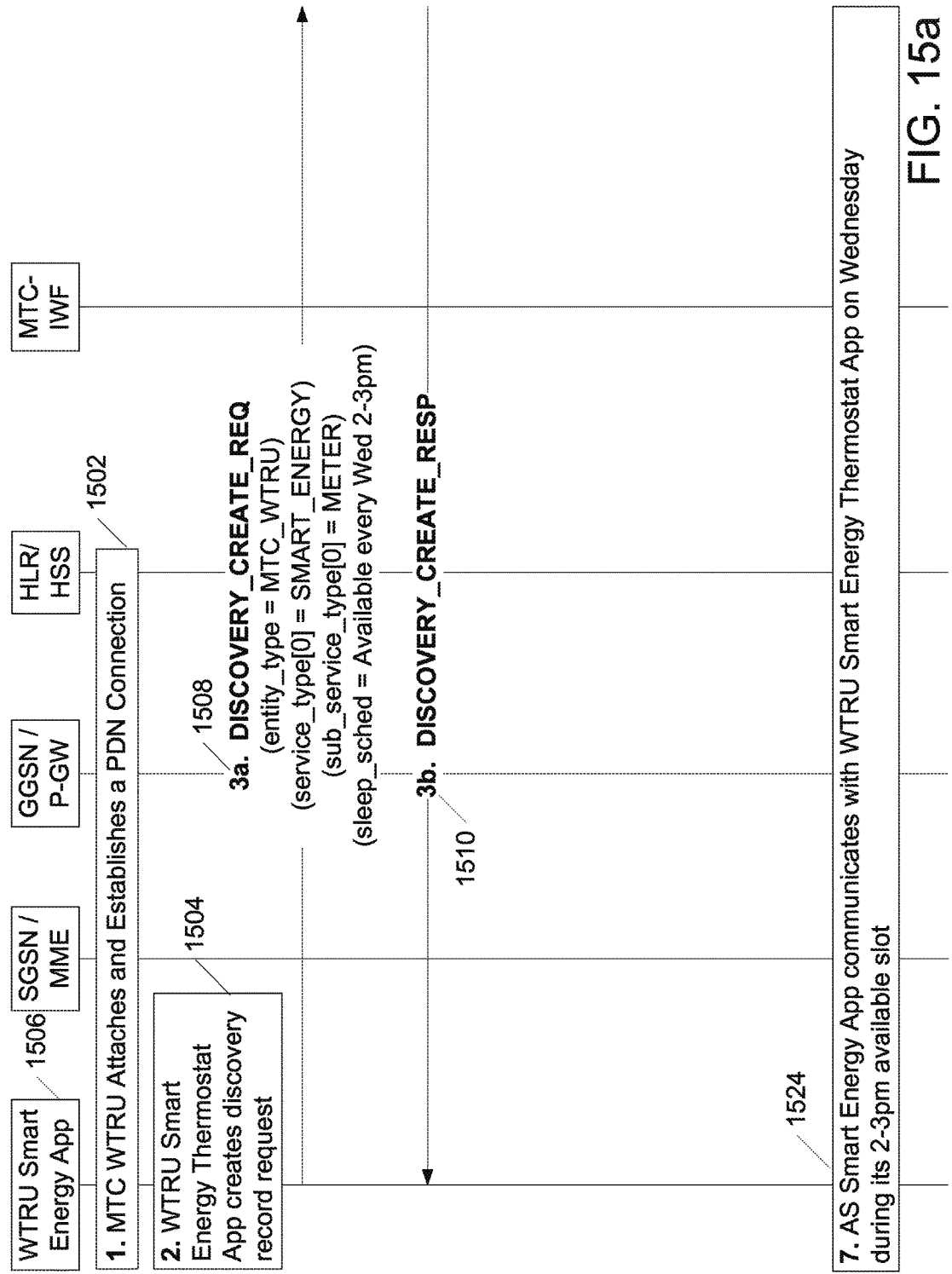

SERVICE-BASED DISCOVERY IN NETWORKS

CROSS-REFERENCE TO RELATED APPLICATIONS

This application is the National Stage Entry under 35 U.S.C. §371 of Patent Cooperation Treaty Application No. PCT/US2013/048459, filed Jun. 28, 2013, which claims the benefit of U.S. Provisional Application No. 61/666,256, filed on Jun. 29, 2012 the contents of which are hereby incorporated by reference in their entirety.

BACKGROUND

The $3^{rd}$ Generation Partnership Project (3GPP) has developed an architecture for machine-type communication (MTC). The 3GPP architecture for MTC may include a number of entities, including MTC Wireless Transmit/Receive Units (MTC WTRUs), such as MTC User Equipment (MTC UE), MTC Inter-Working Function (MTC-IWF), a Services Capability Server (SCS), and an Application Server (AS). An MTC WTRU may communicate with other MTC WTRUs or with SCS(s) via a Public Land Mobile Network (PLMN) and may host one or more MTC WTRU applications. The SCS may connect to the 3GPP network to communicate with WIC WTRU applications and MTC-IWF(s) or a Short Message Service—Service Center (SMS-SC) for device triggering. The AS may interface with SCS(s), a Gateway GPRS Support Node (GGSN), or a Packet Data Network Gateway (P-GW) and may host one or more AS MTC applications that interact with SCSs, WTRU MTC applications, and other AS MTC applications.

SUMMARY

Systems, methods, and instrumentalities are disclosed to implement service-based discovery in a network, such as discovery of a service available via an access network and/or a 3GPP or 3GPP2 network. A Discovery Server may be queried to find services offered by the network, as well as services offered by entities that interface with the network. The Discovery Server may support queries based on, for example, the type of MTC entity, the type of services hosted on the entity, the availability times of the entity, types of protocols supported, levels of Quality of Service (QoS) supported, and MTC-IWF services, and the like. The network may pass situational context and defined policies to the Discovery Server so that the Discovery Server can provide context-aware and policy-based discovery services.

A service offered by a network that interfaces with entities or by an entity that interfaces with the network may be discovered. A Discovery Server may be accessed. Situational context information or policy information, or both, may be communicated to the Discovery Server. The Discovery Server may be used to control which of the entities that interface with the network can discover one another.

Service-based discovery may be provided, for example, by receiving context information relating to an M2M device. The M2M device may be available via an access network. Policy information relating to at least one of the M2M device or the access network may be received. A query for a service may be received. It may be determined that the M2M device is capable of providing the service and that the access network is available to provide access to the M2M device. A response to the query may be sent that indicates that the M2M device is capable of providing the service.

BRIEF DESCRIPTION OF THE DRAWINGS

A more detailed understanding may be had from the following description, given by way of example in conjunction with the accompanying drawings.

FIGS. 6-18 depict example flow diagrams associated with the Discovery Server.

DETAILED DESCRIPTION

A detailed description of illustrative examples will now be described with reference to the various Figures. Although this description provides a detailed example of possible implementations, it should be noted that the details are intended to be exemplary and in no way limit the scope of the disclosed subject matter. In addition, the figures may illustrate call flows and/or flow diagrams, which are meant to be exemplary. Other embodiments may be used. The order of the messages/flows may be varied where appropriate. Messages/flows may be omitted if not needed, and, additional messages/flows may be added.

Figure 1A:
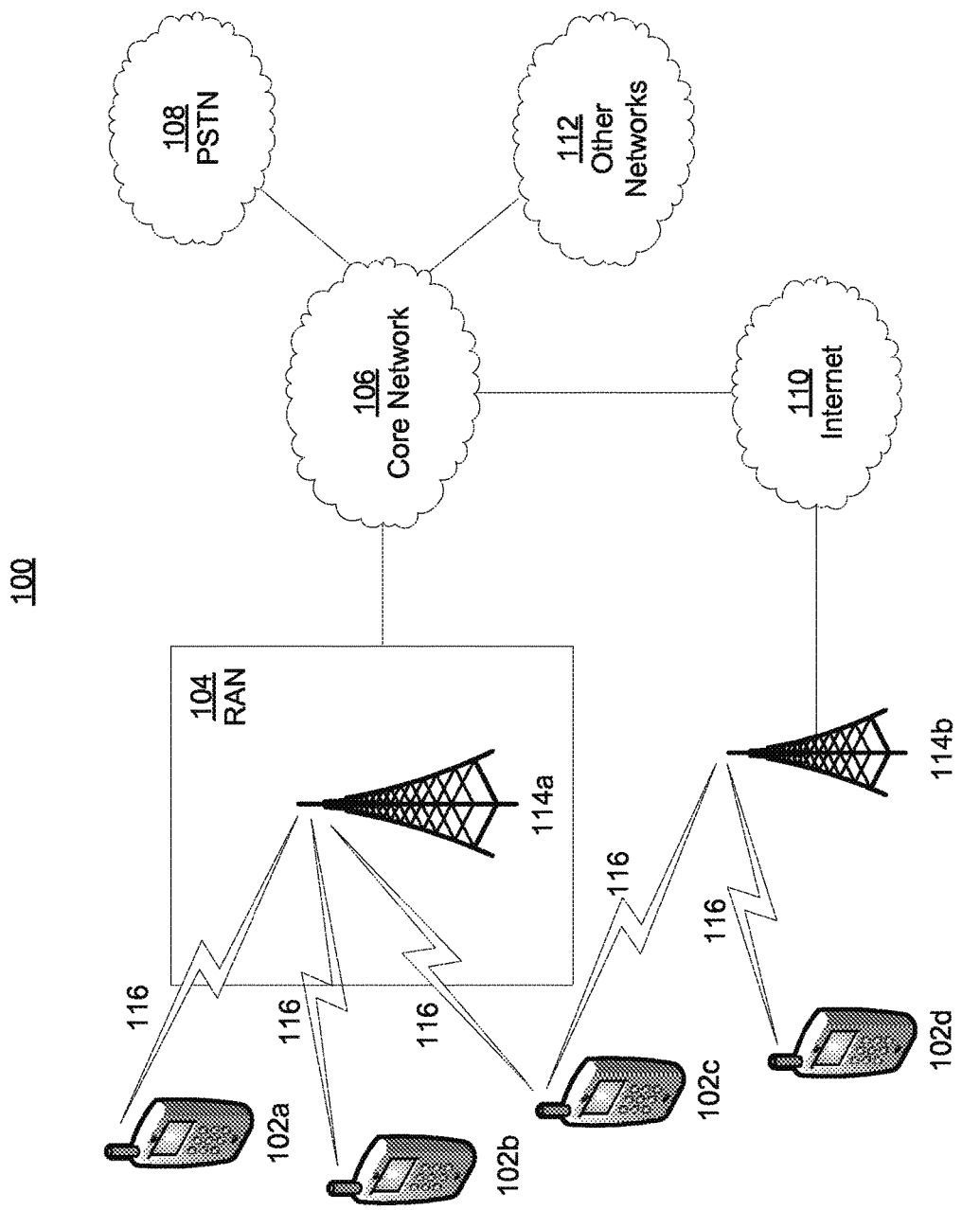
FIG. 1A is a system diagram of an example communications system in which one or more disclosed examples may be implemented.

FIG. 1A is a diagram of an example communications system 100 in which one or more disclosed examples may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access FDMA orthogonal FDMA (OFDMA), single-carrier FDMA (SC-FDMA), and the like.

As shown in FIG. 1A, the communications system 100 may include wireless transmit/receive units (WTRUs) 102a, 102b, 102c, and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed subject matter may contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106/107/109, the Internet 110, and/or the networks 112. By way of example, the base stations 114a, 114b may be a base transceiver station (BTS), a Node-B, an eNode B, a Home Node 13, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. The base station 114a may include three transceivers, i.e., one for each sector of the cell. The base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 115/116/117 which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

The base station 114a and the WTRUs 102a, 102b, 102c may implement a radio technology such as Evolved UMTS Terrestrial Radio Access (E-UTRA), which may establish the air interface 115/116/117 using Long Term Evolution (LTE) and/or LTE-Advanced (LTE-A).

The base station 114a and the WTRUs 102a, 102b, 102c may implement radio technologies such as IEEE 802.16 (e.g., Worldwide Interoperability for Microwave Access (WiMAX)), CDMA2000, CDMA2000 1X, CDMA2000 EV-DO, interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. The base station 114b and the WTRUs 102c, 102d may implement a radio technology such as IEEE 802.11 to establish a wireless local area network (WLAN). The base station 114b and the WTRUs 102c, 102d may implement a radio technology such as IEEE 802.15 to establish a wireless personal area network (WPAN). The base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. The base station 114b may not be required to access the Internet 110 via the core network 106/107/109.

The RAN 103/104/105 may be in communication with the core network 106/107/109, which may be any type of network configured to provide voice, data, applications, and/or voice over interact protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication. Although not shown in FIG. 1A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the Internet protocol (IP) in the TCP/IP Internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102e, 102d in the communications system 100 may include multi-mode capabilities, e.g., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
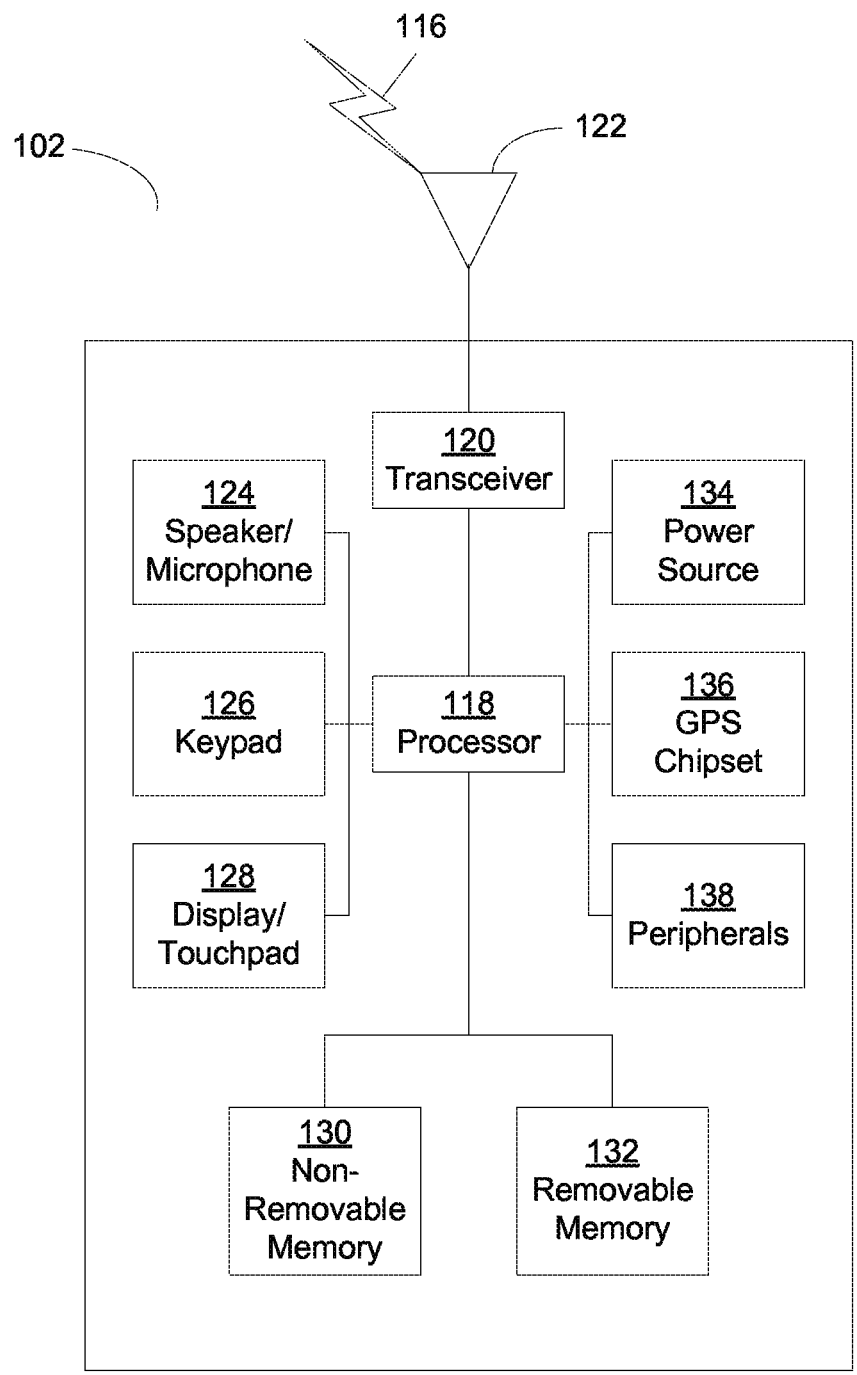
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any subcombination of the foregoing elements while remaining consistent with the disclosed subject matter. Also, the disclosed subject matter contemplates that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, the transmit/receive element 122 may be an antenna configured to transmit and/or receive RF signals. The transmit/receive element 122 may be an emitter/detector configured to transmit anchor receive IR, UV, or visible light signals, for example. The transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. The WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. The WTRU 102 may have multi-mode capabilities. The transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random access memory (RAM), read-only memory (ROM), a hard disk, or any other type of memory storage device. The removable memory 132 may include a subscriber identity module (SIM) card, a memory stick, a secure digital (SD) memory card, and the like. The processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. in addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location determination method while remaining consistent with the disclosed subject matter.

The processor 118 may further be coupled to other peripherals 138, which may include one or more software and/or hardware modules that provide additional features, functionality and/or wired or wireless connectivity. For example, the peripherals 138 may include an accelerometer, an c-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
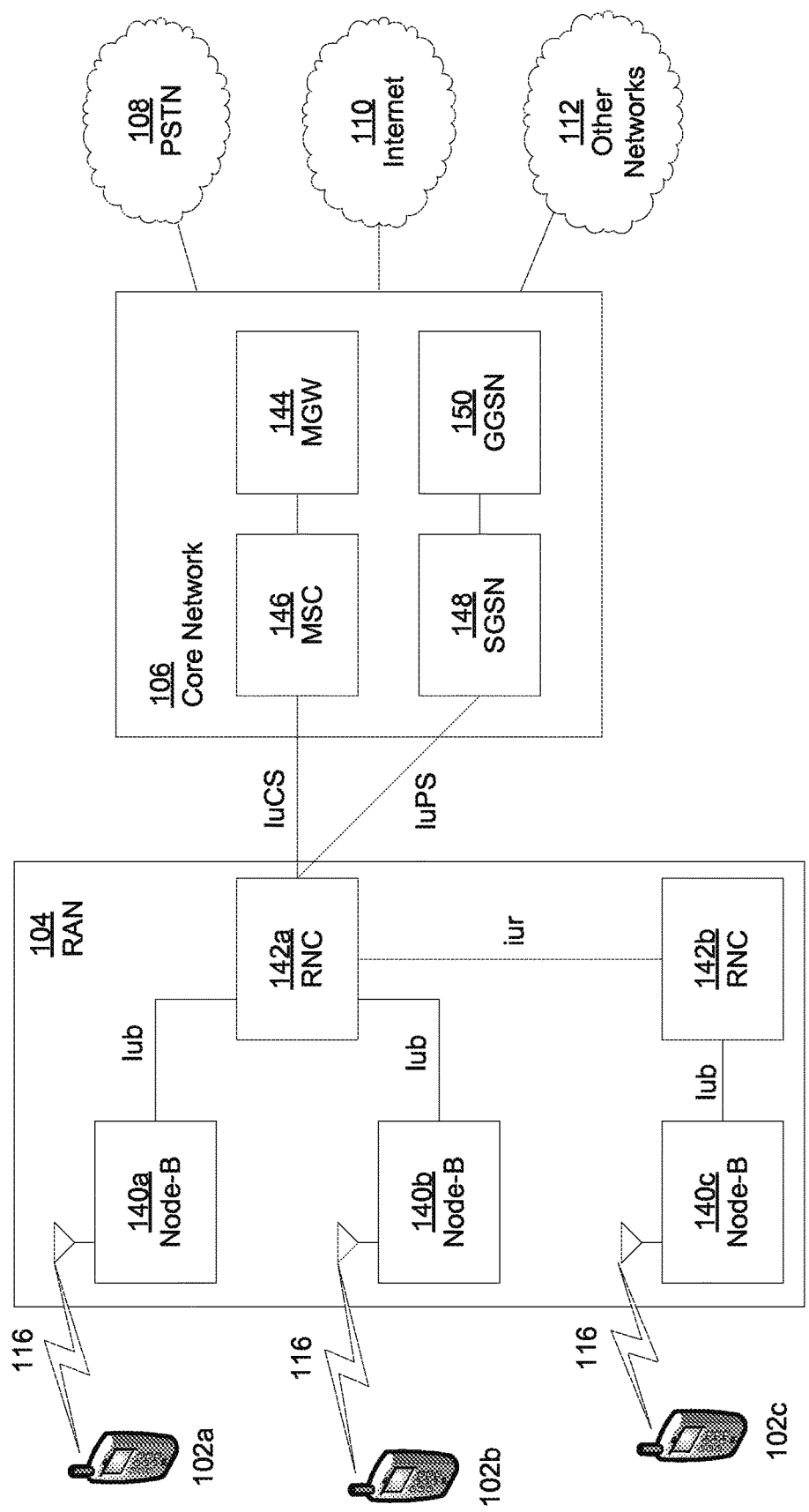
FIG. 1C is a system diagram of an example radio access network and an example core network that may be used within the communications system illustrated in FIG. 1A.

FIG. 1C is a system diagram of an example RAN 103 and core network 106. The RAN 103 may employ a UTRA radio technology to communicate with the WTRUs 102a, 102b, 102c over the air interface 115. The RAN 103 may also be in communication with the core network 106. As shown in FIG. 1C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with the disclosed subject matter.

As shown in FIG. 1C, the Node-Bs 140a, 140b may be in communication with the RNC 142a. Additionally, the Node-B 140c may be in communication with the RNC142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106 it will be appreciated that any one of these elements may be owned and/or operated by an entity other than the core network operator.

The RNC 142a in the RAN 103 may be connected to the MSC 146 in the core network 106 via an IuPS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional landline communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

The core network 106 may also be connected to the networks 112, which may include other wired or wireless networks that are owned and/or operated by other service providers.

Figure 1D:
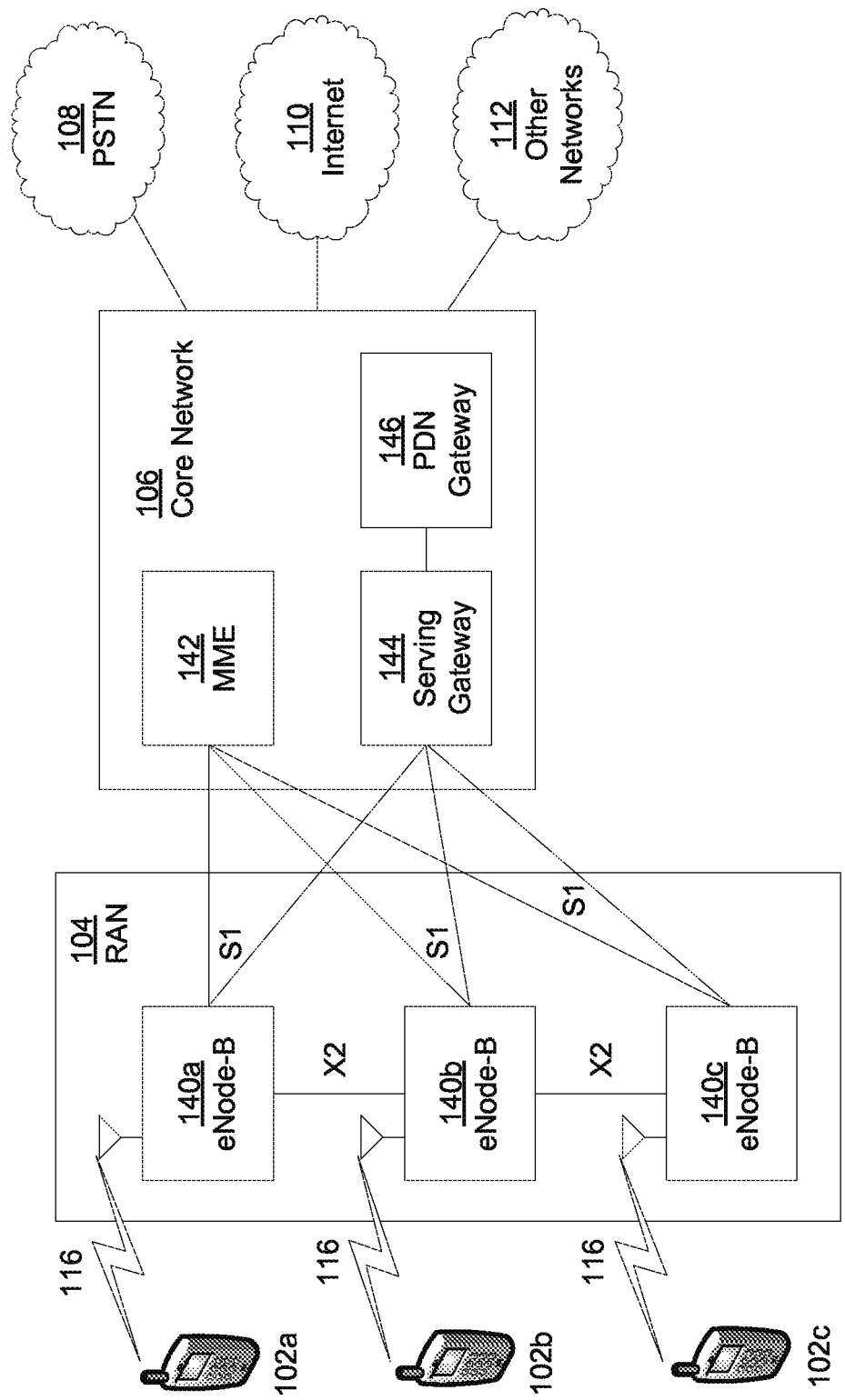
FIG. 1D is a system diagram of an another example radio access network and another example core network that may be used within the communications system illustrated in FIG. 1A.

FIG. 1D is a system diagram of an example RAN 104 and core network 107. As noted above, the RAN 104 may employ an E-UTRA radio technology to communicate with the WTRUs 102a, 102b, 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with the disclosed subject matter. The eNode-Bs 160a, 160b, 160c may each include one or more transceivers for communicating with the WTRUs 102a, 102b, 102c over the air interface 116. The eNode-Bs 160a, 160b, 160c may implement MIMO technology. Thus, the eNode-B 160a, for example, may use multiple antennas to transmit wireless signals to, and receive wireless signals from, the WTRU 102a.

Each of the erode-Bs 160a, 160b, 160c may be associated a particular cell (not shown) and may be configured to handle radio resource management decisions, handover decisions, scheduling of users in the uplink and/or downlink, and the like. As shown in FIG. 1D, the eNode-Bs 160a, 160b, 160c may communicate with one another over an X2 interface.

The core network 107 shown in FIG. 1D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional landline communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 1E:
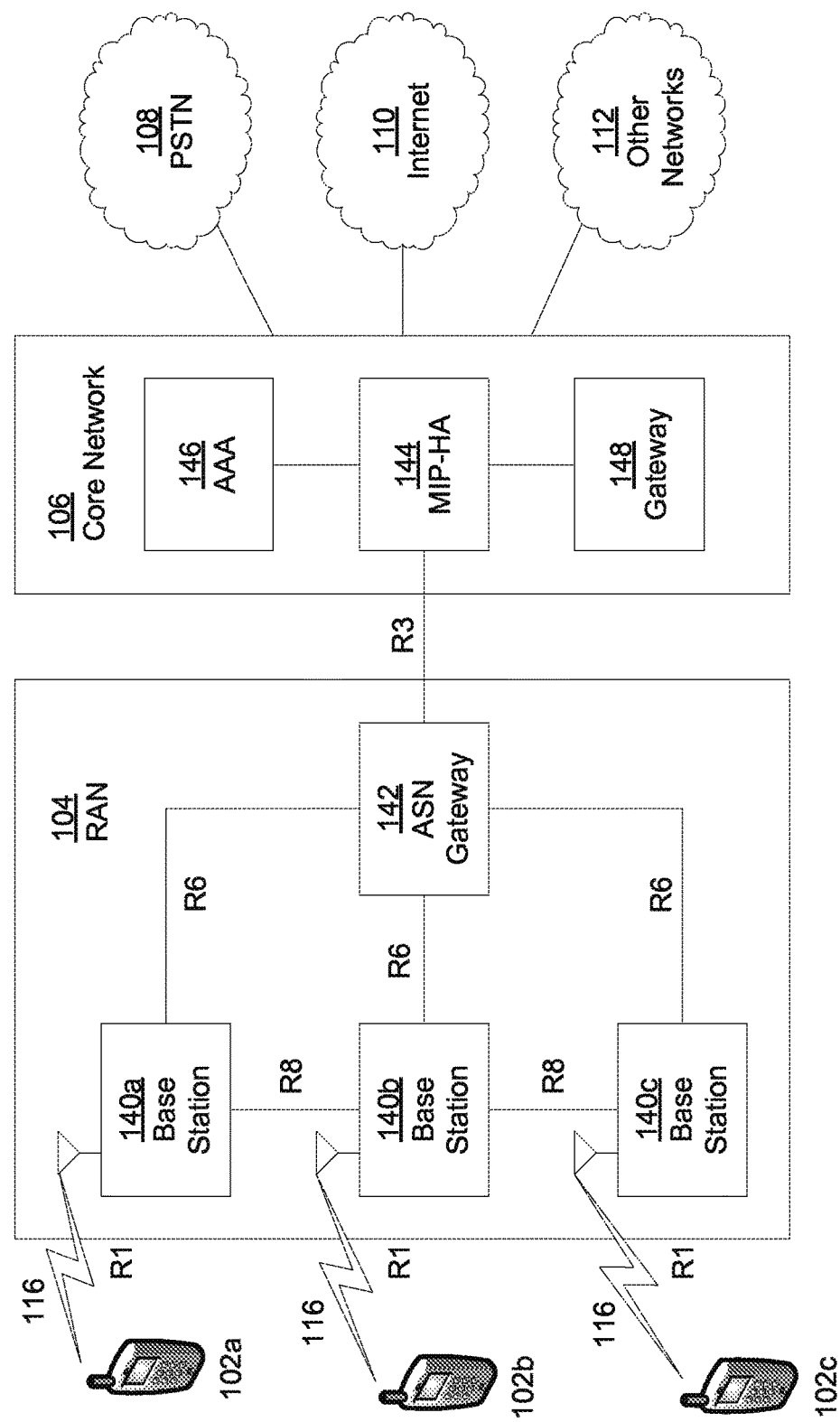
FIG. 1E is a system diagram of an another example radio access network and another example core network that may be used within the communications system illustrated in FIG. 1A.

FIG. 1E is a system diagram of an example RAN 105 and core network 109. The RAN 105 may be an access service network (ASN) that employs IEEE 802.16 radio technology to communicate with the WTRUs 102a, 102b, 102c over the air interface 117. The communication links between the different functional entities of the WTRUs 102a, 102b, 102c, the RAN 105, and the core network 109 may be defined as reference points.

As shown in FIG. 1E, the RAN 105 may include base stations 180a, 180b, 180c, and an ASN gateway 182, though it will be appreciated that the RAN 105 may include any number of base stations and ASN gateways while remaining consistent with the disclosed subject matter. The base stations 180a, 180b, 180c may each be associated with a particular cell (not shown) in the RAN 105 and may each include one or more transceivers for communicating with the WTRUs 102a, 102b, 102c over the air interface 117. The base stations 180a, 180b, 180c may implement MIMO technology. The base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 1E, the RAN 105 may be connected to the core network 109, The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional landline communications devices. In addition, the gateway 188 may provide the WTRUs 102a, 102b, 102c with access to the networks 112, which may include other wired or wireless networks that are owned and/or operated by other service providers.

Although not shown in FIG. 1E, the RAN 105 may be connected to other ASNs and the core network 109 may be connected to other core networks. The communication link between the RAN 105 the other .ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

Machine type communication architectures (e.g., M2M architectures, 3GPP MTC architectures, etc.), may not allow MTC entities, such as MTC WTRUs, MTC ASs, and SCSs to discover MTC services offered via the 3GPP core network (CN). Instead, contact information may be provisioned within MTC entities or within the CN, e.g., Home Location Register (HLR) or Home Subscriber Server (HSS). This may effectively configure MTC entities statically and may not provide flexibility to MTC entities to choose which services they use and/or provide. This type of provisioning may complicate or prevent redeployment of MTC entities, e.g., in different networks, with different operators, with a different service, etc.

Machine type communication architectures may not support discovery mechanisms within the network to take into account situational context, such as the online or offline state of an MTC WTRU or available bandwidth or congestion within a particular region of the CN, etc. Without this type of support, the 3GPP standard may not be able to provide value-added services, such as balancing the load on the network Of on individual MTC entities by dynamically controlling which MTC entities discover each other based on situational context information.

According to the disclosed subject matter, a wireless communication network, such as a 3GPP Core Network (CN), may include a Discovery Server. The Discovery Server may be used to query and find services offered by the 3GPP CN as well as services offered by entities that interface to the 3GPP CN. Some examples of the types of service related queries supported by the Discovery Server may include, without limitation, queries based on the type of MTC entity (e.g., WTRU, SCS, AS), type of services hosted on the entity (e.g., ETSI M2M, Smart Energy, Building Automation, eHealth, etc.), availability times of the entity (e.g., active or sleep times), types of protocols supported (HTTP, CoAP, etc.), levels of QoS supported, MTC-IWF services, and the like.

The Discovery Server and/or the 3GPP CN (e.g., in the MTC-IWF) may allow the CN to pass situational context (e.g., context information) and defined policies to the Discovery Server to have it provide context-aware and policy-based discovery services. For example, the CN may pass situational context, such as the current available bandwidth within a particular region of the network, along with policies to prevent MTC entities in overloaded regions of the network from being discovered. Using this context and policy information, the Discovery Server may help balance the load on the network or on a specific MTC entity or entities by dynamically controlling which MTC entities discover one another and communicate with one another.

The Discovery Server may enable discovery of 3GPP Machine Type Communication (MTC) services. The Discovery Server may be used for non-3GPP and non-MTC scenarios. The Discovery Server may be integrated into a 3GPP2 network. The Discovery Server is not limited to 3GPP networks.

MTC entities (e.g., WTRUs, SCSs, ASs) may use the Discovery Server to find CN services and services offered by other MTC entities. MTC WTRU application may use the Discovery Server to discover an SCS, an AS MTC application, or an MTC WTRU application. An SCS can use the Discovery Server to discover an MTC WTRU application, an AS MTC application, MTC-IWF, another SCS, etc. An MTC-IWF may use the Discovery Server to discover another MTC-IWF. An AS MTC application may use the Discovery Server to discover an SCS, an MTC WTRU application, an AS MTC application, etc.

Core network entities, such as the MTC-IWF, Home Location Register (HLR), Home Subscriber Server (HSS), Serving GPRS Support Node (SGSN), Policy and Charging Rules Function (PCRF), User Data Repository (UDR), or Mobility Management Entity (MME), may push context and/or policy information to the Discovery Server to allow the Discovery Server to provide context-aware and policy-based discovery services. The Discovery Server may initiate communication with CN entities to pull context and policy information from them and/or to initiate actions such as triggering MTC WTRU.

Figure 2:
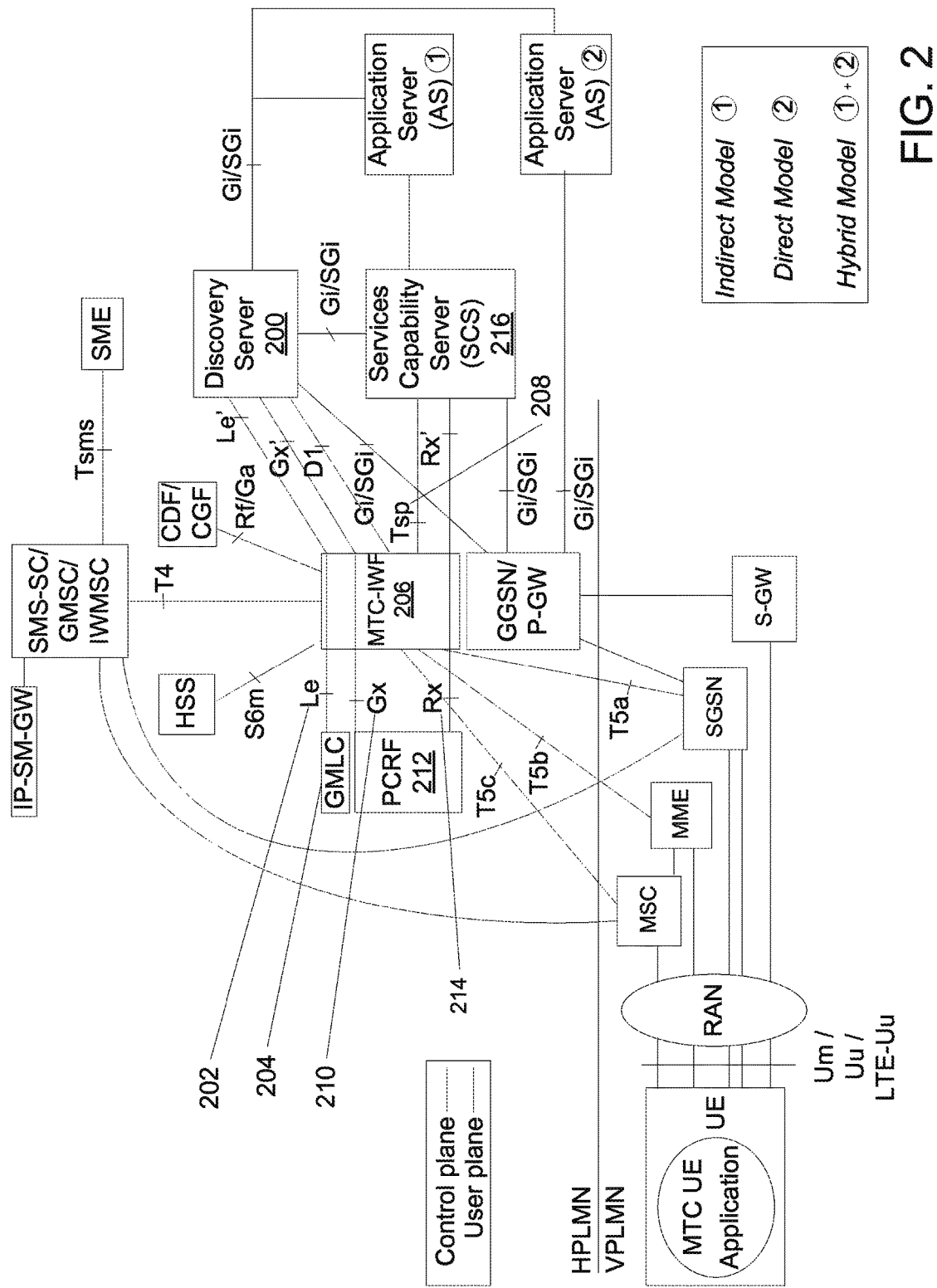
FIG. 2 illustrates an exemplary network configuration in which a Discovery Server resides outside a 3GPP core network (CN).
Figure 3:
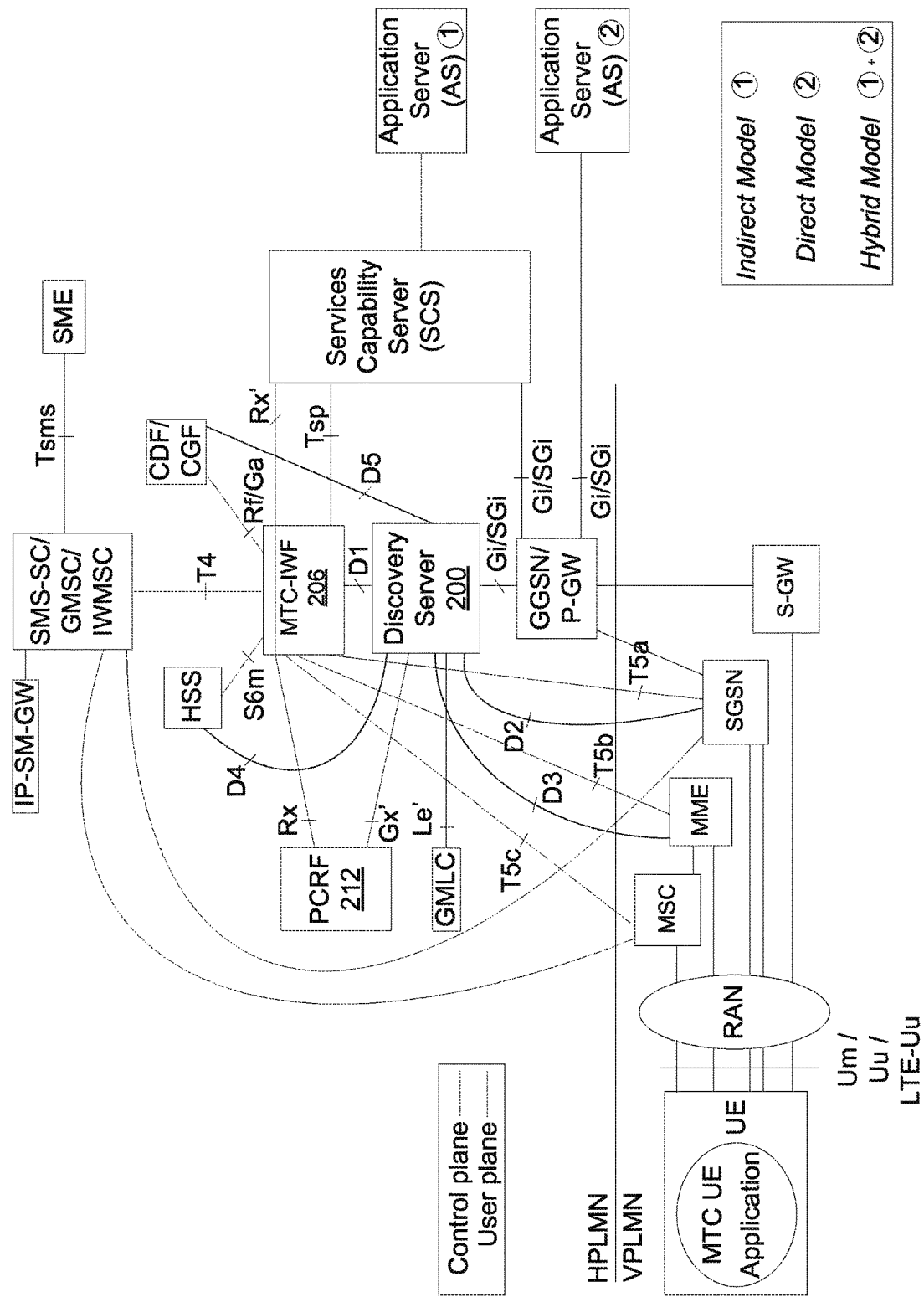
FIG. 3 illustrates an exemplary network configuration in which a Discovery Server resides inside a 3GPP CN boundary as a new CN element.
Figure 4:
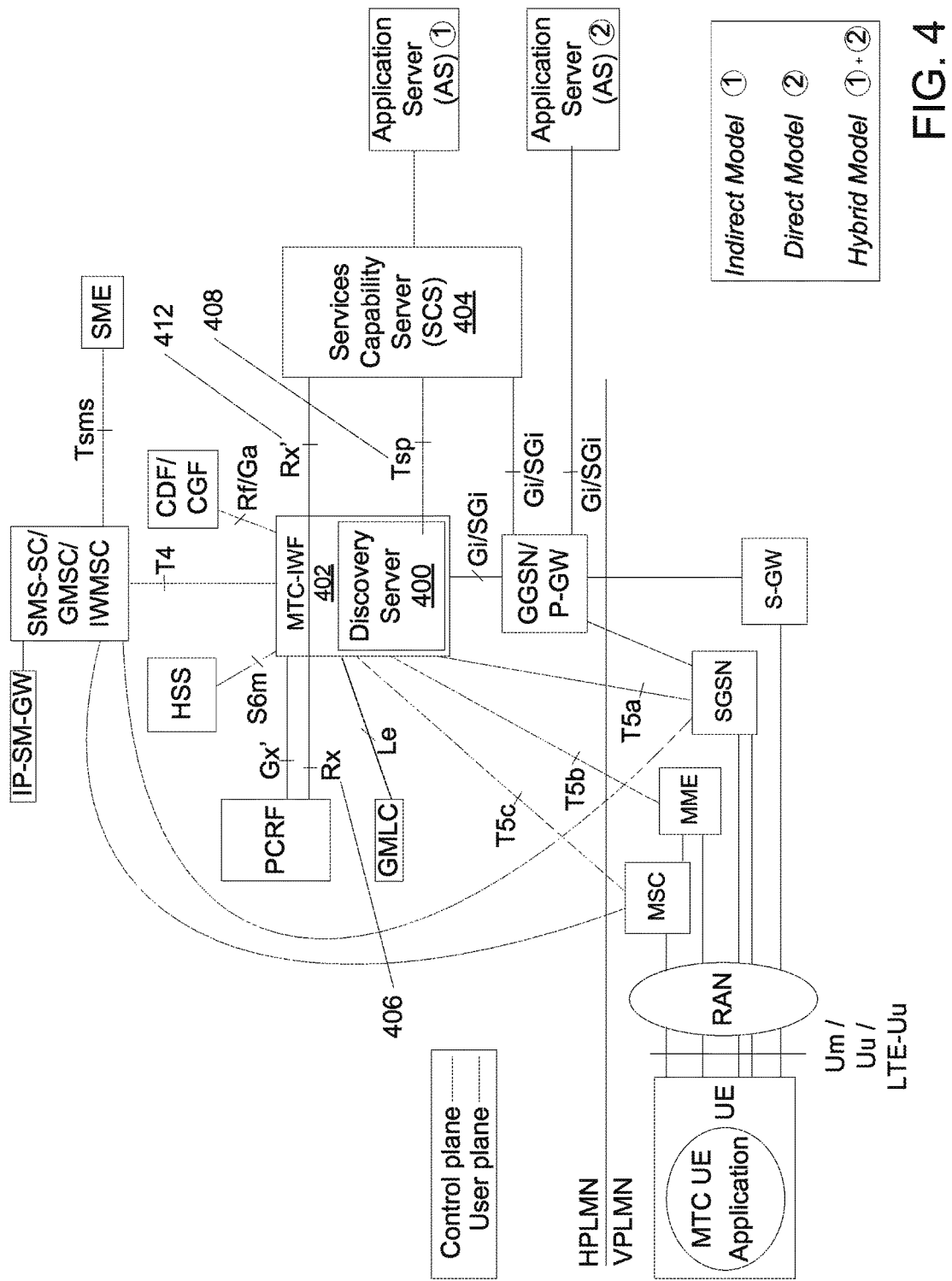
FIG. 4 illustrates an exemplary network configuration in which a Discovery Server resides inside a 3GPP CN boundary and is merged with a function of another entity.

Entities residing in the 3GPP CN and entities connecting to the 3GPP CN may have access to a Discovery Server. The Discovery Server may reside outside the 3GPP CN boundary as shown in FIG. 2, inside the 3GPP CN boundary as a CN element as shown in FIG. 3, or inside the 3GPP CN boundary and merged with a function such as the MTC-IWF as shown in FIG. 4. The Discovery Server may be partially or wholly merged with other CN functions such as Access Network Discovery and Selection Function (ANDSF), as defined 3GPP Specification 23.402. Doing so may complement these CN functions and provide the Discovery Server with integrated access to context and policy information from CN components (e.g., network load, handover decisions, etc.).

As shown in FIG. 2, a Discovery Server 200 may reside outside the 3GPP CN. The Discovery Server 200 may be under the control of an MTC Service Provider or a Mobile Network Operator (MNO). When the Discovery Server 200 resides outside the 3GPP CN, the Discovery Server 200 may support the ability to authenticate with the 3GPP CN to ensure secure communications.

The Discovery Server 200 may use a number of reference points, e.g., such as reference points defined by the 3GPP standard. For example, the 3GPP standard defines an Le reference point 202. This reference point 202 may be used by the Discovery Server 200 to obtain location information from the CN's Gateway Mobile Location Center (GMLC) function 204. The Le reference point 202 can be routed directly through an MTC-IWF 206 and connected to the Discovery Server 200 for scenarios where the Discovery Server 200 is authenticated to access the GMLC 204 (e.g., the MNO owns the Discovery Server 200). The MTC-IWF 206 can provide some level of proxying, filtering, or translation of the Le reference point 202 to allow the Discovery Server 200 to indirectly access location information from the CN for cases where it is not authenticated to access the CN's GMLC function 204 (e.g., over a Tsp reference point 208 defined by the 3GPP standard). The protocol on the Le reference point 202 may conform, for example, with the Open Mobile Alliance's LIF-MLP specification, see 3GPP Specification 23.141 and LIF TS 101, entitled "Mobile Location Protocol Specification." A client that requests the location of an MS may provide an MSID, which may be an MSISDN, IMSI, URI, etc. The MSID may be an External MTC identifier, which may be an operator-specific identity. The LIF TS 101 specification supports operator-specific identities.

The 3GPP standard also defines a Gx reference point 210. This reference point 210 may be used by the Discovery Server 200 to obtain policy information from the core network, e.g., when the Discovery Server 200 is properly authenticated to do so. The Gx reference point 210 may be routed directly through the MTC-IWF 206 and connected to the Discovery Server 200, e.g., where the Discovery Server 200 is properly authenticated to access a Policy Control and Charging Rules Function (PCRF) 212 (e.g., the MNO owns the Discovery Server 200). The MTC-IWF 206 can provide some level of proxying, filtering, or translation of the Gx reference point 210 to allow the Discovery Server 200 to indirectly access location information from the CN for cases where it is not authenticated to access the CN's PCRF 212, e.g., over the Tsp reference point 208 defined by the 3GPP standard.

The 3GPP standard may define an Rx reference point 214. A Services Capability Server (SCS) 216 may use the Rx reference point 214 to provide charging rules to the core network, e.g., when the Discovery Server 200 is properly authenticated to do so. The charging rules may be applied to services that may be offered by the SCS 216. The Rx reference point 214 may be routed directly through the MTC-IWF 206 and connected to the Discovery Server 200, for example, where the Discovery Server 200 is properly authenticated to access the PCRF 212 (e.g., the MNO owns the Discovery Server 200). The MTC-IWF 206 can provide some level of proxying, filtering, or translation of the Rx reference point 214, for example, to allow the Discovery Server 200 to indirectly access location information from the CN for cases where it is not authenticated to access the CN's PCRF 212 (e.g., over the Tsp reference point 208).

As depicted in FIG. 3, a Discovery Server 300 may reside inside the 3GPP CN. When the Discovery Server 300 resides inside the 3GPP CN, it may be deployed as a standalone function in the CN. This may not change the functionality of the Discovery Server; it may imply different ownership and security scenarios. The Rx', Le', and Gx' reference points may map to the Rx, Le, and Gx reference points, e.g., defined by the 3GPP standard. The Rx', Le', and Gx' reference points may be modified versions of the Rx, Le, and Gx reference points. Their functionality may be added to the Tsp reference point.

As shown in FIG. 4, a Discovery Server 400 may reside inside the 3GPP CN and may be deployed as part of an MTC-IWF 402. To provide MTC WTRUs access to the Discovery Server 400, e.g., to create Discovery Registry records, the MTC-IWF 402 may support a connection to a Gi/SGi reference point 410. The functionality defined on a D1 reference point, e.g., as disclosed herein, may still be applicable; it may not be standardized by 3GPP. The functionality defined on D2, D3, D4 and D5 reference points, e.g., as disclosed herein, may be applicable and may be standardized by 3GPP as separate reference points. The functionality of MTC-IWF reference points (e.g., T5a, T5b, T5c, S6m, Rf/Ga) may be enhanced to include this functionality. The MTC-IWF 402 may support Rx functionality, e.g., to enable a Services Capability Server (SCS) 404 to provide charging rules to the core network. Rx' reference point 412 may map directly to an Rx reference point 406 or be a modified version of Rx (e.g., Rx'). Its functionality may be added to a Tsp reference point 408.

Figure 5:
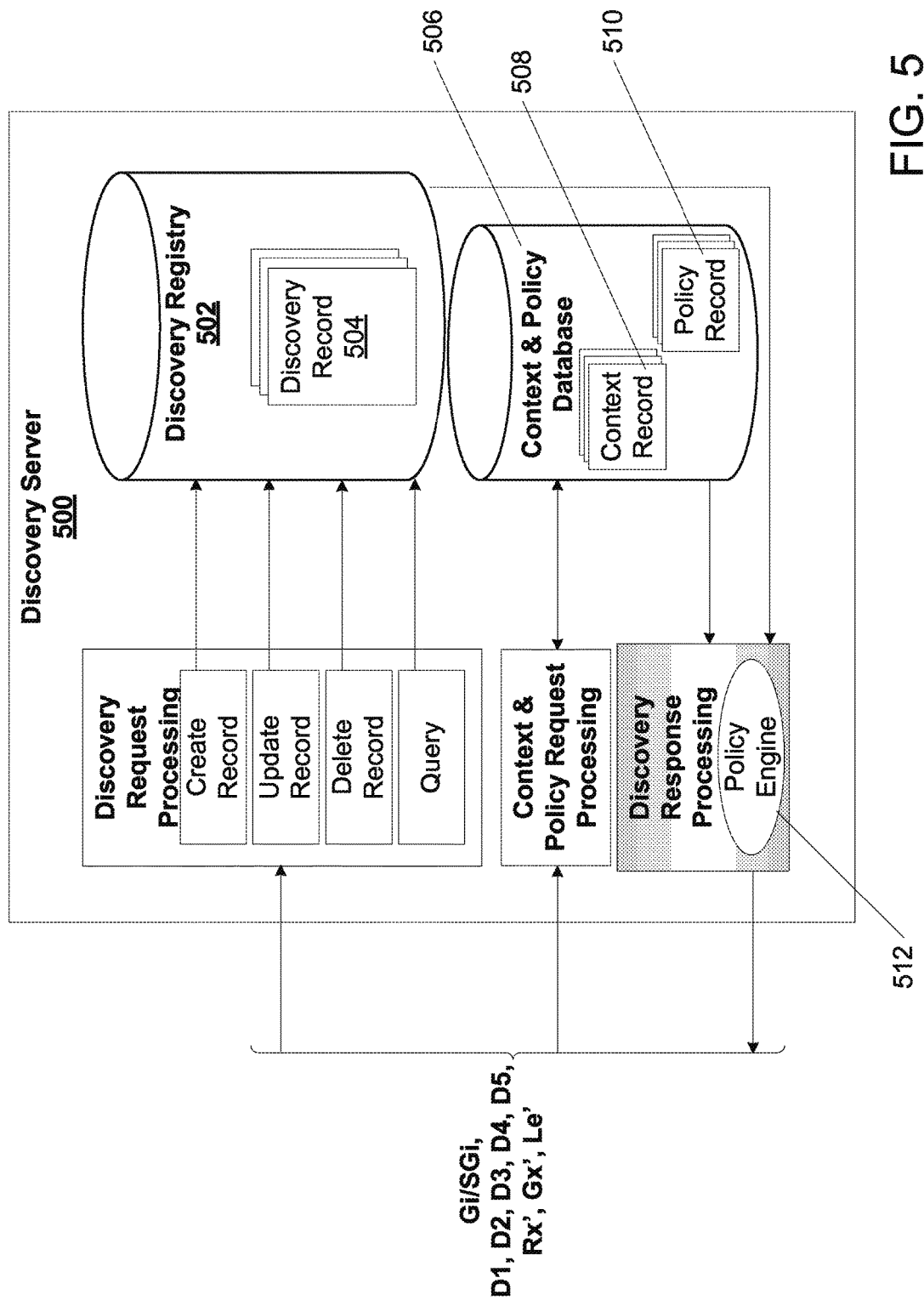
FIG. 5 depicts an example architecture of a Discovery Server.

FIG. 5 depicts an example architecture of a Discovery Server 500. Although the logical functions may be described as separate entities, functions may be combined or grouped together. For example, discovery, context, and/or policy records may be combined into a single record. The individual functions may be located in a centralized entity such as the Discovery Server 500 or distributed both inside and outside of the core network. For example, the policy records may be stored in the CN's Policy and Charging Control (PCC), Subscription Profile Respository (SPR), or User Data Repository (UDR) and accessed via the PCRF.

The Discovery Server 500 may support a number of functions. For example, the Discovery Server 500 may support authenticating MTC entities and CN entities to allow them to register themselves and make requests to the Discovery Server 500. The Discovery Server 500 may incorporate a Discovery Registry 502 that may comprise Discovery Records 504 that may hold discovery related information for MTC entities. Discovery Records 504 may be created, modified, and deleted. The Discovery Server 500 may support queries against the Discovery Registry 502, e.g., based on one or more record fields. A Context Database 506 may comprise Context Records 508 that hold context information and/or Policy Records 510 that may hold discovery policies for MTC entities. The Discovery Server 500 may support accepting context information and policy updates from CN entities, such as from the MTC-IWF, SGSN, MME, GGSN, HLR/HSS, GMLC, PCRF, etc., and providing policy-driven discovery services to MTC entities. Context information may include, but is not limited to, network bandwidth availability for a particular MTC entity and the online or offline state of a particular MTC entity. Policies may include, but are not limited to, excluding overloaded MTC entities or MTC entities residing in overloaded regions of the network from being discovered. The Discovery Server 500 may communicate with other Discovery Servers in order to collaborate on discovery queries and share discovery information, Discovery Servers may be deployed hierarchically, e.g., similarly to hierarchical deployments of domain name servers (DNSs).

The Discovery Server 500 may use a number of reference points that may not be defined in the 3GPP standard. Some of these reference points are referred to herein as the D1, D2, D3, D4, and D5 reference points. They may allow the CN entities (e.g., MTC-IWF, SGSN, MME, GGSN, HLR/HSS, GMLC, PCRF, etc.) to create or update Discovery Records 504 within the Discovery Server 500 on behalf of MTC entities of which the CN is aware. They may allow the CN entities to inform the Discovery Server 500 of situational context information related to MTC and CN entities that may be of value to the Discovery Server 500.

Using the D1, D2, D3, D4, and/or D5 reference points, CN entities may configure discovery policies within the Discovery Server 500, which may allow the Discovery Server 500 to provide policy-driven discovery services for MTC entities. This may be beneficial, for example, when an MTC WTRU comes online or goes offline, when the network connection to an SCS becomes overloaded and QoS is impacted, when an MTC WTRU location changes, etc. in these situations, the Discovery Server 500 may factor this information into its discovery responses, for example, to help load balance MTC WTRUs across multiple SCSs. CN entities may create policies to enforce who can create, update, retrieve and delete discovery records, context records, and policy records on the Discovery Server 500.

The D1, D2, D3, D4, and/or D5 reference points may allow CN entities (e.g., MTC-IWF) to make a request to the Discovery Server 500 to resolve an External Device Identifier (e.g., FQDN) to its public IP address. They may allow the Discovery Server 500 to initiate requests to CN entities to perform an action/service. For example, the SCS may request the MTC-IWF to trigger an MTC WTRU when the Discovery Server 500 responds to a discovery request which includes the MTC WTRU in the response.

In addition, the Discovery Server 500 may use a Gi/SGi Reference Point to implement discovery functions. MTC Entities, for example, may use the GI/SGi Reference Point to make Discovery Server requests, for example for themselves or on behalf of each other, e.g., SCS may make requests on behalf of an AS MTC application. These requests may include, for example, requests to create, update, or delete Discovery Records 504 and queries to the Discovery Server 500 to find MTC entities that provide particular services. MTC Entities may use the Gi/SGi Reference Point to create or update context or policy records. The Gi/SGi Reference Point may be used to support requests to resolve External Device Identifiers to public IP addresses, MSISDNs, or IMSIs.

The Discovery Server 500 may use an Le' reference point to allow the Discovery Server 500 to access the Location Services of the core network. The Le' reference point may map to the Le reference point defined by the 3GPP standard, may be a modified version of the Le reference point (e.g., Le'), etc. Its functionality may be added to the Tsp reference point defined by the 3GPP standard.

The Discovery Server 500 may use a Gx' reference point to allow the Discovery Server 500 to query the policy and charging control functions of the core network. The Gx' reference point may map to the Gx reference point defined by the 3GPP standard or may be a modified version of the Gx reference point (e.g., Gx'). its functionality may be added to the Tsp reference point defined by the 3GPP standard.

The Discovery Server 500 may use an Rx' reference point to allow the SCS to provide its charging and quality of service rules to the core network. The Rx' reference point may map to the Rx reference point defined by the 3GPP standard or may be a modified version of the Rx reference point, e.g., Rx'. Its functionality may be added to the Tsp reference point defined by the 3GPP standard.

Figure 6A:
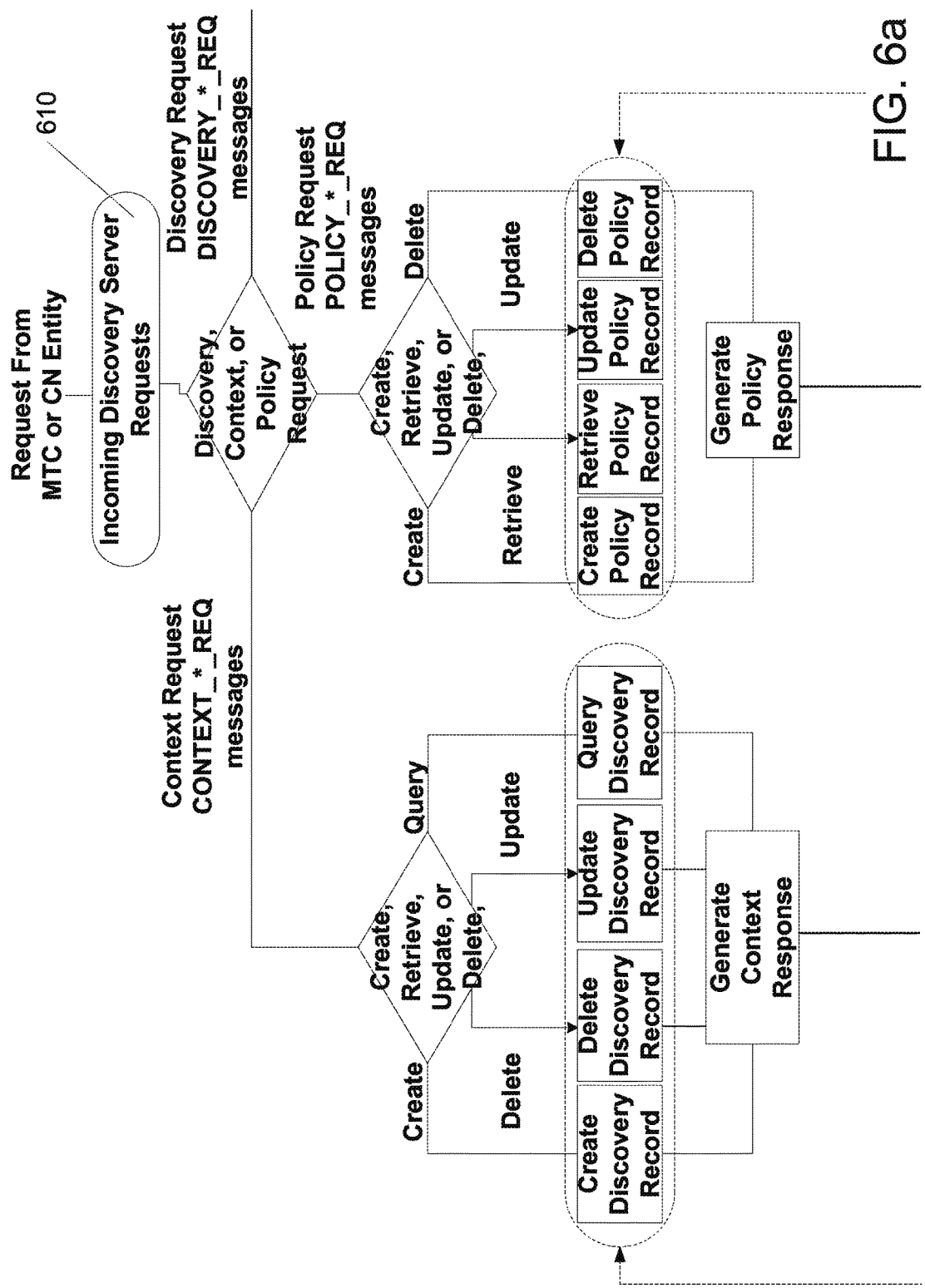
Figure 6B:
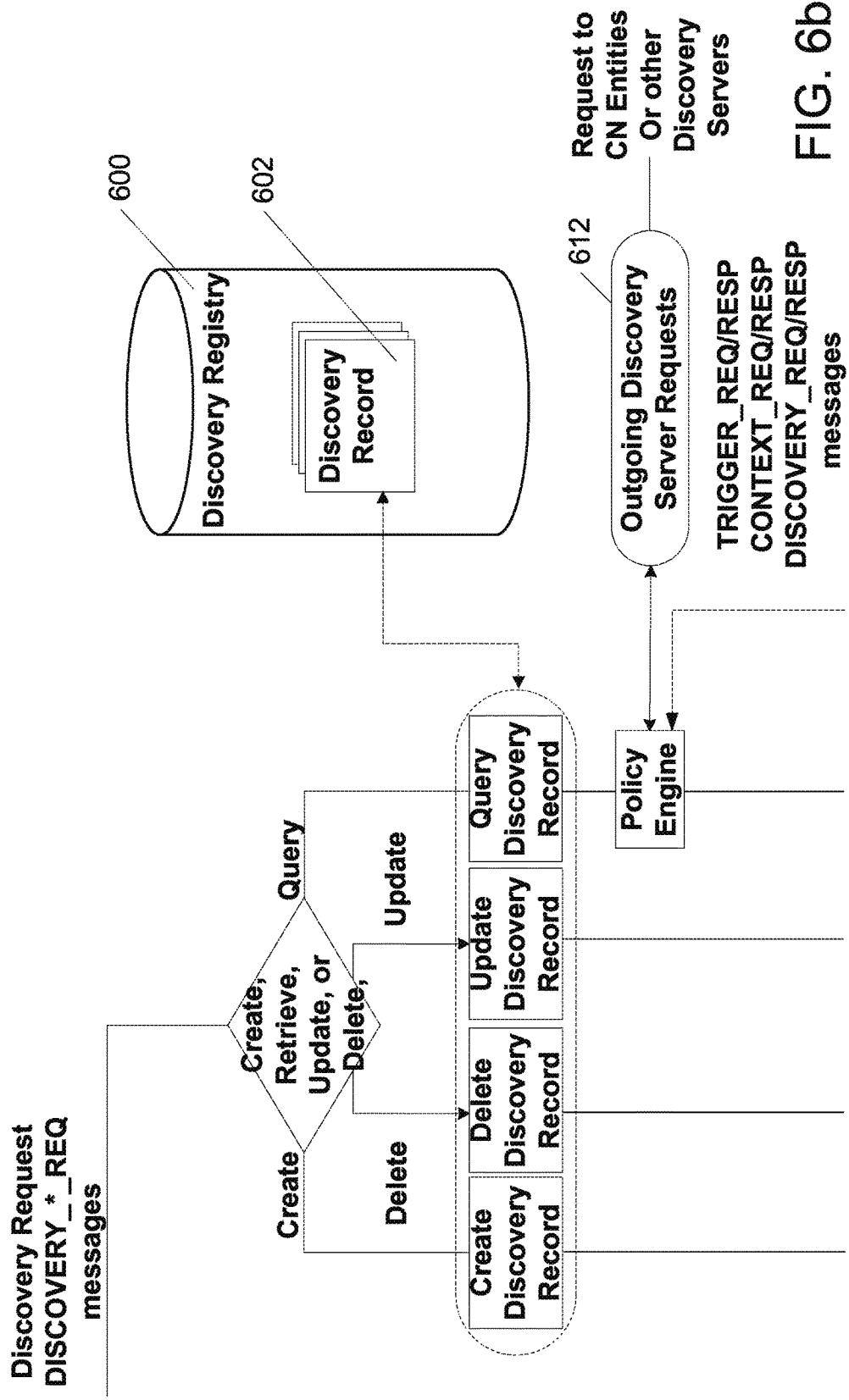
Figure 6C:
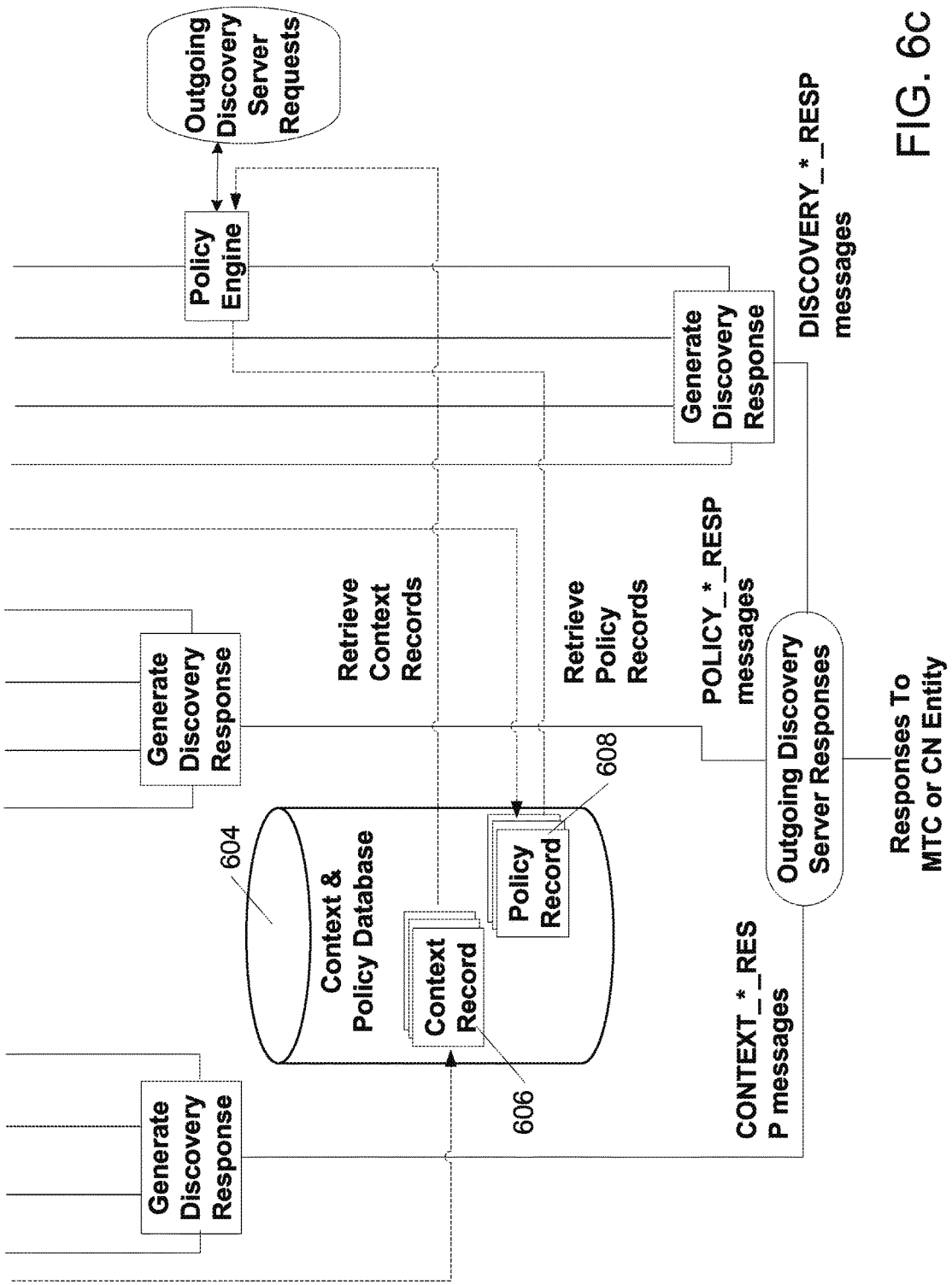

FIGS. 6A-6C depict an example flow diagram associated with the Discovery Server 500. The Discovery Server 500 may include a Discovery Registry 600 that comprises Discovery Records 602. Each Discovery Record 602 may comprise fields (e.g., attribute-value pairs) that may be used to store discovery information for MTC entities. Discovery Records 602 may be created, updated, deleted, and retrieved by various CN and MTC entities. Depending on the deployment scenario, restrictions or policies may be put in place to limit the CN and MTC entities that have permission to create, update, delete, and retrieve Discovery Records 602. Some examples of Discovery Record fields may include one or more of those shown in Table 1. A Discovery Record 602 may be extendable and additional fields and values may be added.

TABLE 1

| Field | Value(s) |
|---|---|
| entity_type | Type of Entity: E.g., MTC_SCS, MTC_WTRU, MTC_AS, MTC_IWF |
| entity_owner | Entity Owner: E.g., Name of M2M SP or MNO, etc. |
| public_id | Public Identifier: E.g., MSISDN, FQDN, URI |
| public_nw_addr | Public Network Address: E.g., IP Address, MSISDN, URI |
| 3gpp_id | 3GPP Internal NW Identifier: E.g., IMSI, MSISDN |

TABLE 1-continued

| Field | Value(s) |
|---|---|
| peer_scs[ ] | IDs of peer SCS this entity is registered to<br>E.g., 3GPP IDs, Public IDs, etc. |
| peer_AAA[ ] | IDs of peer AAA servers this entity is registered to<br>E.g., 3GPP IDs, Public IDs, etc. |
| group_id[ ] | Group Identifiers)"<br>E.g., Group(s) or cluster(s) that device or server is associated with |
| proxies[ ] | Addresses of proxies for entity:<br>E.g., M2M GW, Mobility Proxy (e.g., Home Agent) for device |
| service_types [ ] | List of Supported Service Types Provided:<br>E.g., ETSI M2M, Smart Energy, Building Automation, E-Health, etc. |
| sub_service_types [ ] | List of Supported Sub-Service Types Provided:<br>E.g, ETSI M2M: NSCL, GSCL, DSCL, DA, NA, GA, etc.<br>E.g., Smart Energy: Thermostat, Metering, Demand Response/Load Control, Coordinator, etc. |
| resources [ ] | List of Supported Resources Provided:<br>E.g., List of supported resources or path to a discovery resource |
| protocols [ ] | List of Supported Protocols:<br>E.g, HTTP, CoAP, etc. |
| content_types [ ] | List of Supported MIME Types:<br>E.g., text/plain, xml, exi, json, etc. |
| sleep_sched | Sleep Schedule:<br>E.g., Entity's availability schedule (e.g., Days, Hours, Minutes, Seconds, etc. that entity is available) |
| charging_rules[ ] | List of charging rule(s) for the discoverable application(s). The charging rules that are associated with the services provided by an SCS can be provisioned by the SCS via the Rx' reference point. The charging rules that are associated with the services provided by a WTRU can be provisioned when the WTRU subscription is created. The discovery server may use the Gx' reference point to obtain the charging rules. |
| qos_levels [ ] | List of Supported Level QoS:<br>E.g., Can stream X bytes per second, etc. |
| trigger_rate | Trigger Rate:<br>E.g., Min/Max trigger rate for proper operation |
| mtc_class | Class of MTC Entity:<br>E.g., Mobile Originate Only, Mobile, etc. |
| security_credentials[ ] | Security Key - Discovery Server can be co-located with security server and support both security and discovery functions. |
| context_key | A key that is used by the Discovery Server when requesting context information from the core network. The context key can be provisioned when the discovery record is created. The context key may be used for authentication with the core network when requesting context information for the associated MTC WTRU. |

The usage model of Discovery Records 602 may be flexible and may be adapted to several different deployments. A single Discovery Record 602 may be used for each MTC entity (e.g., WTRU, SCS, or AS). Multiple Discovery Records 602 may be used for each MTC entity. For example, three separate Discovery Records 602 may be used for an MTC WTRU hosting three WTRU MTC Applications.

A Discovery Record 602 may be created, updated, or deleted dynamically. For example, an MNO may create, update, or delete a Discovery Record when an account or subscription is set up for the MTC Entity (e.g., MTC WTRU). A Discovery Record 602 may be created, updated, or deleted by a CN, e.g., by MTC-IWF on behalf of the MTC WTRU, for example, when it registers or attaches. An SCS may create, update, or delete a Discovery Record 602 on behalf of the WTRU MTC Application or AS MTC Application when it registers to the SCS. The MTC entity itself may create, update, or delete a Discovery Record 602, e.g., if it is aware of the Discovery Server 500 and has the proper permissions to access and update the Discovery Server 500.

The Discovery Server 500 may incorporate a Context and Policy Database 604 that may comprise a set of Context Records 606 and/or a set of Policy Records 608. The Context Records 606 may comprise fields (e.g., attribute-value pairs) that may be used to store context information related to MTC entities or the CN. The Policy Records 608 may comprise fields (e.g., attribute-value pairs) that may be used to store policy information related to MTC entities or the CN and that are enforced by the Policy Engine. The Context and Policy Records 606, 608 stored in the Context and Policy Database 604 may be used by a Policy Engine 512 of the Discovery Server 500 to enable context-aware and policy-driven discovery services.

Context information may differ from discovery information in a number of ways. For example, context information may be dynamic, in that it may vary over time and may be situational in nature. Discovery information may be static in nature and may be situationally independent. Discovery information may be associated with a single MTC entity. Context information may be associated with multiple MTC entities and/or one or more CN entities.

Context information may be maintained in separate records from discovery information. For example, if the CN is congested in a certain region, many MTC WTRUs or SCSs in that region may not be desirable to use to use. Knowing this information, the Discovery Server may respond to discovery requests that do not include MTC WTRUs or SCSs in that region. As a result, congestion in the region of the CN can be controlled.

Context Records may be created, updated and deleted by various CN and MTC entities. Depending on the deployment scenario, restrictions or policies can be put in place to limit the CN and MTC entities that have the permissions to create, update, and delete the Context Records. Some examples of Context Record fields are presented in Table 2. Context Records may be extendable, and additional fields and values may be added.

TABLE 2

| Field | Value(s) |
| --- | --- |
| entity_type | Type of Entity:<br>E.g., MTC_SCS, MTC_WTRU, MTC_AS, MTC_IWF, CN_SGSN, CN_GGSN, CN_HSS, etc. |
| entity_owner | Entity Owner:<br>E.g., Name of M2M SP or MNO, etc. |
| public_id | Public Identifier:<br>E.g., MSISDN, FQDN, URI |
| public_nw_addr | Public Network Address:<br>E.g, IP Address, MSISDN, URI |
| 3gpp_id | 3GPP Internal NW Identifier:<br>E.g., IMSI, MSISDN |
| peer_entities[ ] | Contact info for peer network entities:<br>E.g., AAA, OMA-DM Servers associated with an SCS, etc. |
| group_address[ ] | Group Address(es)<br>E.g., Group(s) or clusters) that device or server is associated with |
| proxies[ ] | Addresses of proxies for entity:<br>E.g., M2M GW, Mobility Proxy (e.g. Home Agent) for device |
| connected_state | State that the entity is in:<br>E.g.:<br>Not Reachable (not triggerabie)<br>No IP Address but Triggerabie<br>Has an IP Address |
| sleep_state | Sleep State:<br>E.g., Online, Offline, etc. |
| geo_location | Geo-Location:<br>E.g., Location Coordinates, etc. |
| nw_location | Network Location:<br>E.g., Corresponding SGSN, S-GW, MME, Network Sub-Domain, Cell, etc. |
| avail_bandwidth | Current Available Bandwidth:<br>E.g., Current bandwidth available for a particular network domain/cell |
| avail_qos | Current Available QoS:<br>E.g., Current level of QoS for a particular network domain/cell |
| pricing[ ] | Current Pricing Information:<br>E.g., Current rates per level of QoS |

Policy Records 608 may provide a mechanism to configure policies and/or rules that the Discovery Server 500 may enforce when servicing discovery requests. The Policy Engine 512 of the Discovery Server 500 may enforce policies. Policies may differ from discovery or context information. Policy records may define policies that the Policy Engine 512 may enforce. Policies may not be limited to being bound to a single MTC entity, but may be associated with multiple MTC entities or with one or more CN entities. Policies may use fields defined in discovery and context records as policy inputs. Policy Records 608 may be created, updated, and deleted by various CN and MTC entities. Depending on the deployment scenario, restrictions may be put in place to limit the CN and MTC entities that have the permissions to create, update, and delete Policy Records 608.

Policies may be maintained in separate records from discovery and context information. Some examples of Policy Record fields and values are presented in Table 3. Policy Records are extendable, and additional fields and values can be added.

TABLE 3

| Field | Value(s) |
| --- | --- |
| policy_type | Policy is applicable to:<br>1) A specific entity (e.g., a particular Server),<br>2) A group of entities (e.g., addressable group)<br>3) Entities within a specific region of the network<br>4) A type of entity (e.g., Servers, Devices, etc.),<br>5) All entities owned by a particular MTC SP<br>6) All entities |
| entity_owner | Entity Owner:<br>E.g., Name of M2M SP or MNO, etc. |
| public_id | Public Identifier:<br>E.g., MSISDN, FQDN, URI |
| public_nw_addr | Public Network Address:<br>E.g., IP Address, MSISDN, URI |
| 3gpp_id | 3GPP Internal NW Identifier:<br>E.g., IMSI, MSISDN |
| group_addresses[ ] | List of Group Address(es):<br>E.g., Group(s) or cluster(s) that device or server is associated with policy[ ]<br>List of policies for the policy engine to enforce.<br>Policies can be written such that they use discovery and context record fields as inputs.<br>For example,<br>If (SCS has available bandwidth < VALUE) then exclude SCS |

The Discovery Server 500 may include a Policy Engine 512. For a query received by the Discovery Server 500, the Policy Engine 512 may determine if one or more applicable Policy Records 608 exist. For example, if the query is to discover an SCS, then the Policy Engine 512 may check if Policy Records 608 exist in the Discovery Server 500 that may be applicable to SCSs. If one or more applicable Policy Records 608 do exist, then the Policy Engine 512 may enforce these policies when processing the query. For example, a policy may define that discovery may be limited to SCSs having available bandwidth above a certain threshold.

Depending on the policy defined within a Policy Record 608, the Policy Engine 512 may analyze situational context from corresponding Context Records 606 and/or discovery information from Discovery Records 602. For example, the Policy Engine 512 may check if context records exist for a particular SCS and, if so, the SCS's available bandwidth. Using the information from the Context Records 606 and/or Discovery Records 602, the Policy Engine 512 may compute a response to the query, which it may return to the client that originated the discovery request. The discovery response may include discovery information that complies with policies defined in the applicable Policy Records 608. For example, the response may be limited to discovery information for SCS's with available bandwidth above the threshold, The Policy Engine 512 may support different policy formats. For example, the Policy Engine 512 may support a pre-defined set of Policy Engine Policies. The Policy Engine 512 may support a set of pre-defined policies that may be enabled or disabled via a Policy Record 608 and applied to certain MTC Entities, e.g., based on a 'Policy Type' field. The Discovery Server may create (e.g., automatically) a default Policy Record, for example, for each Discovery Record 602 that is created. This default policy record may comprise a list of supported policies that the Policy Engine 512 supports. By default, one or more policies may be disabled. An entity can retrieve this default Policy Record 608 and update it to enable the policies that it would like enforced, and then write this updated Policy Record 608 back to the Context and Policy Database 604.

The Policy Engine 512 may support configurable policies. The Policy Engine 512. may accept Policy Records 608 that may support a customizable 'Policy' field. The Policy field. can be customized using a policy syntax language. By way of example and not limitation, a policy may be used to limit loading on SCSs. Such a policy may use the example syntax:

If (SCS has available bandwidth<VALUE) then
  exclude SCS

By using the policy in the above example, the Policy Engine may enforce the rule that, for an SCS to be discovered, its available bandwidth must be above a threshold value defined by this policy. Using the context information stored in the context record, if available, for each SCS, the policy engine may compare an SCS's available bandwidth against the limit specified in this policy and determine whether that SCS's Discovery Record should be included or excluded in the response to a discovery query request.

A policy may be used to limit discovery of MTC WTRUs to those that are in the connected state. The following example policy may be used to prevent an MTC WTRU not in the connected state from being discovered:

If (MTC WTRUs connected_state!=CONNECTED)
  then exclude MTC WTRU

By using the policy in the above example, the policy engine may exclude MTC WTRUs from being discovered if they are not connected to the CN.

The Discovery Server may communicate a variety of messages. Table 4 presents a selection of non-limiting examples of such messages.

responses). Incoming requests 610 may include Discovery Requests/Responses (e.g., DISCOVERY_*_REQ/RESP in Table 4), Context Record Requests/Responses (e.g., CONTEXT_*_REQ/RESP), and/or Policy Record Requests/Responses POLICY_*_REQ/RESP). Outgoing requests 612 may include Discovery Server initiated MTC WTRU trigger requests (e.g., TRIGGER_REQ/RESP in Table 4) and/or Discovery Server requests to retrieve context information (e.g., location, online/offline status, IP address of MTC WTRUs).

The Discovery Server 500 may implement a set of call flows. These call flows may represent different discovery scenarios involving different combinations of MTC entities, but they are not intended to be exhaustive in nature. Due to the flexible nature of the Discovery Server 500, the Discovery Server features may be used alone or in combination with one another, as well as with different combinations of MTC and non-MTC entities.

Figure 7A:
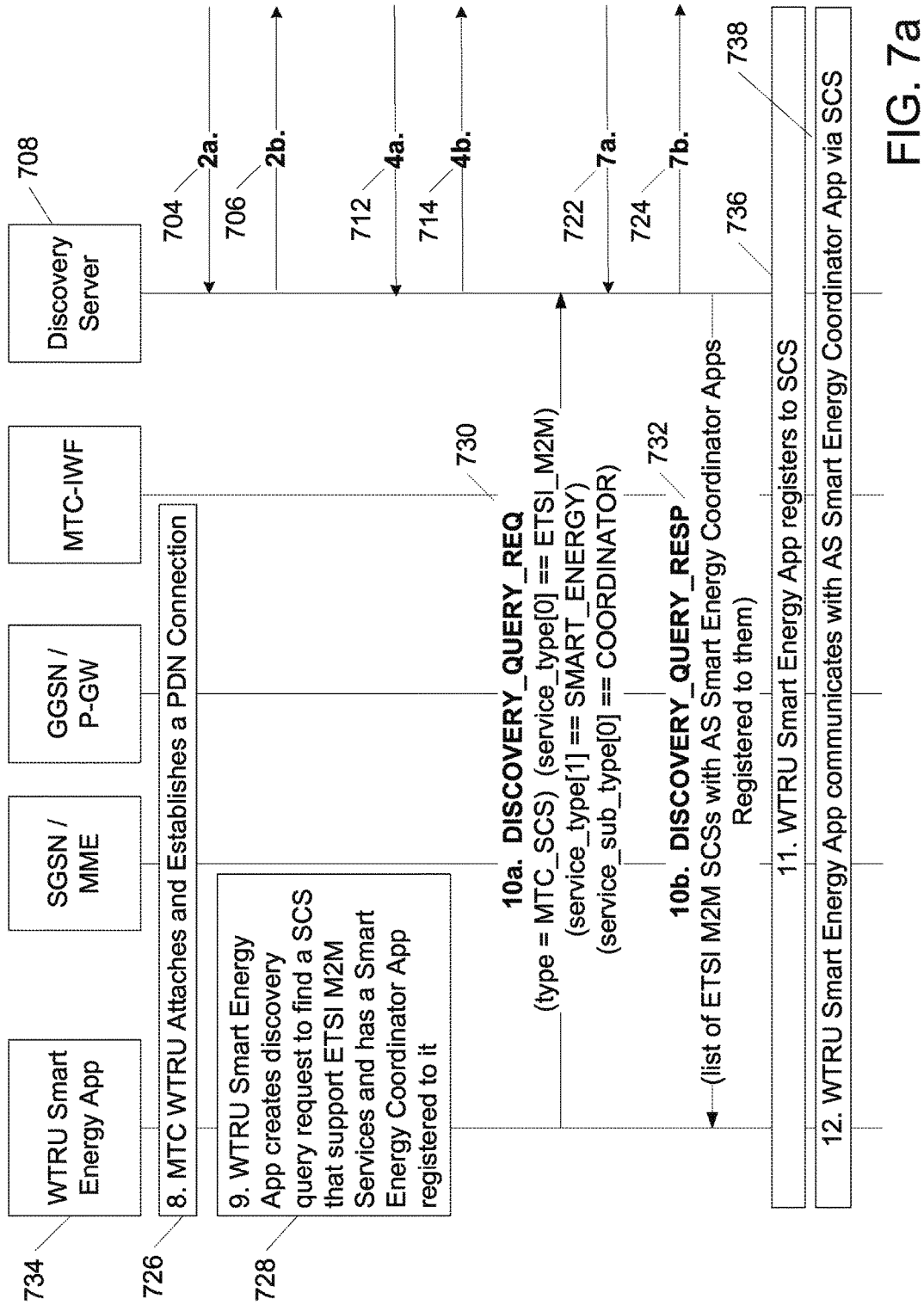
Figure 7B:
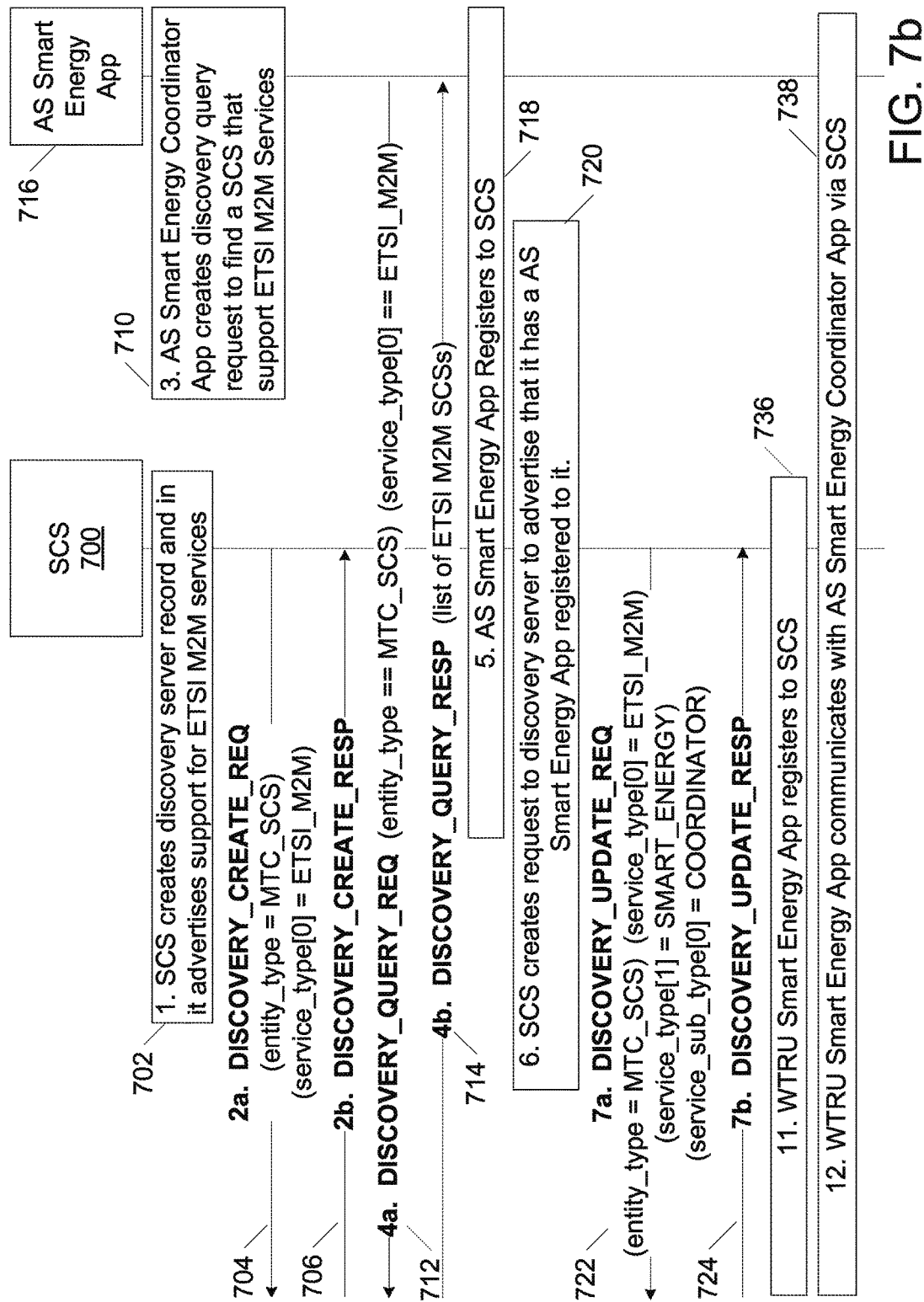

FIGS. 7A-7B illustrate an example call flow in which a WTRU MTC Application may discover an SCS 700 supporting European Telecommunications Standards (ETSI) M2M services having an AS MTC Application supporting Smart Energy services that is registered to it. In the call flow shown in FIGS. 7A-7B, at 702-706, the SCS 700 may create a Discovery Record on the Discovery Server 708, for example, using a DISCOVERY_CREATE_REQ message 704 that may comprise attribute-value pairs such as those listed in Table 1 above, in this example, the SCS may advertise that it supports ETSI M2M services. The Discovery Server 708 may respond with a DISCOVERY_CREATE_RESP message 706 indicating whether the Discovery Record was successfully created or not.

At 710-714, an AS Smart Energy Application 716, that may be pre-provisioned with the address of the Discovery Server 708, may query the Discovery Server 708, for

TABLE 4

| Message | Description |
| --- | --- |
| DISCOVERY_CREATE_REQ/RESP | Create Discovery Record in Discovery Server's Registry |
| DISCOVERY_QUERY_REQ/RESP | Query Discovery Server's Registry |
| DISCOVERY_UPDATE_REQ/RESP | Update Discovery Record in Discovery Server's Registry |
| DISCOVERY_DELETE_REQ/RESP | Delete Discovery Record in Discovery Server's Registry |
| CONTEXT_CREATE_REQ/RESP | Create Context Record in Discovery Server's Context Database |
| CONTEXT_RETRIEVE_REQ/RESP | Retrieve Context Record from Discovery Server's Context Database |
| CONTEXT_UPDATE_REQ/RESP | Update Context Record in Discovery Server's Context Database |
| CONTEXT_DELETE_REQ/RESP | Delete Context Record in Discovery Server's Context Database |
| POLICY_CREATE_REQ/RESP | Create Policy Record in Discovery Server's Context Database |
| POLICY_RETRIEVE_REQ/RESP | Retrieve Policy Record from Discovery Server's Policy Database |
| POLICY_UPDATE_REQ/RESP | Update Policy Record in Discovery Server's Policy Database |
| POLICY_DELETE_REQ/RESP | Delete Policy Record in Discovery Server's Policy Database |
| TRIGGER_REQ/RESP | Discovery Server request to CN to trigger MTC WTRU |
| CONTEXT_REQ/RESP | Discovery Server request to CN for latest context information from a particular CN entity and for a particular piece of context information (e.g., location, online/offline status of MTC WTRU, IP address of MTC WTRU, etc.) |

These messages may be characterized as incoming requests 610 to the Discovery Server 500 (and corresponding outgoing responses) or outgoing requests 612 initiated by the Discovery Server 500 (and corresponding incoming example, using a DISCOVERY_QUERY_REQ message 712 that may comprise a query to find an SCS that supports the services it desires. The query may be qualified with one or more of the fields that are listed in the Discovery Record shown in Table 1. The Discovery Server 708 may respond with a DISCOVERY_QUERY_RESP message 714 that may comprise a list of SCS Discovery Record(s) that match the query.

The AS Smart Energy Application 716 may be looking for an SCS with ETSI M2M services. At 718, from the discovery query response, the AS Smart Energy Application 716 may select and register to one or more SCSs. When registering to the SCS 700, the AS Smart Energy Application 716 may inform the SCS 700 of the services that it supports, e.g., Smart Energy Coordinator. In this example, the AS Smart Energy Application 716 may support Smart Energy Coordinator services and may be searching for compatible WTRU Smart Energy Applications that may use Smart Energy Coordinator services for which the AS Smart Energy Application 716 can charge them.

At 720-724, the SCS 700 may update a Discovery Record on the Discovery Server, for example, using a DISCOVERY_UPDATE_REQ message 722, to include the services that the registered AS Smart Energy Application 716 supports. The Discovery Server 700 may respond with a DISCOVERY_UPDATE_RESP message 724 that may indicate whether the Discovery Record was successfully updated or not. By doing this, the SCS 700 may advertise these services to potential MTC entities (e.g., MTC WTRUs) looking for these services. The SCS 700 may charge the AS Smart Energy Application 716 for this advertising service. In this example, the AS Smart Energy Application 716 may support Smart Energy Coordinator services.

At 726, an MTC WTRU may attach to the network and may establish a PDN connection. At 728-732, a WTRU Smart Energy Application 734 that may be pre-provisioned with the address of the Discovery Server 708 may query the Discovery Server 708, for example, using a DISCOVERY_QUERY_REQ message 730 that may comprise a query to find an SCS that supports the services it desires. The WTRU Smart Energy Application may use an SCS that supports ETSI M2M services and has an AS Smart Energy Application registered to it that supports Smart Energy Coordinator services. The Discovery Server 708 may respond with a DISCOVERY_QUERY_RESP message 732 that may comprise a list of SCS Discovery Record(s) that match the query.

At 736, from the discovery query response, the WTRU Smart Energy Application may select and register to one or more SCSs. When registering to an SCS, the WTRU Smart Energy Application 734 may inform the SCS of the services that it supports. At 738, the WTRU Smart Energy Application 734 and AS Smart Energy Application 716 may communicate with one another via the ETSI M2M services provided by the SCS.

FIGS. 8A-8B illustrate an example call flow in which an AS MTC Application may discover an SCS 800 supporting ETSI M2M services having a WTRU MTC Application supporting Smart Energy services that is registered to it. At 802-806, an SCS 800, that may be pre-provisioned with the address of a Discovery Server 808, may create a Discovery Record on the Discovery Server 808 using a DISCOVERY_CREATE_REQ message 804 that may comprise attribute-value pairs such as those listed in Table 1. The SCS 800 may advertise that it supports ETSI M2M services. The Discovery Server 808 may respond with a DISCOVERY_CREATE_RESP message 806 that may indicate whether the Discovery Record was successfully created or not.

At 810, an MTC WTRU may attach to the network and may establish a PDN connection. At 812-816, a WTRU Smart Energy Thermostat Application 818, which may be pre-provisioned with the address of the Discovery Server 808, may query the Discovery Server 808, for example, using a DISCOVERY_QUERY_REQ message 814 that may comprise a query to find an SCS that supports the services it desires. The query may be qualified with one or more of the fields that are listed in the Discovery Record shown in Table 1. The Discovery Server 808 may respond with a DISCOVERY_QUERY_RESP message 816 that may comprise a list of SCS Discovery Record(s) that match the query. The WTRU MTC Application may be looking for an SCS with ETSI M2M services.

At 820, e.g., based on the discovery query response, the WTRU Smart Energy Thermostat Application 818 may select and register to one or more SCSs. When registering to the SCS 800, the WTRU Smart Energy Thermostat Application 818 may inform the SCS 800 of the services that it supports. The WTRU Smart Energy Thermostat Application 818 may support Thermostat Smart Energy services and may be searching for compatible AS Smart Energy Applications that may use Smart Energy services for which the WTRU Smart Energy Thermostat Application 818 can charge them.

At 822-826, the SCS 800 may update a Discovery Record on the Discovery Server 808, for example, using a DISCOVERY_UPDATE_REQ message 824 to include the services that the registered WTRU Smart Energy Application 818 supports. The Discovery Server 808 may respond with a DISCOVERY_UPDATE_RESP message 826 that may indicate whether the Discovery Record was successfully updated or not. By doing this, the SCS 800 may advertise these services to potential MTC entities, such as MTC WTRUs, looking for these services. In addition, the SCS 800 may charge the WTRU Smart Energy Thermostat Application 818 for this advertising service. The WTRU Smart Energy Thermostat Application 818 may support Smart Energy services.

At 828-832, an AS Smart Energy Application 834, that may be pre-provisioned with the address of the Discovery Server 808, may query the Discovery Server 808, for example, using a DISCOVERY_QUERY_REQ message 830 that may comprise a query to find an SCS that supports the services it desires. The AS Smart Energy Application 834 may use an SCS that supports ETSI M2M services and has a WTRU Smart Energy Application registered to it that supports Thermostat Smart Energy services. The Discovery Server 808 may respond with a DISCOVERY_QUERY_RESP message 832 that may comprise a list of SCS Discovery Record(s) that match the query.

At 836, e.g., based on the discovery query response, the AS Smart Energy Application 834 may select and register to one or more SCSs. When registering to the SCS 800, the AS Smart Energy Application 834 may inform the SCS 800 of the services that it supports. The AS Smart Energy Application 834 may support Smart Energy services At 838, the WTRU Smart Energy Application 818 and AS Smart Energy Application 834 may communicate with one another via the ETSI M2M services provided by the SCS 800.

Figure 9B:
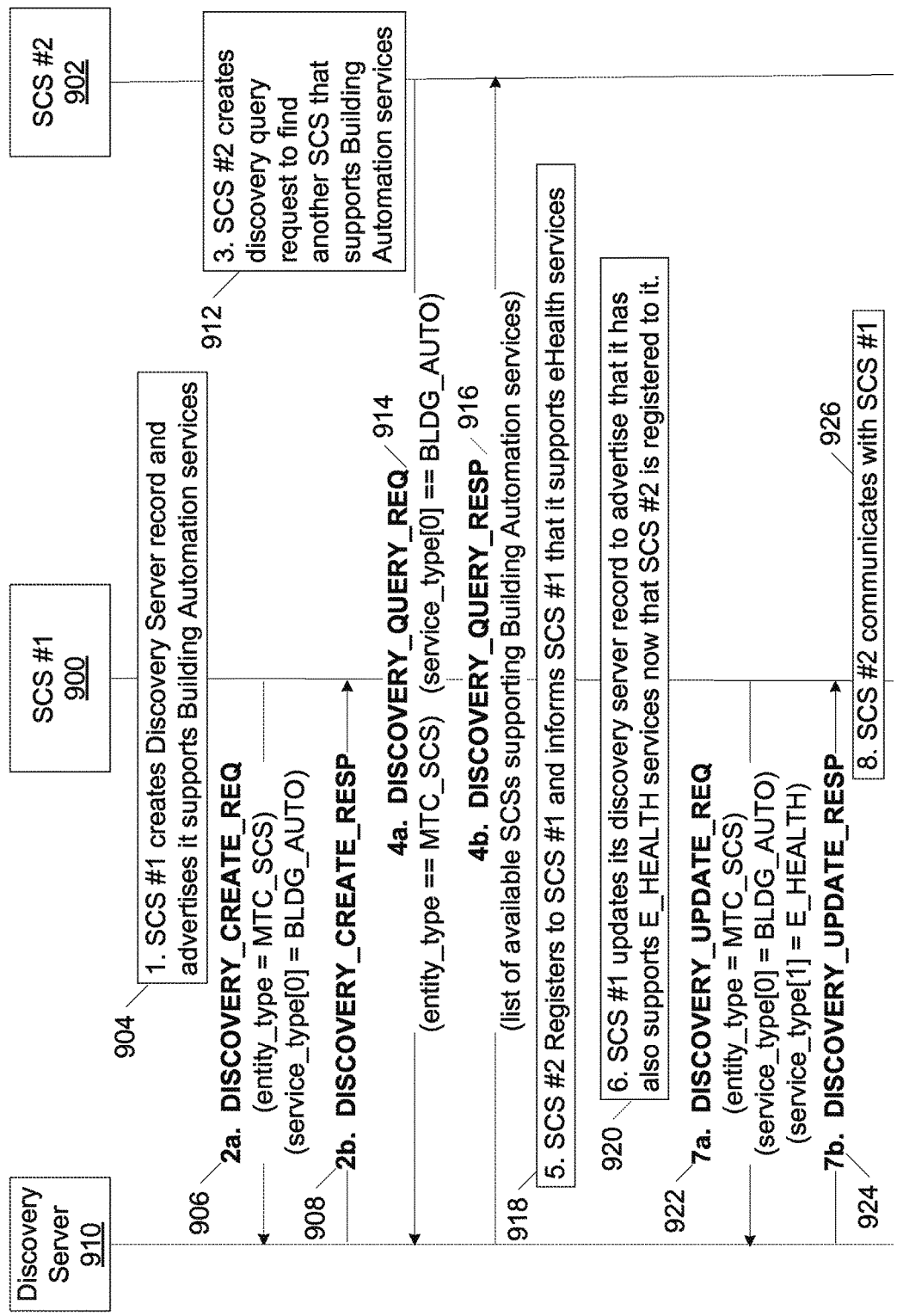

FIGS. 9A-9B illustrate an example call flow in which an SCS 900 may discover another SCS 902 supporting building automation services. At 904-908, an SCS 900 that may be pre-provisioned with the address of a Discovery Server 910 may create a Discovery Record on the Discovery Server 910, for example, using a DISCOVERY_CREATE_REQ message 906 that may comprise attribute-value pairs such as those listed in Table 1. The SCS 900 may advertise that it supports Building Automation services. The Discovery Server 910 may respond with a DISCOVERY_CREATE_RESP message 908 that may indicate whether the Discovery Record was successfully created or not.

At 912-916, a second SCS 902, which may be pre-provisioned with the address of the Discovery Server 910, may query the Discovery Server 910, for example, using a DISCOVERY_QUERY_REQ message 914 that may comprise a query to find an SCS that supports the services it desires. The query may be qualified with one Of more of the fields that are listed in the Discovery Record shown in Table 1. The Discovery Server 910 may respond with a DISCOVERY_QUERY_RESP message 916 that may comprise a list of SCS Discovery Record(s) that match the query. The SCS may be looking for another SCS with Building Automation services.

At 918, e.g., based on the discovery query response, the second SCS 902 may select and register to the first SCS 900. When registering to the first SCS 900, the second SCS 902 may inform the first SCS 900 of the services that it supports. The second M2M Server may support eHealth services. At steps 920-924, the first SCS 900 may update a Discovery Record on the Discovery Server 910, for example, using a DISCOVERY_UPDATE_REQ message 922 to include the services that the registered second SCS 902 supports. The Discovery Server 910 may respond with a DISCOVERY_UPDATE_RESP message 924 that may indicate whether the Discovery Record was successfully updated or not. By doing this, the first SCS 900 may advertise these services to potential MTC entities, such as MTC WTRUs, looking for these services. In addition, the first SCS 900 can charge the second SCS 902 for this advertising service. At 926, the SCSs may communicate with one another.

Figure 10A:
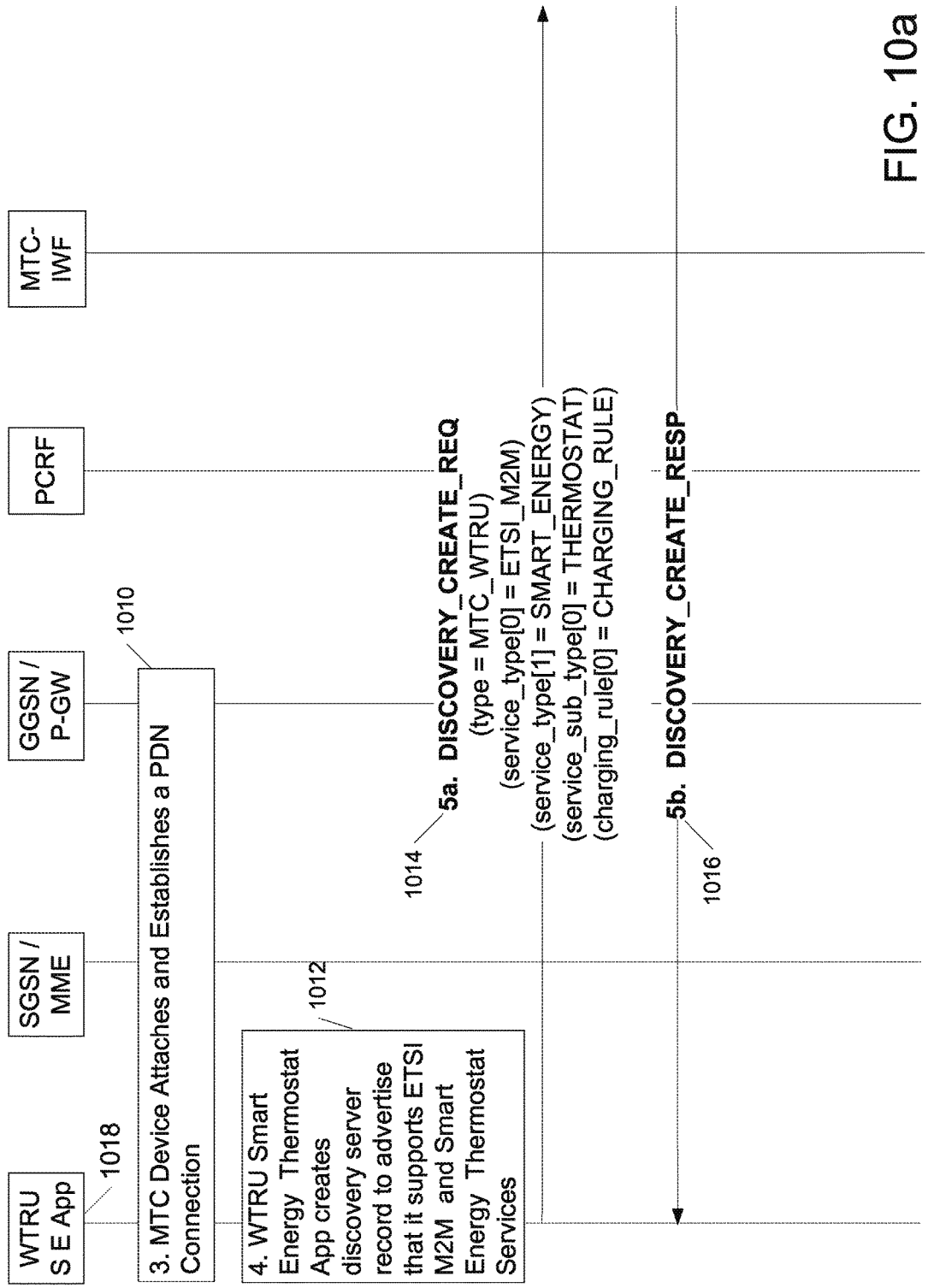
Figure 10B:
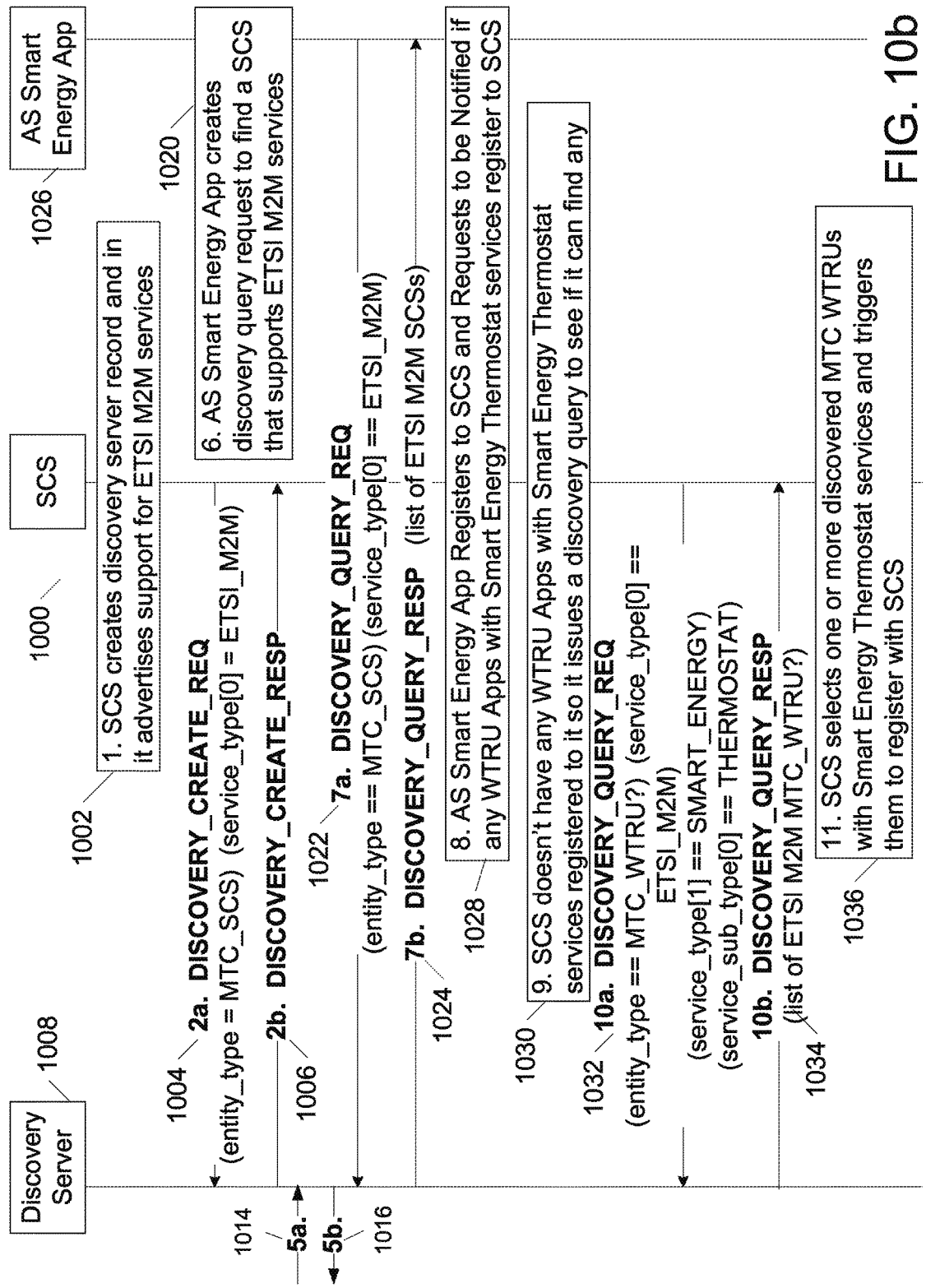

FIGS. 10A-10C illustrate another example call flow in which an SCS 1000 may discover a WTRU MTC Application. At 1002-1006, an SCS 1000 that may be pre-provisioned with the address of a Discovery Server 1008 may create a Discovery Record on the Discovery Server 1008, for example, using a DISCOVERY_CREATE_REQ message 1004 that may comprise attribute-value pairs such as those listed in Table 1. The SCS 1000 may advertise that it supports ETSI M2M services. The Discovery Server 1008 may respond with a DISCOVERY_CREATE_RESP message 1006 that may indicate whether the Discovery Record was successfully created or not.

At 1010, an MTC WTRU may attach to the network. and may establish a PDN connection. At 1012-1016, a WTRU Smart Energy Application 1018 that may be pre-provisioned with the address of the Discovery Server 1008 may create a Discovery Record, for example, using a DISCOVERY_CREATE_REQ message 1014 that may comprise attribute-value pairs such as those listed in Table 1. The WTRU Smart Energy Application 1018 may advertise that it supports ETSI M2M and Thermostat Smart Energy services. The Discovery Server 1008 may respond with a DISCOVERY_CREATE_RESP message 1016 that may indicate whether the Discovery Record was successfully created or not.

At 1020-1024, an AS Smart Energy Application 1026, which may be pre-provisioned with the address of the Discovery Server 1008, may query the Discovery Server 1008, for example, using a DISCOVERY_QUERY_REQ message 1022 that may comprise a query to find an SCS that supports the services it desires. The AS Smart Energy Application 1026 may use an SCS that supports ETSI M2M services. The Discovery Server 1008 may respond with a DISCOVERY_QUERY_RESP message 1024 that may comprise a list of SCS Discovery Record(s) that match the query.

At 1028, e.g., based on the discovery query response, the AS Smart Energy Application 1026 may select and register to an SCS. When registering to the SCS 1000, the AS Smart Energy Application 1026 may request to be notified if any WTRU Application with Smart Energy Thermostat services registers to the SCS 1000. At 1030-1034, the SCS 1000 may not have any WTRU Applications with Smart Energy Thermostat services registered to it, so the SCS 1000 may issue a discovery query to see if it can proactively find any for the AS Smart Energy Application.

At 1036, when the SCS 1000 discovers a WTRU Application with Smart Energy Thermostat services registered, the SCS 1000 may select one or more discovered MTC WTRUs with Smart Energy Thermostat services. At 1038, the SCS 1000 may request that the WTRU Smart Energy Application be triggered. At 1040-1042, the MTC-IWF may use the Gx' interface to verify that a charging rule exists for this application, for example, using a Credit Control Request (CCR) 1040 and Credit Control Answer (CCA) 1042. At 1044, the MTC-IWF may deliver the trigger towards the Smart Energy Thermostat.

The triggered WTRU Smart Energy Application or Applications may register to the SCS 1000 at 1046. At 1048, the SCS 1000 may send a notification to the AS Smart Energy Application 1026 that a WTRU Smart Energy Thermostat Application or Applications has registered. At 1050, the AS Smart Energy Application 1026 may communicate with the WTRU Smart Energy Thermostat Application 1018 via the SCS 1000. At 1052-1056, the SCS 1000 may update a Discovery Server record to advertise that it has a WTRU Smart Energy Thermostat Application registered to it.

Figure 11A:
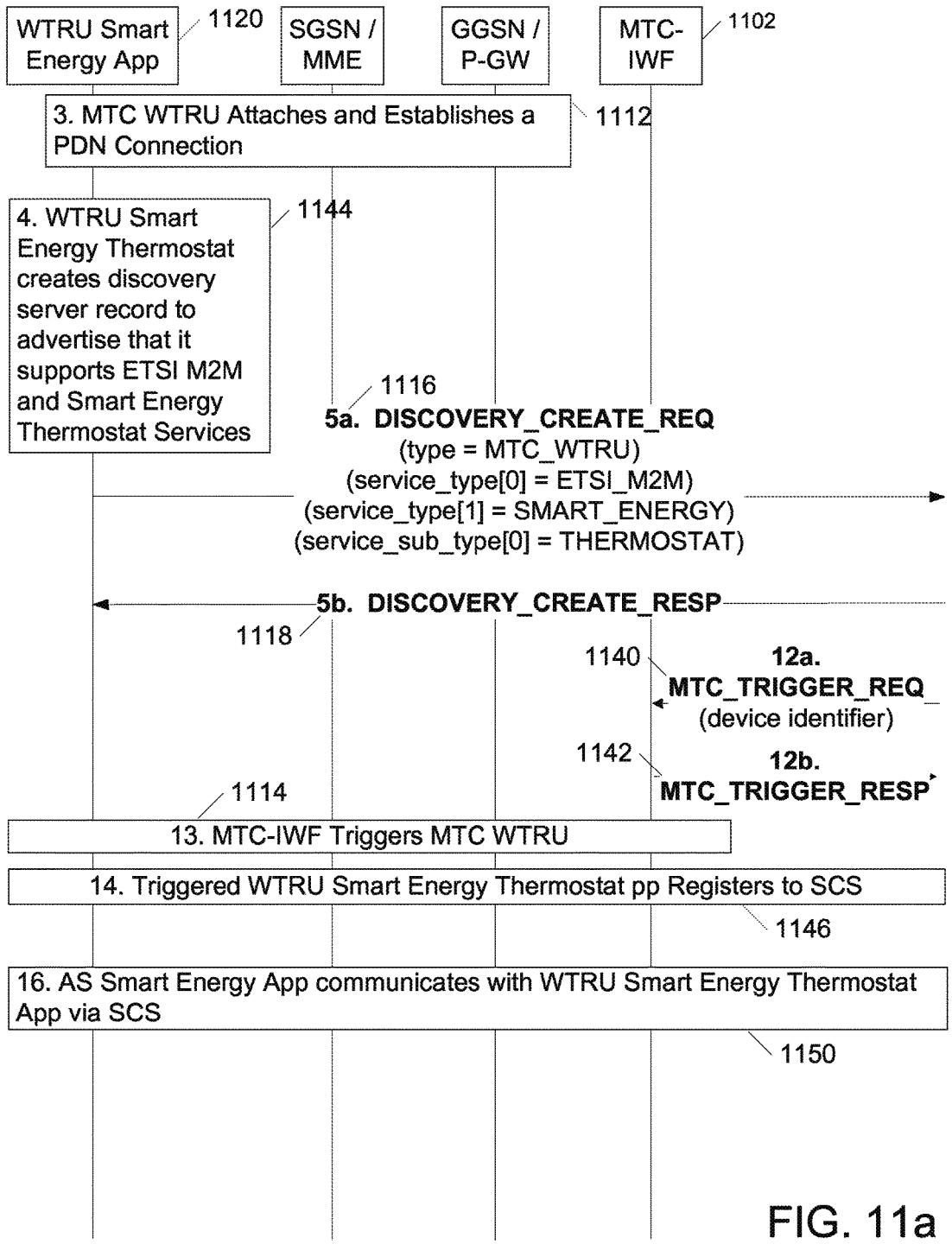
Figure 11B:
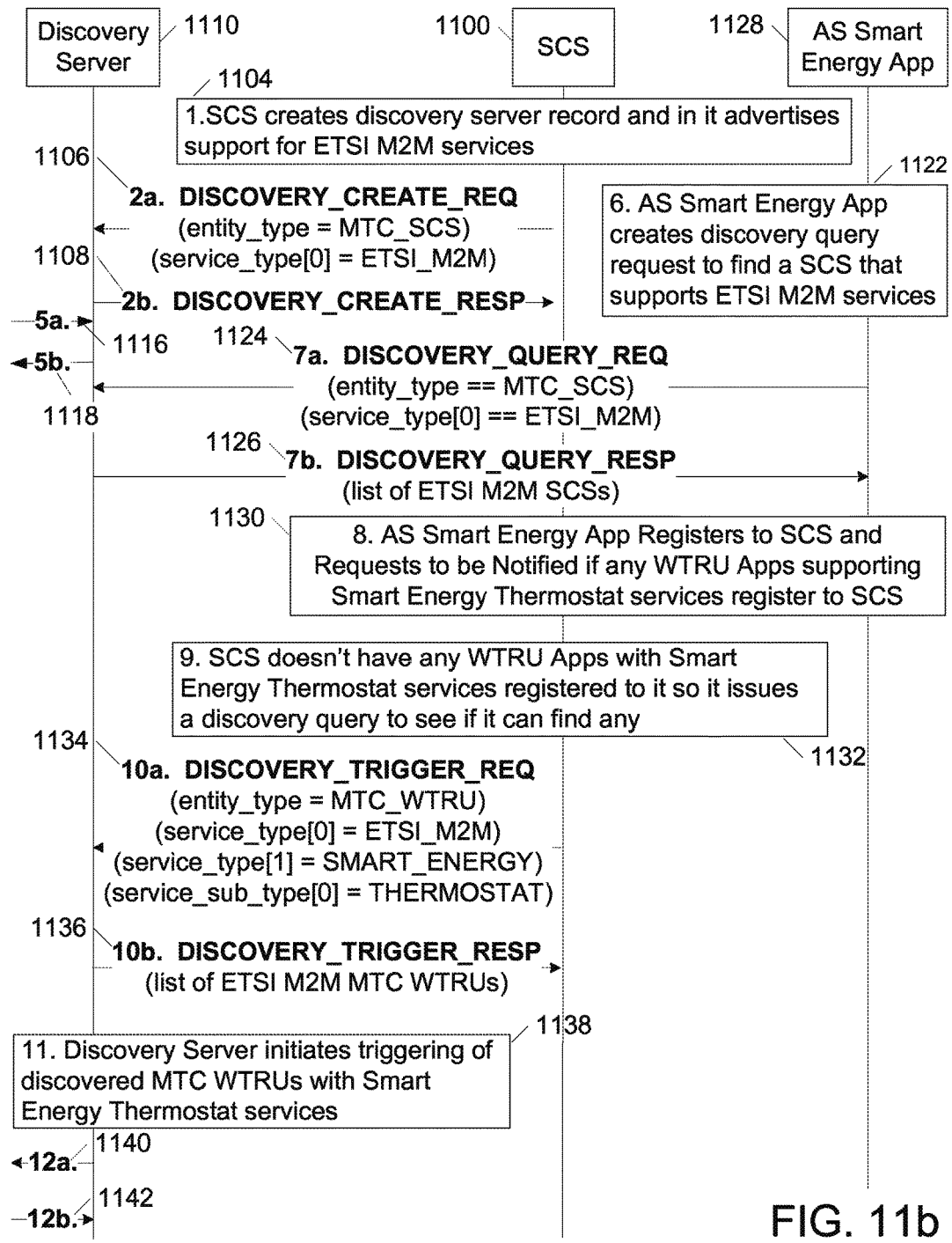
Figure 11C:
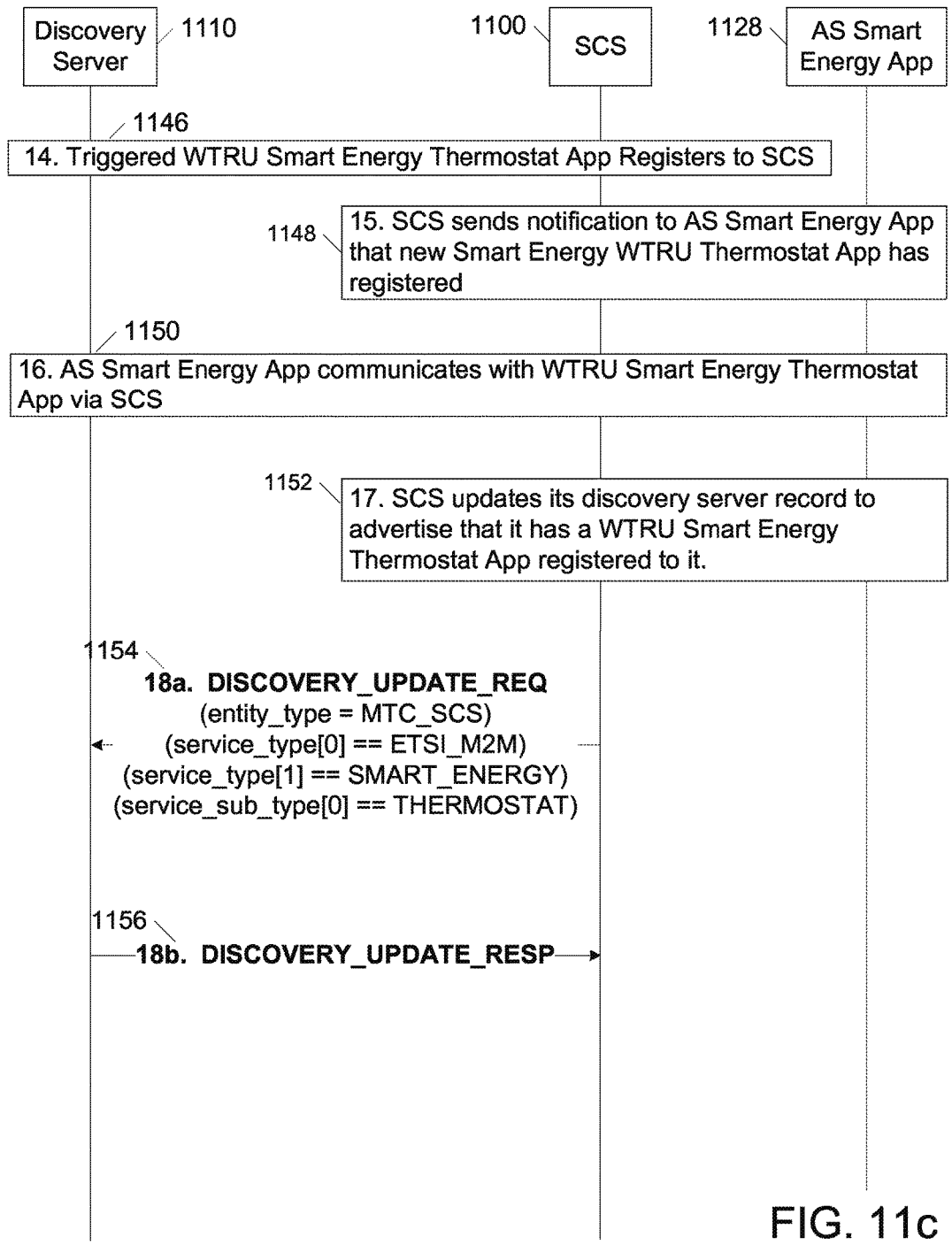

FIGS. 11A-11C illustrate another example call flow in which an SCS 1100 may initiate the triggering of an MTC WTRU via the MTC-IWF 1102. At 1104-1108, an SCS 1100, which may be pre-provisioned with the address of a Discovery Server 1110, may create a Discovery Record on the Discovery Server 1110, for example, using a DISCOVERY_CREATE_REQ message 1106 that may comprise attribute-value-pairs such as those listed in Table 1. The SCS 1100 may advertise that it supports ETSI M2M services. The Discovery Server 1110 may respond with a DISCOVERY_CREATE_RESP message 1108 that may indicate whether the Discovery Record was successfully created or not. An MTC WTRU may attach to the network and may establish a PDN connection at 1112. At 1114-1118, a WTRU Smart Energy Application 1120, which may be pre-provisioned with the address of the Discovery Server 1110, may create a Discovery Record, for example, using a DISCOVERY_CREATE_REQ message 1116 that may comprise attribute-value-pairs such as those listed in Table 1. The WTRU Application may advertise that it supports ETSI M2M and Smart Energy Thermostat services. The Discovery Server 1100 may respond with a DISCOVERY_CREATE_RESP message 1118 that may indicate whether the Discovery Record was successfully created or not.

At 1122-1126, an AS Smart Energy Application 1128, which may be pre-provisioned with the address of 1110 Discovery Server, may query the Discovery Server 1110, for example, using a DISCOVERY_QUERY_REQ message 1124 that may comprise a query to find an SCS that supports the services it desires. In this example, the AS Smart Energy Application 1128 may use an SCS that supports ETSI M2M services. The Discovery Server 1110 may respond with a DISCOVERY_QUERY_RESP message 1126 that may comprise a list of SCS Discovery Record(s) that match the query. Based, for example, on the discovery query response, the AS Smart Energy Application 1128 may select and register to an SCS at 1130. When registering to the SCS 1100, the AS Smart Energy Application 1128 may request to be notified if any WTRU Application with Smart Energy Thermostat services registers to the SCS 1100.

At 1132-1136, the SCS 1100 may not have any WTRU Applications with Smart Energy Thermostat services registered to it, so the SCS 1100 may issue a discovery query to see if it can proactively find any for the AS Smart Energy Application 1128. The Discovery Server 1100 may initiate triggering of discovered MTC WTRUs with Smart Energy Thermostat services by sending a trigger request to MTC-IWF 1102 at 1138-1142.

At 1144, MTC-IWF 1102 may verify with the PCRF that a charging record exists for the triggered application and may then trigger MTC WTRU. The triggered WTRU Smart Energy Thermostat Application or Applications may register to SCS at 1146. At 1148, the SCS 1100 may send a notification to the AS Smart Energy Application 1128 that a new WTRU Smart Energy Thermostat Application or Applications has registered. At 1150, the AS Smart Energy Application 1128 may communicate with the WTRU Smart Energy Thermostat Application 1120, for example, via SCS 1100. At 1152-1156, the SCS 1100 may update a Discovery Server record to advertise that it has a WTRU Smart Energy Thermostat Application registered to it.

Figure 12A:
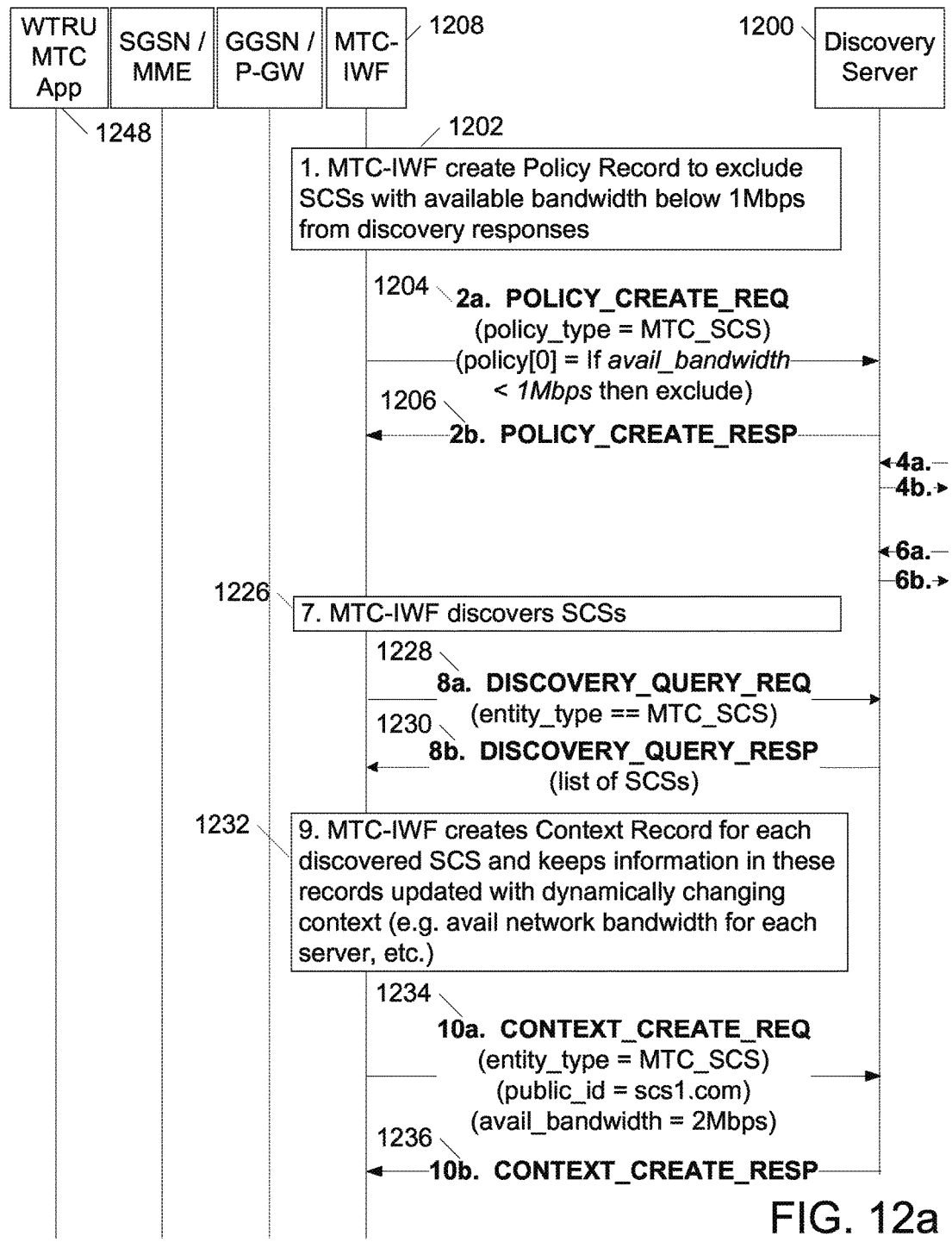
Figure 12B:
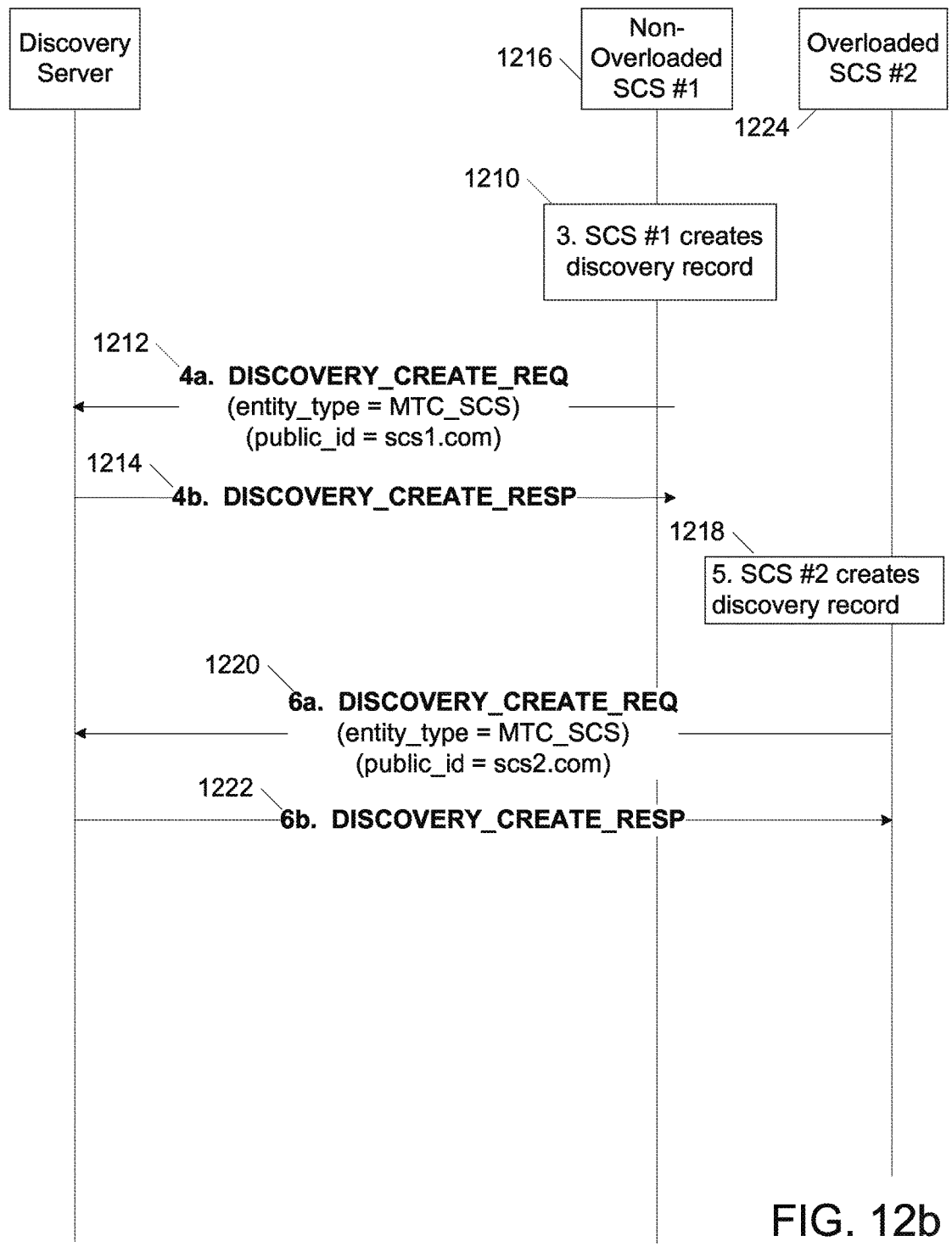
Figure 12C:
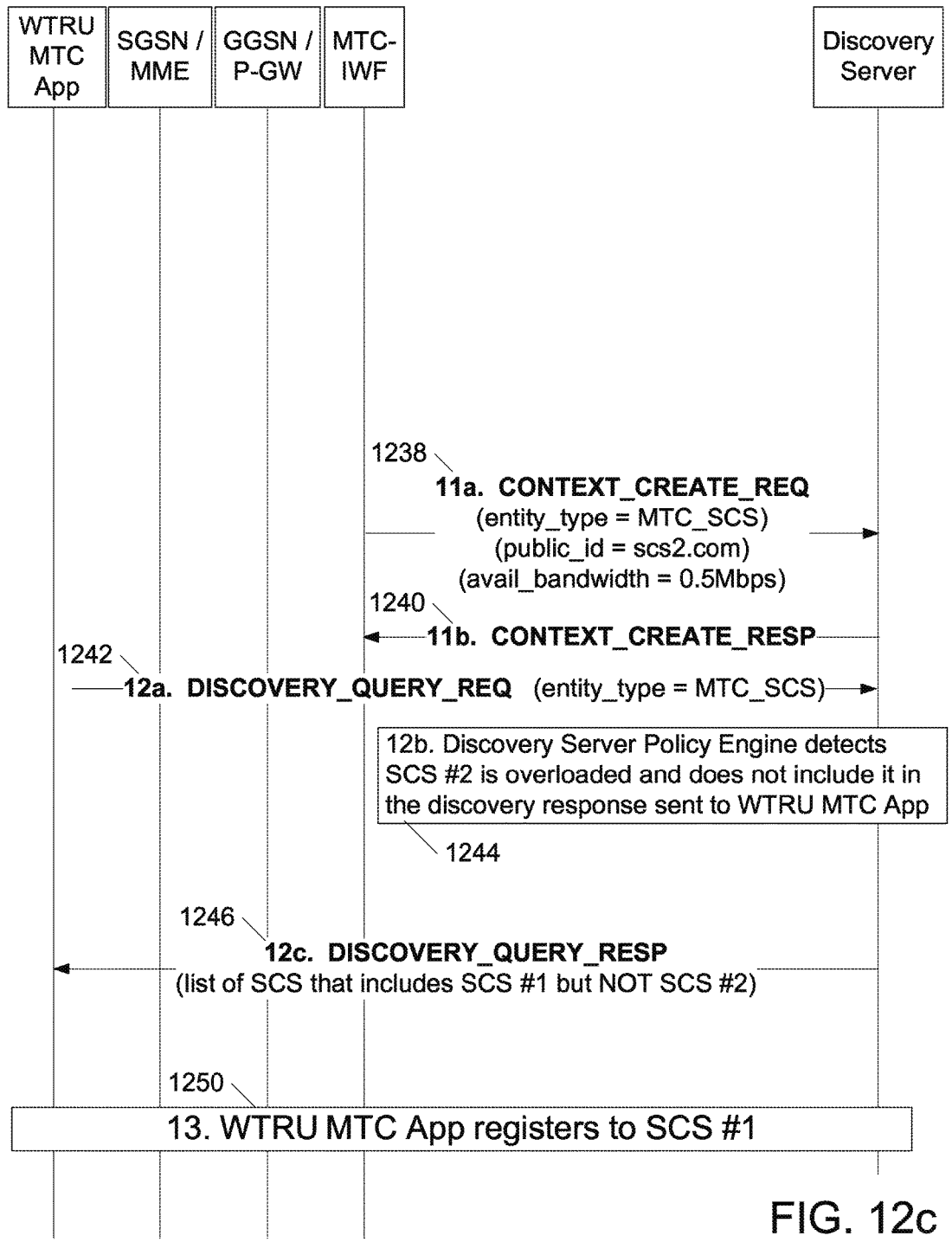

FIGS. 12A-12C illustrate another example call flow in which a Discovery Server 1200 may provide context-aware, policy-driven discovery services. At 1202-1206, MTC-IWF 1208 may create a policy record on the Discovery Server 1200 to exclude SCSs with available bandwidth below, for example, 1 Mbps from discovery responses. At 1210-1214, an SCS 1216, which is a non-overloaded (available bandwidth of at least 1 Mbps per the policy) server that may be pre-provisioned with the address of the Discovery Server 1200, may create a Discovery Record on the Discovery Server 1200.

At 1218-1222, an SCS 1224, which is an overloaded server (available bandwidth of less than 1 Mbps per the policy) that may be pre-provisioned with the address of the Discovery Server 1200, may also create a Discovery Record on the Discovery Server 1200. At 1226-1230, the MTC-IWF 1208 may discover both non-overloaded SCS 1216 and overloaded SCS 1224 via the Discovery Server.

At 1232-1240, the MTC-IWF 1208 may create Context Records for both SCS 1216 and SCS 1224. These Context Records may include the current available bandwidth of each SCS. At 1242-1246, a WTRU MTC Application 1248 that may be pre-provisioned with the address of the Discovery Server 1200 may issue a discovery query request to the Discovery Server 1200 to find an SCS. The Discovery Server 1200 may find that there are valid Discovery Records in a Discovery Registry for SCS 1216 and SCS 1224. Using a policy engine, the Discovery Server 1200 may also detect that there is a Policy Record for SCS discovery requests. The Policy Engine may also detect that there are Context Records for SCS 1216 and SCS 1224 that may comprise the current available bandwidth for each. Using these Context Records and the Policy Record, the Policy Engine may determine that only SCS 1216 can be included in the discovery response that is returned to the WTRU MTC Application 1248 because the available bandwidth of SCS 1224 (0.5 Mbps in this example) is less than the limit defined in the Policy Record (1 Mbps). At 1250, the WTRU MTC Application 1248 may register to SCS 1216, and the MTC-IWF 1208 may trigger MTC WTRU.

Figure 13A:
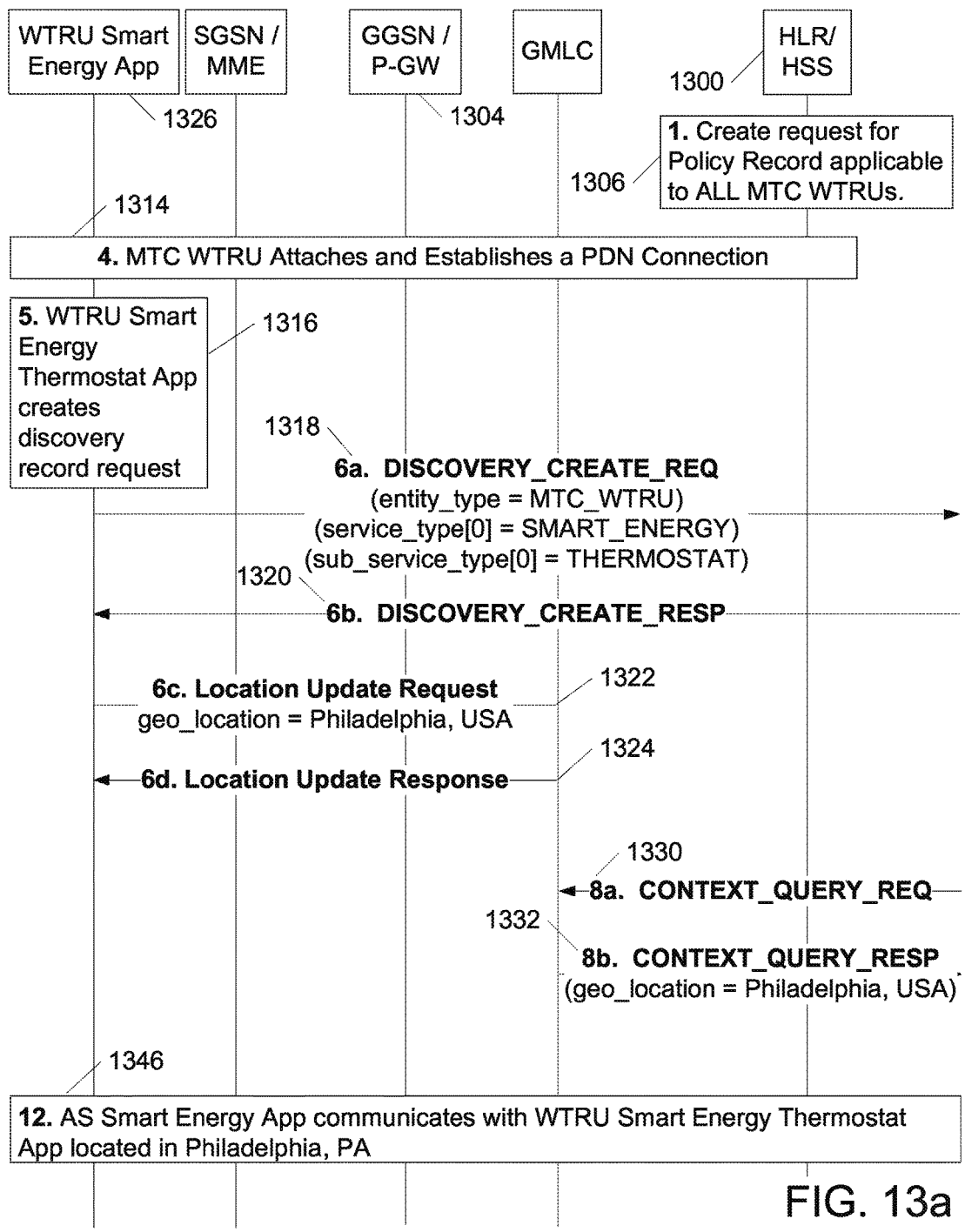
Figure 13B:
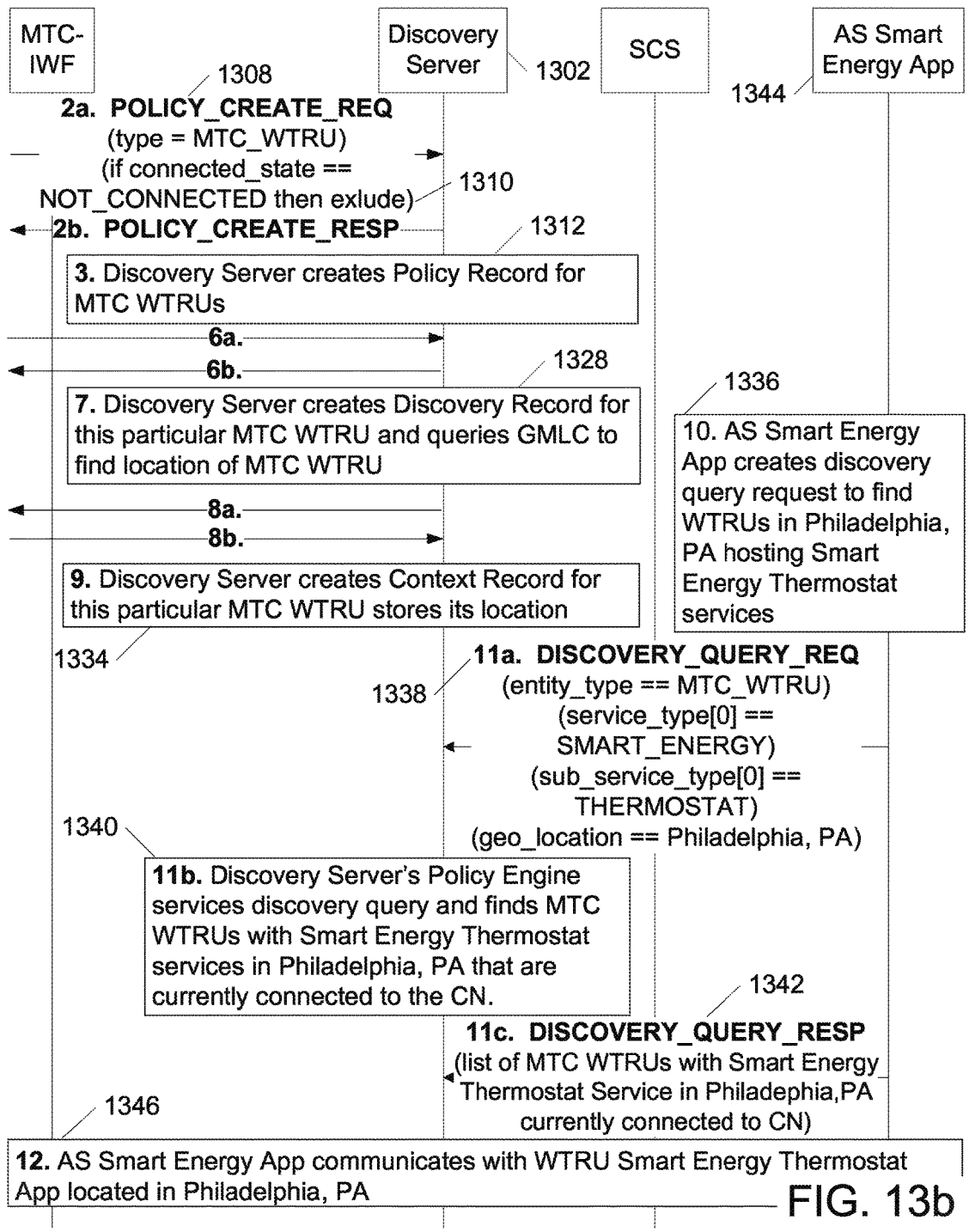

FIGS. 13A-13B illustrate another example call flow in which an HLR/HSS CN entity 1300 may create an MTC WTRU Policy Record on a Discovery Server 1302, the MTC WTRU may create a Discovery Record on the Discovery Server 1302, and the Discovery Server 1302 may request location information from a GMLC 1304 for which, in turn, the Discovery Server 1302 may create a Context Record. At 1306-1312, the HLR/HSS 1300 may create a Policy Record on the Discovery Server 1302 to allow only MTC WTRUs in the connected state to be discovered. These steps can be provisioned instead.

At 1314-1324, an MTC WTRU may attach to the network and may establish a PDN connection. A WTRU Smart Enemy Thermostat Application 1326, which may be pre-provisioned with the address of the Discovery Server 1302, may create a Discovery Record on the Discovery Server 1302. The WTRU may then update the GMLC 1304 with its location. At 1328-1334, the Discovery Server 1302 may initiate a request to the CN GMLC entity 1304 to get the location of the WTRU. The Discovery Server 1302 may create a context record to store this location information.

At 1336-1342, an AS Smart Energy Application 1344, which may be pre-provisioned with the address of the Discovery Server 1302, may create a discovery query to find MTC WTRUs hosting Smart Energy Thermostat applications located in, for example, Philadelphia, Pa. The Discovery Server's Policy Engine may service the request and may enforce the policy whereby only MTC WTRUs in the connected state are allowed to be discovered. The Discovery Server 1302 may respond back with a list of MTC WTRUs hosting a Smart Energy Thermostat Application that are located in Philadelphia, Pa., and that are currently connected to the CN. At 1346, the AS Smart Energy Application may communicate with the WTRU Smart Energy Thermostat Application located in Philadelphia, Pa.

Figure 14A:
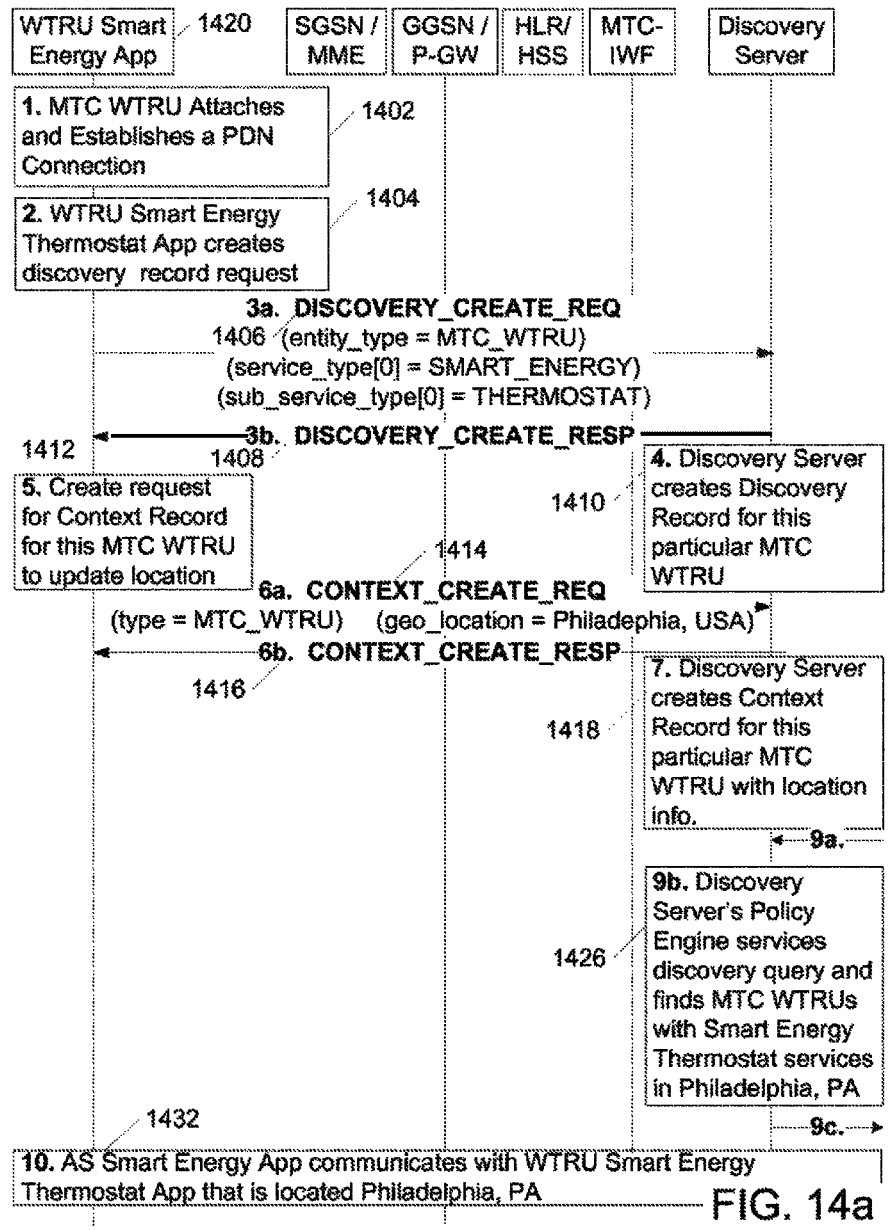
Figure 14B:
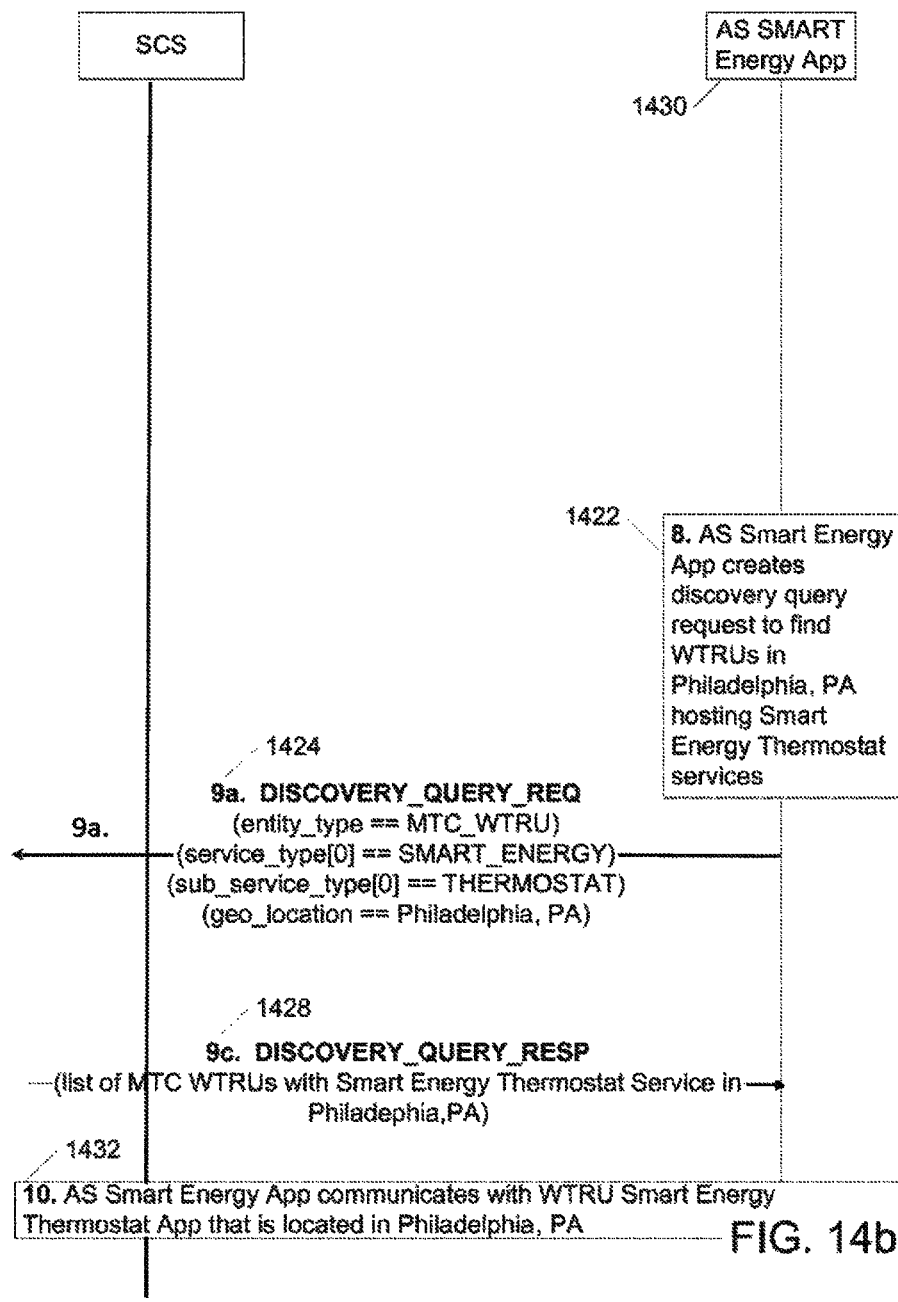

FIGS. 14A-14B illustrates another example call flow in which the WTRU MTC Application may create its own Discovery and Context Records on a Discovery Server 1400. Within the Context Record, the geographic location of the WTRU may be stored. At 1402, an MTC WTRU may attach to the network and may establish a PDN connection. At 1404-1418, a WTRU Smart Energy Thermostat Application 1420, which may be pre-provisioned with the address of the Discovery Server 1400, may create a Discovery Record and/or a Context Record on the Discovery Server 1400 that may comprise the geographic location of the MTC WTRU.

At 1424-1428, an AS Smart Energy Application 1430, which may be pre-provisioned with the address of the Discovery Server 1400, may create a discovery query to find MTC WTRUs hosting Smart Energy Thermostat applications located in, for example, Philadelphia, Pa. The Discovery Server's Policy Engine may service the request and may enforce the policy whereby discovery may be limited to MTC WTRUs in the connected state. The Discovery Server 1400 may respond back with a list MTC WTRUs hosting a Smart Energy Thermostat Application that are located in Philadelphia, Pa., and that are currently connected to the CN. At 1432, the AS Smart Energy Application may communicate with the WTRU Smart Energy Thermostat Application located in Philadelphia, Pa.

Figure 15B:
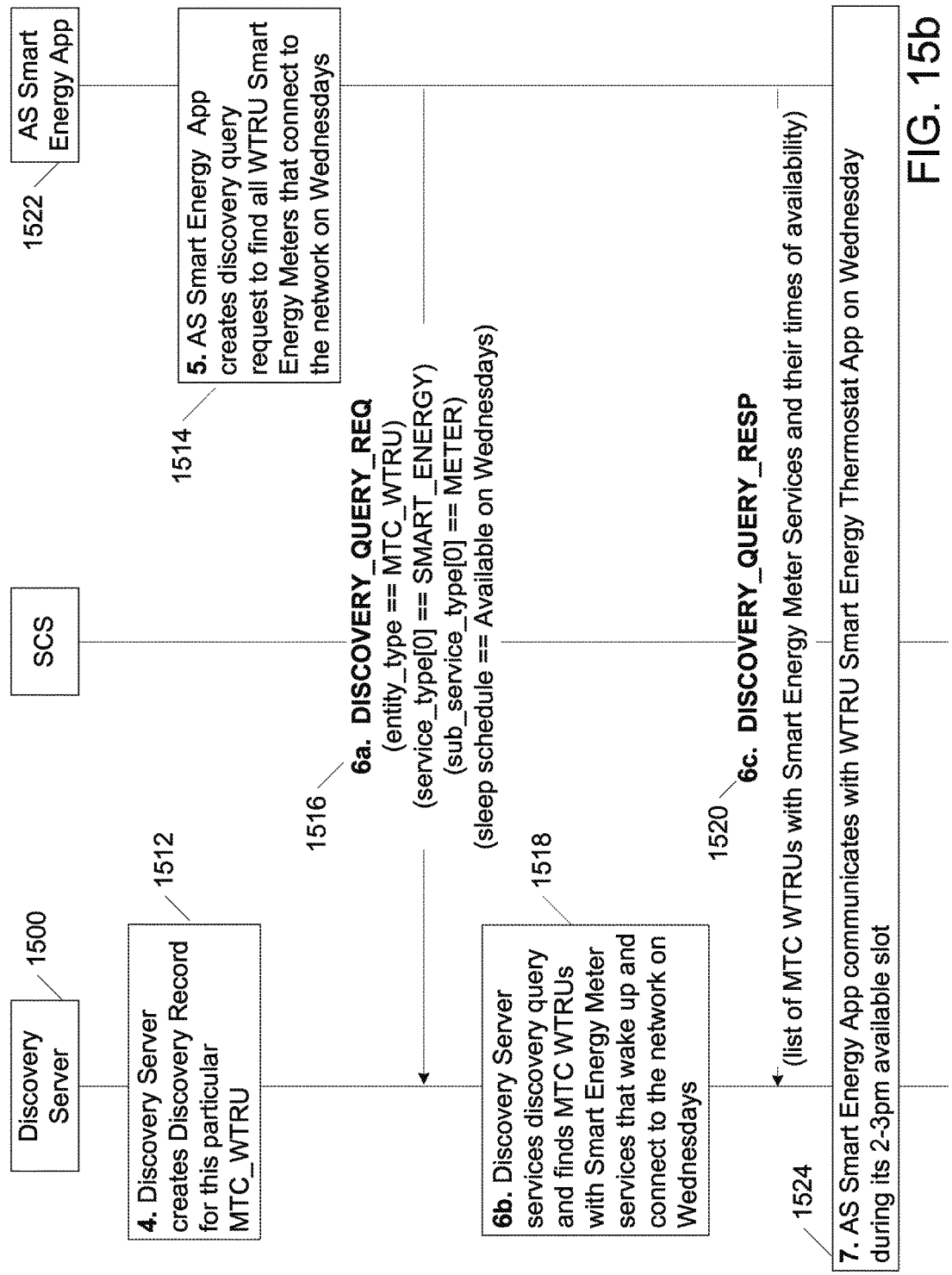

FIGS. 15A-15B illustrates another example call flow in which an MTC WTRU's schedule of availability may be stored in its Discovery Record. A query may be made to a Discovery Server 1500 to find MTC WTRUs based on their schedule of availability. At 1502, an MTC WTRU may attach to the network and may establish a PDN connection. At 1504, a WTRU Smart Energy Thermostat Application 1506 may create a discovery record request.

At 1508-1512, a WTRU Smart Energy Meter Application, e.g., the WTRU Smart Energy Thermostat Application 1506, which may be pre-provisioned with the address of the Discovery Server 1500, may create a Discovery Record on the Discovery Server 1500 that may comprise availability schedule information. At 1514-1520, an AS Smart Energy Application 1522, which may be pre-provisioned with the address of the Discovery Server 1500, may create a discovery query to find MTC WTRUs hosting Smart Energy Meter applications that are available on, for example, Wednesdays. The Discovery Server 1500 may service the request. The Discovery Server 1500 may respond back with a list of MTC WTRUs hosting a Smart Energy Meter Application that are available on Wednesdays. At 1524, the AS Smart Energy Application 1522 may communicate with the WTRU Smart Energy Meter Application 1506, for example, during its Wednesday 2-3 pm time slot.

The Discovery Server 1500 or an MTC Server or SCS 1526 may use UMTS and/or LTE procedures to obtain the public IP address of an MTC device. The Discovery Server 1500 (or an MTC Server or SCS 1526) may use these procedures to obtain the transport address (IP Address or Port Number) of a particular application or a trigger dispatch function. When these procedures are used to obtain the address of a trigger dispatch function, applications may be triggered directly over an IP connection, avoiding the need to send a trigger via control signaling such as SMS or NAS messaging.

Figure 16:
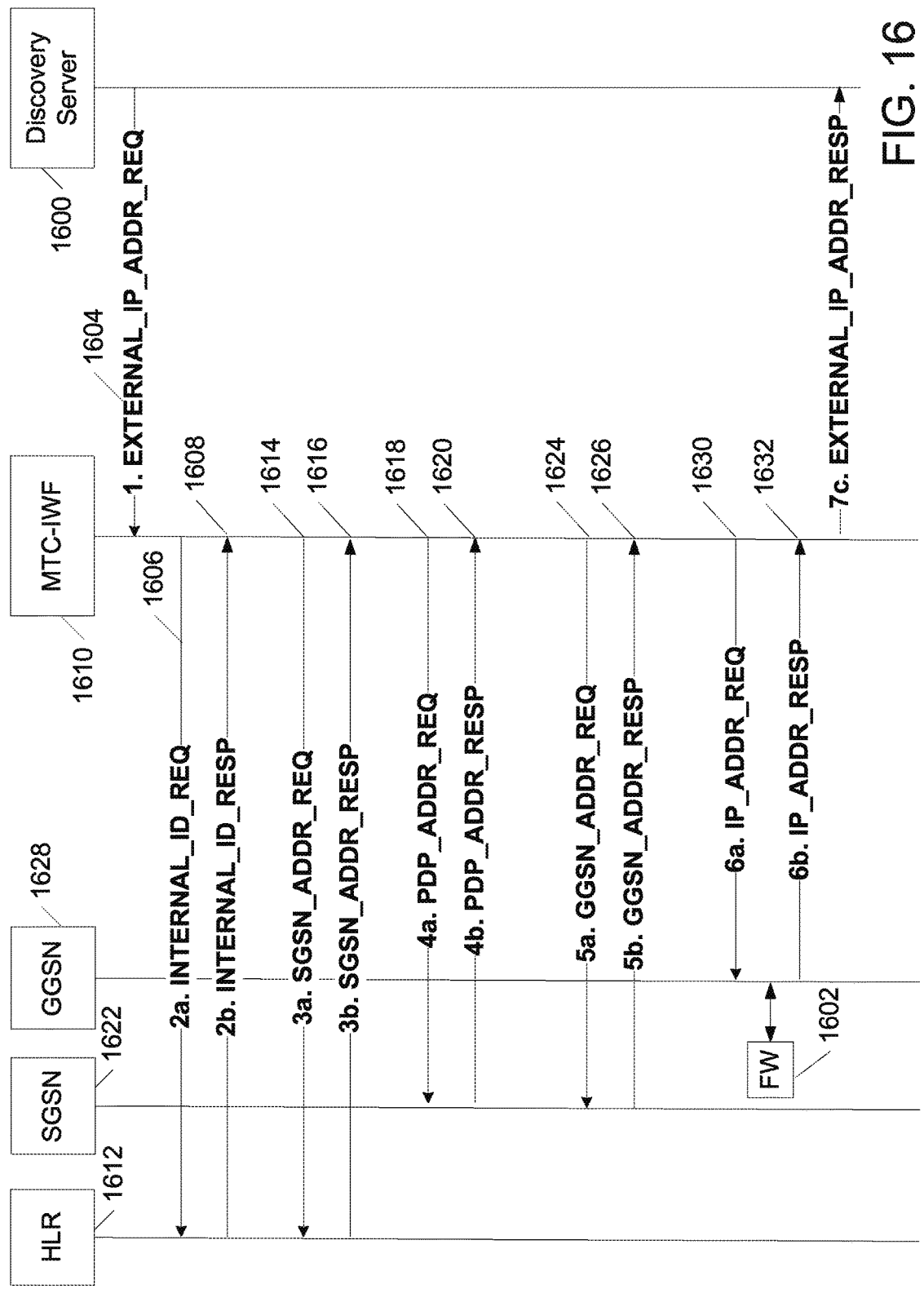

FIG. 16 illustrates another example call flow for a UMTS procedure in which a Discovery Server 1600 may request the IP Address of an MTC WTRU. The "FW" entity 1602 in the call flow may represent a firewall or NAT function. At 1604, the Discovery Server 1600 may issue a request for the external IP address of a particular MTC WTRU (External Identifier, i.e., the FQDN of the MTC WTRU). At 1606-1608, an MTC-IWF 1610 may request the internal identifier (IMSI) that corresponds to the external identifier (FQDN). An HLR 1612 may respond with the proper IMSI. The MTC-IWF 1610 may have this information cached, for example, or the request may be performed at 1614-1616.

At 1614-1616, the MTC-IWF 1610 may request the serving node associated the MTC WTRU (IMSI). The HLR 1612 may respond with the SGSN Address. The SGSN Address may be the IP Address of the SGSN currently serving the MTC WTRU, as specified in 3GPP Specification 23.008. If there is no SGSN currently serving the MTC WTRU, then the MTC WTRU may not be reachable via the UMTS packet switched network. The HLR 1612 may respond with an indication that the WTRU is not reachable via the UMTS packet switched network.

At 1618-1620, the MTC-IWF 1610 may request the PDP Address associated with the MTC WTRU (MST) for an IP connection. An SGSN 1622 may respond with the PDP Address. The PDP Address may be the private IP address of the MTC WTRU, as specified in 3GPP Specification 23.008. If dynamic addressing is used and there is no established PDP connection, then the SGSN 1622 may have no PDP Address for the MTC WTRU. The SGSN 1622 may respond with an indication that the MTC WTRU is reachable for triggering but has no IP address.

At 1624-1626, the MTC-IWF 1610 may request a GGSN 1628 associated with the MS WTRU for the IP connection (PDP Address). The SGSN 1622 may respond with the GGSN Address in Use that is associated with the PDP Address. The GGSN Address in Use may be the IP address of the associated GGSN, as specified in 3GPP Specification 23.008. At 1630-1632, the MTC-IWF 1610 may request the public transport address associated with the IP connection (PDP Address). The GGSN 1628 may respond with the public transport IP address (IP Address/Port Number) that is associated with the PDP Address.

While certain actions are depicted as separate actions, they may be combined. For example, in FIG. 16, 1606-1616 may be combined, as may 1618-1626.

Figure 17:
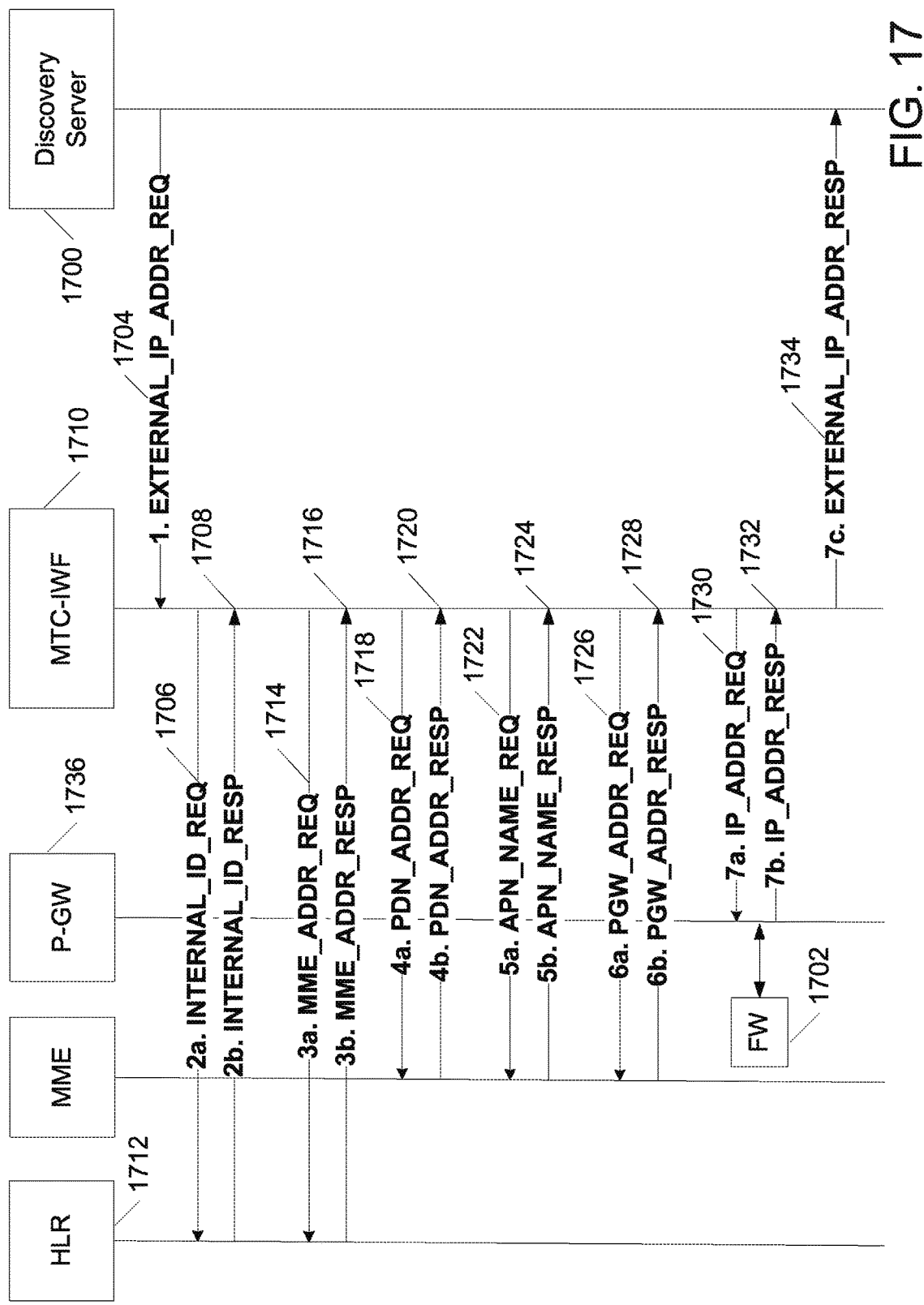

FIG. 17 illustrates another example call flow for an LTE procedure in which a Discovery Server 1700 may request the IP Address of an MTC WTRU. The "FW" entity 1702 in the call flow may represent a firewall or NAT function. At 1704, the Discovery Server 1700 may issue a request for the external IP address of a particular MTC WTRU (External Identifier, i.e., the FQDN of the MTC device). At 1706-1708, MTC-IWF 1710 may request the internal identifier (e.g., IMSI) that corresponds to the external identifier (FQDN). HLR 1712 may respond with the proper IMSI. The MTC-IWF 1710 may have this information cached, or this request may be performed at 1714-1716.

At 1714-1716, the MTC-IWF 1710 may request an MME node 1718 associated with the MTC WTRU (IMSI). The HLR 1712 may respond with the MME Name, as specified in 3GPP Specification 23.008. If there is no MME Name currently serving the WTRU, then the WTRU may not be reachable via the Evolved Universal Terrestrial Radio Access Network (E-UTRAN), The HLR 1712 may respond with an indication that the WTRU is not reachable via the E-UTRAN, At 1718-1720, the. MTC-IWF 1710 may request the PDN Address associated with the MTC WTRU (IMSI) for an IP connection. The MME 1718 may respond with the PDN Address. The PDN Address may be the private IP address of the MTC WTRU, as specified in 3GPP Specification 23.008.

At 1722-1724, the MTC-IWF 1710 may request the APN Name that is used by the MTC WTRU (MST). The MME responds with the associated APN in Use. At 1726-1728, the MTC-IWF 1710 may request the PDN GW name that is associated with the APN name (APN in Use). The MME 1718 may respond with the associated PDN GW identity, which may be, for example, an FQDN or an IP address, as specified 3GPP Specification 23.008. At 1730-1734, the MTC-IWF 1710 may request the public transport address associated with the IP connection (PDP Address). A PDN GW 1736 may respond with the public transport IP address (IP Address/Port Number) that is associated with the PDP Address.

While certain actions are depicted as separate actions, they may be combined. For example, in FIG. 17, 1706, 1708, 1714, and 1716 may be combined, as may 1718-1734.

The Discovery Server 1700 may use a call to obtain the connected state of an MTC WTRU. The connected state of an MTC WTRU may indicate whether and how the MTC WTRU can be addressed. The connected state attribute, connected_state, can take one of a number of values. The connected state attribute may take the value "Not Reachable" if the MTC WTRU is not reachable in the CS or PS domains. If the WTRU does not have an IP address, but is triggerable because it is registered in the PS or CS domains, the connected state attribute may take the value "No IP Address, but Triggerable." In this state, the WTRU may also be able to receive SMS messages. As another example, the connected state attribute may take the value "IP Addressable" if the WTRU is registered in the PS domain and has an IP address.

Figure 18:
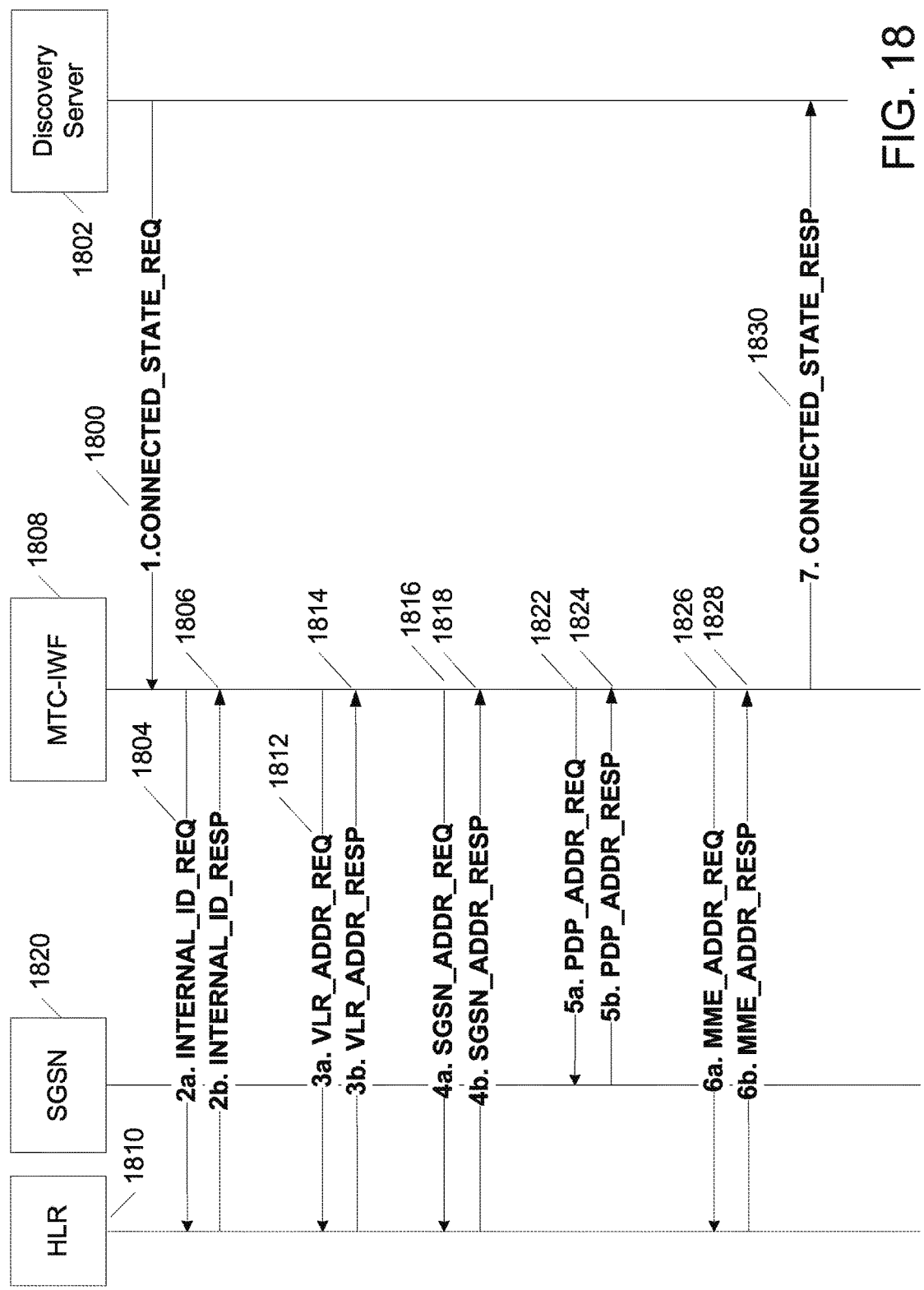

FIG. 18 shows an example call flow for obtaining the connected state of an MTC WTRU. At 1800, a Discovery Server 1802 may issue a request for the external IP address of a particular MTC WTRU (External Identifier, i.e., the FQDN of the MTC device). At 1804-1806, an MTC-IWF

1808 may request the internal identifier (IMSI) that corresponds to the external identifier (FQDN). An HLR 1810 may respond with the proper IMSI. The MTC-IWF 1808 may have this information cached, or this request may be performed at 1812-1814.

At 1812-1814, the MTC-IWF 1808 may request the address of the Visitor Location Register (VLR) associated with the MTC WTRU (MST). The HLR 1810 may respond with the MME Number, as specified in 3GPP Specification 23.008. If there is no MME Number in the HLR 1810, then MTC WTRU may not be reachable in the CS domain or the WTRU may have no CS subscription. At 1816-1818, the MTC-IWF 1808 may request the serving node associated with the MTC WTRU (IMSI). The HLR 1810 may respond with the SGSN Address. The SGSN Address may be the IP Address of an SGSN 1820 currently serving the MTC WTRU, as specified in 3GPP Specification 23.008. If there is no SGSN currently serving the MTC WTRU, then the MTC WTRU may not be reachable via the UMTS packet switched network. The HLR 1810 may respond with an indication that the WTRU is not reachable via the UMTS packet switched network.

At 1822-1824, the MTC-IWF 1808 may request the PDP Address associated with the MTC WTRU (IMSI) for an IP connection. The SGSN 1820 may respond with the PDP Address. The PDP Address may be the private IP address of the MTC WTRU, as specified in 3GPP Specification 23.008. If dynamic addressing is used and there is no established PDP connection, the SGSN 1820 may have no PDP Address for the MTC WTRU. At 1826-1828, the MTC-IWF 1808 may request the MME node associated with the MTC WTRU (IMSI). The HLR 1810 may respond with the MME Name, as specified in 3GPP Specification 23.008. If there is no MME Name currently serving the WTRU in the HLR, then the WTRU may not be reachable via the E-UTRAN. The HLR 1810 may respond with an indication that the WTRU is not reachable via the E-UTRAN. At 1830, the MTC-IWF 1808 may respond to the Discovery Server 1802 with the connected state of the MTC WTRU. The connected state may be determined, for example, based on the information that was obtained at 1812-1818 and 1822-1828.

The connected state may be determined, for example, as follows. If the MTC WTRU is not registered in the CS domain, the UMTS domain, and the LTE domain, the WTRU may be determined to be not reachable and not triggerable. If the MTC WTRU is not registered in the LTE domain and has no PDP Address, but is registered in the UMTS or CS domains, the WTRU may be determined to have no IP address, but to be triggerable. If the MTC WTRU has a PDP Address or is registered in the LTE domain, the WTRU may be determined to have an IP address.

While certain actions are depicted as separate actions, they may be combined. For example, while FIG. 18 depicts 1812-1818 and 1822-1828 as separate actions for clarity, these steps may be combined into fewer actions or a single action using a single message.

Figure 19A:
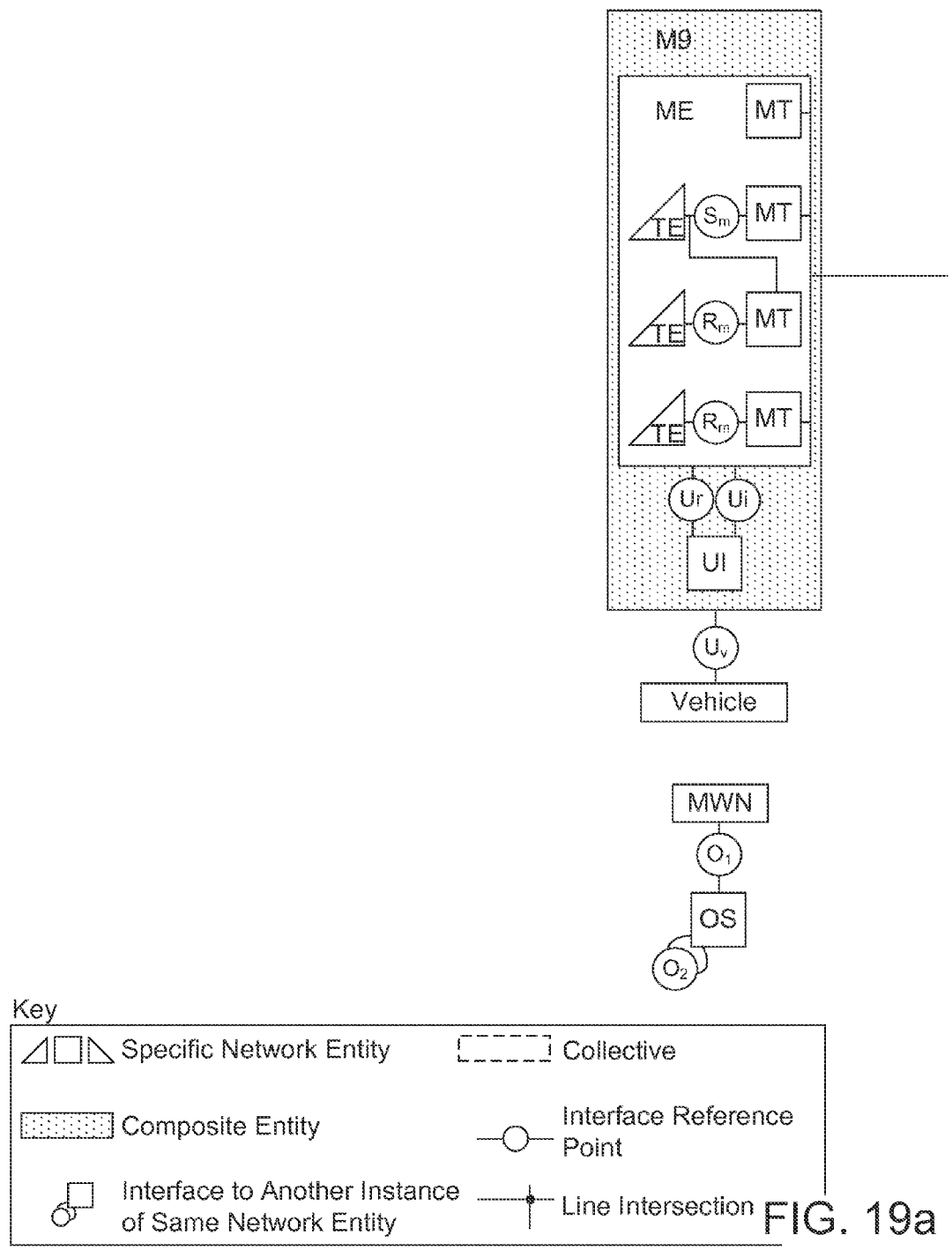
FIGS. 19A-19B are block diagrams that illustrate an example 3GPP2 network architecture.
Figure 19B:
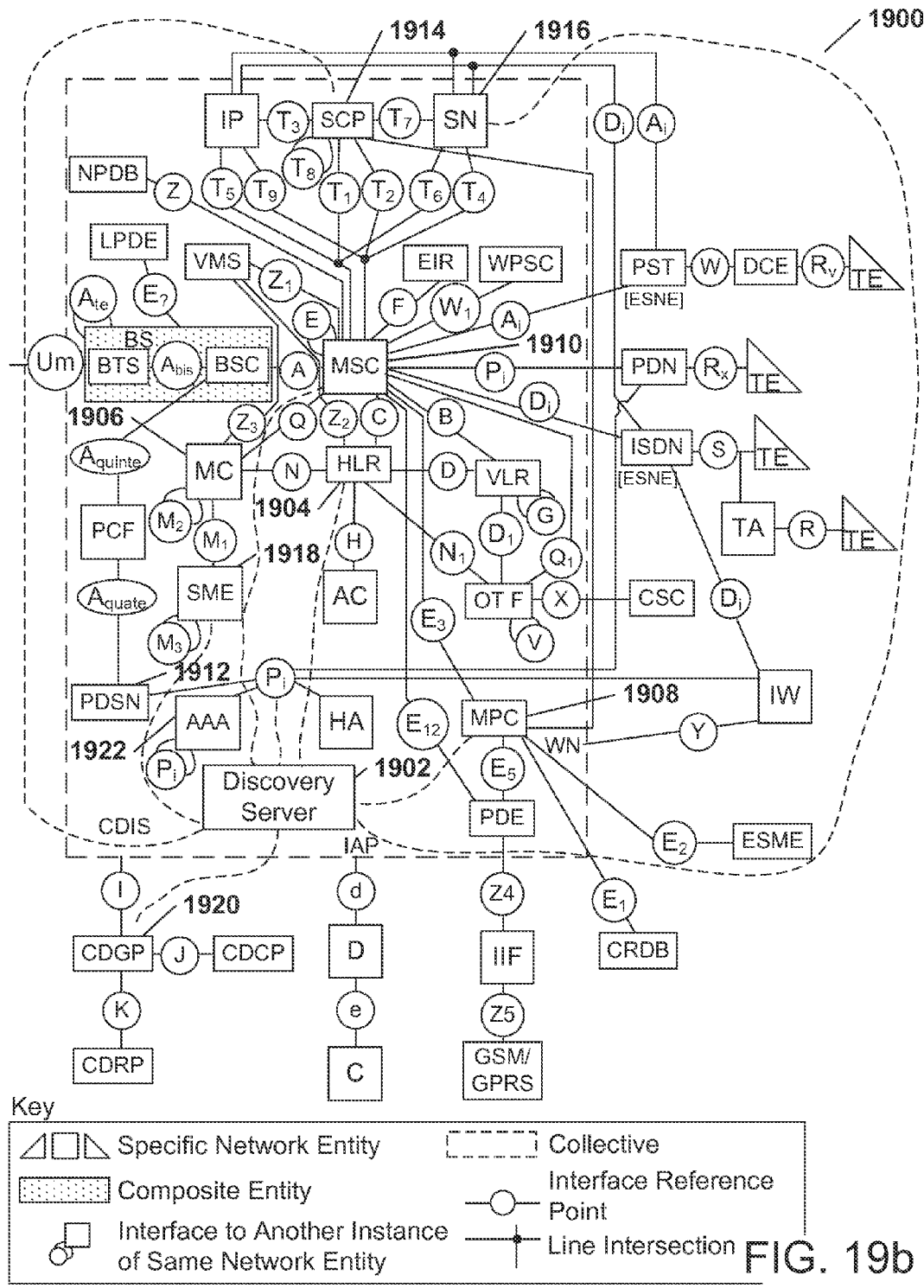

A Discovery Server may be integrated into a 3GPP2. For detailed descriptions of the individual network entities within the 3GPP2 architecture reference may be made to "3GPP2 Network Reference Model for CDMA2000 Spread Spectrum Systems, Rev. B. Version 2.0." FIGS. 19A-19B are block diagrams that illustrate an example 3GPP2 network architecture 1900. As shown in FIGS. 19A-19B, a Discovery Server 1902 may interface to one or more of the following 3GPP2 network entities: Home Location Register (HLR) 1904; Message Center (MC) 1906; Mobile Position Center (MPC) 1908; Mobile Switching Center (MSC) 1910; Packet Data Serving Node (PDSN) 1912; Service Control Point (SCP) 1914; Service Node (SN) 1916; Short Message Entity (SME) (for initiating triggering) 1918; Call Data Generation Point (CDGP) (for charging purposes) 1920; and/or Authentication, Authorization, and Accounting (AAA) 1922. These 3GPP2 network entities may have comparable counterparts in the 3GPP network architecture. The Discovery Server 1902 functions, as well as the messages and record formats disclosed herein, may be applicable to 3GPP2 networks.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method to provide service-based discovery, the method comprising:
   a discovery server receiving, from a first core network node, context information relating to a wireless transmit receive unit (WTRU), wherein the WTRU is available via an access network;
   the discovery server receiving, from a second core network node, policy information relating to at least one of the WTRU or the access network;
   the discovery server receiving, from the WTRU, information associated with an application;
   the discovery server receiving, from an application server (AS) a query for a service, wherein the query comprises information associated with the application;
   the discovery server determining that the WTRU is capable of providing the service and the access network is available to provide access to the WTRU; and
   the discovery server sending a response to the AS indicating that the WTRU is capable of providing the service.

2. The method of claim 1, wherein the context information comprising a device-specific characteristic, the device-specific characteristic comprising at least one of a service type, a location, or an availability of a device.

3. The method of claim 1, wherein the policy information comprising at least one of a permission condition, a congestion status, or a charging schedule.

4. The method of claim 1, Wherein the query includes at least one condition specified in a discovery record.

5. The method of claim 1, wherein determining that the WTRU is capable of providing the service and the access network is available to provide access to the WTRU is based at least in part on the context information and the policy information.

6. The method of claim 1, wherein the response indicates a condition associated with the service.

7. The method of claim 6, wherein the condition comprises at least one of a time or a price associated with the service.

8. The method of claim 1, wherein a discovery server receives the context information, the policy information, and the query.

9. The method of claim 1, wherein the service comprises a 3GPP Machine Type Communication (MTC) service.

10. The method of claim 1, wherein the information associated with the application comprises a server ID.

11. The method of claim 1, wherein the first core network node is a location server and the second core network node is a home subscriber server (HSS) node.

12. A discovery server comprising: a processor configured at least in part to: receive, from a first core network node, context information relating to a wireless transmit receive unit (WTRU), wherein the WTRU is available via an access network;
    receive, from a second core network node, policy information relating to at least one of WTRU or the access network;
    receive, from the WTRU, information associated with an application;
    receive, from an application server (AS), a query for a service, wherein the query comprises information associated with the application;
    determine that the WTRU is capable of providing the service and the access network is available to provide access to the WTRU;
    and send a response to the AS indicating that the WTRU is capable of providing the service.

13. The discovery server of claim 12, wherein the information associated with the application comprises a server ID.

14. The discovery server of claim 12, wherein the context information comprises a device-specific characteristic, the device-specific characteristic comprising at least one of a service type, a location, or an availability of a device.

15. The discovery server of claim 12, wherein the policy information comprises at least one of a permission condition, a congestion status, or a charging schedule associated with the WTRU.

16. The discovery server of claim 12, wherein the query specifies a query condition comprising at least one of the context information, the policy information, or information specified in a discovery record.

17. The discovery server of claim 12, wherein determining that the WTRU is capable of providing the service and the access network is available to provide access to the WTRU is based at least in part on the context information and the policy information.

18. The discovery server of claim 12, wherein the response indicates a condition associated with the service.

19. The discovery server of claim 18, wherein the condition comprises at least one of a time or a price associated with the service.

20. The discovery server of claim 12, wherein the service comprises a 3GPP Machine Type Communication (MTC) service.

21. The discovery server of claim 12, wherein the first core network node is a location server and the second core network node is a home subscriber server (HSS) node.

* * * * *